US012743208B2

United States Patent
Vimercati et al.

(10) Patent No.: US 12,743,208 B2
(45) Date of Patent: Sep. 22, 2026

(54) MEMORY ARRAY CONFIGURATION FOR SHARED WORD LINES

(71) Applicant: Micron Technology, Inc., Boise, ID (US)

(72) Inventors: Daniele Vimercati, El Dorado Hills, CA (US); Giorgio Servalli, Fara Gera d'Adda (IT); Marcello Mariani, Milan (IT)

(73) Assignee: Micron Technology, Inc., Boise, ID (US)

( * ) Notice: Subject to any disclaimer, the term of this patent is extended or adjusted under 35 U.S.C. 154(b) by 140 days.

(21) Appl. No.: 18/607,026

(22) Filed: Mar. 15, 2024

(65) Prior Publication Data

US 2024/0329840 A1 Oct. 3, 2024

Related U.S. Application Data

(60) Provisional application No. 63/493,271, filed on Mar. 30, 2023.

(51) Int. Cl.
*G11C 11/00* (2006.01)
*G06F 3/06* (2006.01)

(52) U.S. Cl.
CPC .......... *G06F 3/0611* (2013.01); *G06F 3/0629* (2013.01); *G06F 3/0673* (2013.01)

(58) Field of Classification Search
CPC ..... G06F 3/0611; G06F 3/0629; G06F 3/0673
See application file for complete search history.

(56) References Cited

U.S. PATENT DOCUMENTS

| | | | | |
|---|---|---|---|---|
| 7,042,047 B2 * | 5/2006 | Eppich | H10B 12/053 257/305 |
| 2002/0048209 A1 * | 4/2002 | Keeth | G11C 11/406 365/222 |
| 2006/0170023 A1 * | 8/2006 | Nikaido | G11C 11/412 257/E27.098 |
| 2022/0028447 A1 * | 1/2022 | Derner | G11C 8/08 |

* cited by examiner

*Primary Examiner* — Pho M Luu
(74) *Attorney, Agent, or Firm* — Holland & Hart LLP

(57) ABSTRACT

Methods, systems, and devices for memory array configuration for shared word lines are described. A memory array of a memory device may include shared (e.g., shorted) word lines. The memory array may include multiple memory cells, word lines, rows of transistors, and digit lines. Each transistor of the rows of transistors may be coupled with a respective memory cell and includes a connection between a first word line, a second word line, and a gate terminal of a transistor. Additionally, each digit line may be coupled with respective terminals of respective transistors of alternating rows of transistors including a first subset of alternating rows and a second subset of alternating rows that are exclusive from each other. The transistors may be configured according to a first configuration including two digit lines overlapping each transistor or a second configuration including a single digit line overlapping each transistor.

25 Claims, 38 Drawing Sheets

Digit Line 415-a
Digit Line 415-b
Digit Line 415-c
Word Line 410-a
Terminal 420-a
Transistor 405-a
Row 425-a
Word Line 410-b
Terminal 420-b
Transistor 405-b
Row 425-b
Word Line 410-c
Terminal 420-c
Transistor 405-c
400

640
616
612
622
621
620
622
610
605
SECTION B-B
640
614
635
612
625
622
621
622
630
605
SECTION A-A
800-e
640
620
625
630
614
605
TOP VIEW
A
A
B
B
x
y
z

MEMORY ARRAY CONFIGURATION FOR SHARED WORD LINES

CROSS REFERENCE

The present Application for Patent claims the benefit of U.S. Provisional Patent Application No. 63/493,271 by VIMERCATI et al., entitled "MEMORY ARRAY CONFIGURATION FOR SHARED WORD LINES," filed Mar. 30, 2023, assigned to the assignee hereof, and expressly incorporated by reference in its entirety herein.

FIELD OF TECHNOLOGY

The following relates to one or more systems for memory, including memory array configuration for shared word lines.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source. FeRAM may be able to achieve densities similar to volatile memory but may have non-volatile properties due to the use of a ferroelectric capacitor as a storage device.

DETAILED DESCRIPTION

Some devices may perform various operations associated with memory cell selection. For example, a memory device may perform a write operation, a read operation, or another type of access operation. To facilitate these operations, the memory device may activate (e.g., bias) access lines such as a word line and a digit line of a memory array. By biasing the word line and the digit line (e.g., applying a voltage to the access lines), a single memory cell of the memory array that is coupled with the word line and the digit line may be selected (e.g., accessed). Thus, the selection process is based on application of combinations of voltages to the respective access lines. Additionally, in some cases, access devices such as transistors may be arranged vertically, with word lines that at least partially surround the vertical channels of the devices (e.g., are located on more than one side). To limit voltage or current leakage (e.g., cross-talk, cross-coupling) between word lines, which may result in false selections, the memory array may be configured to maintain isolation between adjacent word lines. However, maintaining isolation limits a physical size of the memory device (e.g., limits shrinking the memory array), which may limit memory device capabilities, efficiency (e.g., latency, delay), and various use cases related to the size of the memory array, among other drawbacks.

The techniques described herein enable a memory device to minimize the constraint of isolation between word lines, which may result in a more condensed and efficient (e.g., increased word line conductivity and decreased latency) memory device. For example, according to a memory array configuration, a memory array of a memory device may include shared word lines (e.g., an access device may be coupled with more than one word line). The memory array may include multiple memory cells, word lines, rows of transistors, and digit lines. According to a memory array configuration, each transistor of the rows of transistors may be coupled with a respective memory cell and includes a channel between two word lines of the memory array (e.g., may have multiple gate terminals coupled with different word lines). For example, a first word line may be coupled with (e.g., may form gate terminals of) a first set of transistors and a second set of transistors, and a second word line may be coupled with the second set of transistors and a third set of transistors. Additionally, each digit line may be coupled with respective terminals (e.g., source terminals, drain terminals) of respective transistors of alternating rows of transistors. For example, a first digit line may be coupled with transistors of a first subset of alternating rows (e.g., every even row) and a second digit line may be coupled with transistors of a second subset of alternating rows (e.g., every odd row) that is exclusive from the first subset of alternating rows.

Figure 1:
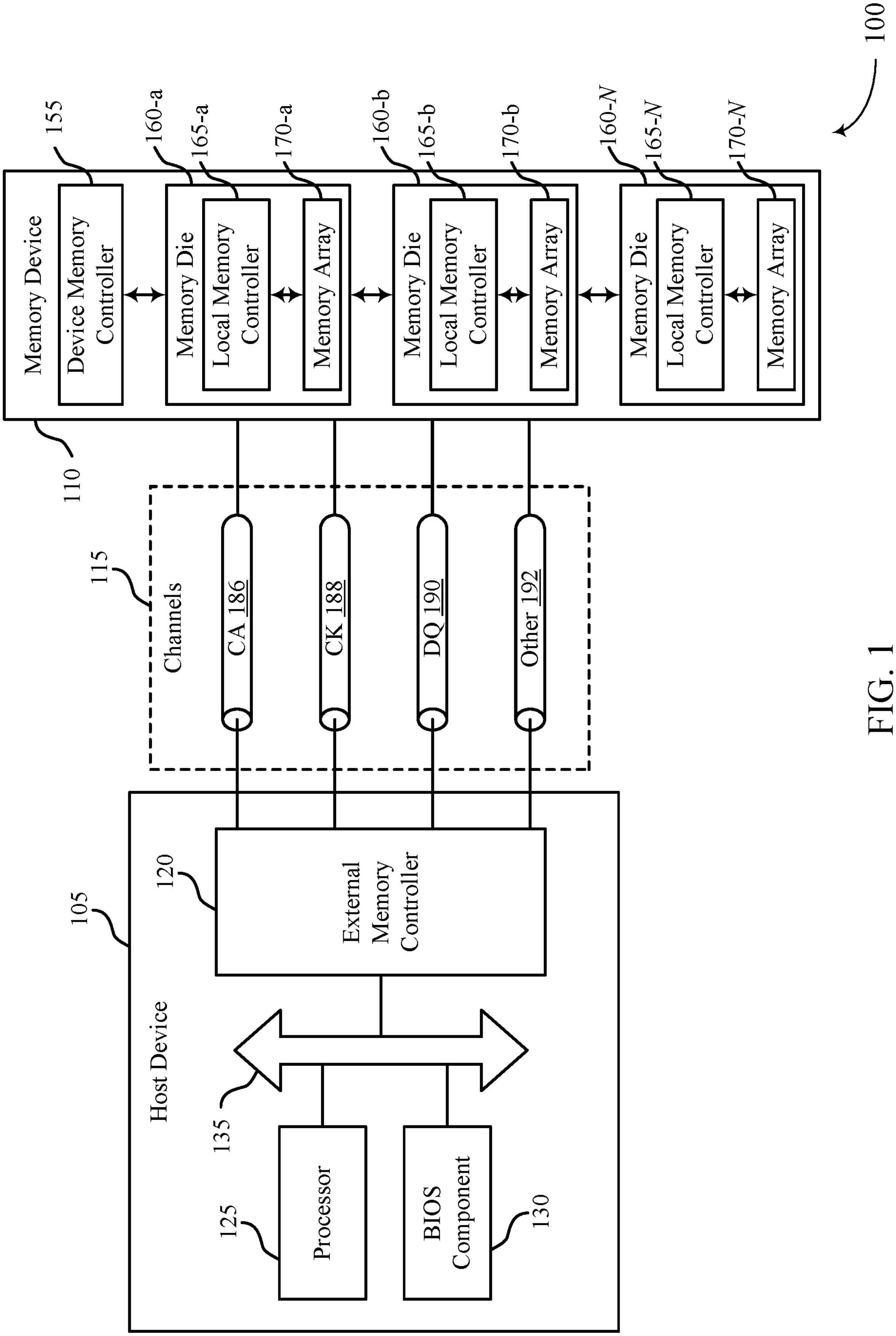
FIG. 1 illustrates an example of a system that supports memory array configuration for shared word lines in accordance with examples as disclosed herein.
Figure 2:
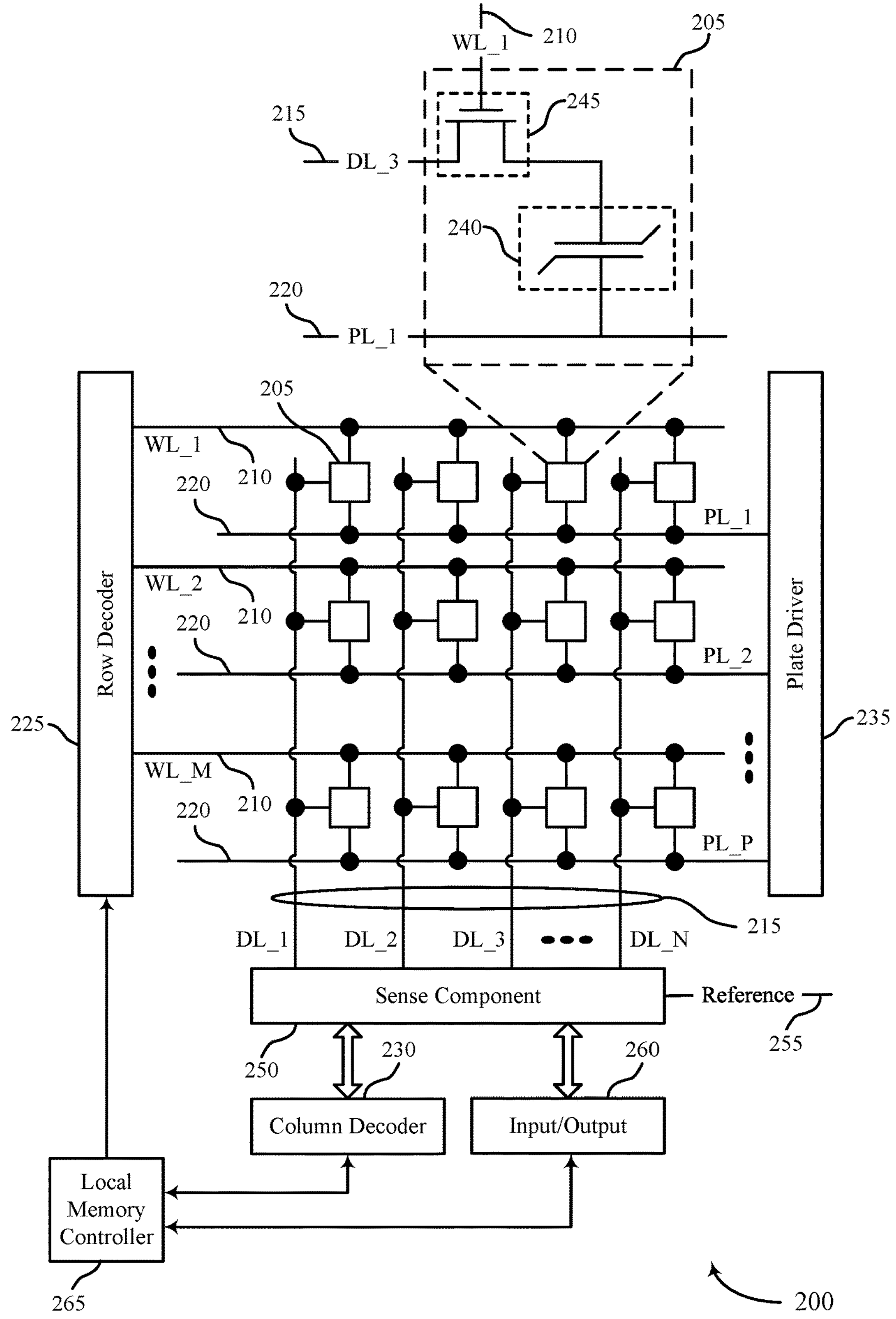
FIG. 2 illustrates an example of a memory die that supports memory array configuration for shared word lines in accordance with examples as disclosed herein.

Features of the disclosure are initially described in the context of systems and dies with reference to FIGS. 1 and 2. Features of the disclosure are described in the context of memory arrays, a timing diagram, and processing steps with reference to FIGS. 3A through 10H. These and other features of the disclosure are further illustrated by and described with reference to an apparatus diagram and flowcharts that relate to memory array configuration for shared word lines as described with reference to FIGS. 11 through 14.

FIG. 1 illustrates an example of a system 100 that supports memory array configuration for shared word lines in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

A memory die 160 may be an example of a two-dimensional (2D) array of memory cells or may be an example of a three-dimensional (3D) array of memory cells. In some examples, a 2D memory die 160 may include a single memory array 170. In some examples, a 3D memory die 160 may include two or more memory arrays 170, which may be stacked on top of one another or positioned next to one another (e.g., relative to a substrate). In some examples, memory arrays 170 in a 3D memory die 160 may be referred to as or otherwise include different sets (e.g., decks, levels, layers, dies). A 3D memory die 160 may include any quantity of stacked memory arrays 170 (e.g., two high, three high, four high, five high, six high, seven high, eight high). In some 3D memory dies 160, different decks may share a common access line such that some decks may share one or more of a word line, a digit line, or a plate line.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some cases, the collection of memory cells of the memory array 170 may be coupled with a transistor according to a physical configuration. For example, a transistor of a memory cell may be formed in a vertical configuration in which one or more sides of the vertical channel are coupled with a word line. In some cases, the processing steps for forming vertical channels may result in angled sides to the channels, and the transistor channels may have a trapezoidal shape. Thus, two adjacent memory cells may include two transistors that form a narrow trench between the bottom corners of the transistors due to the pitch of the transistors. The word lines are therefore closest to each other at the narrow trench and may be subject to voltage sharing (e.g., voltage leakage, current leakage, and the like) if not correctly isolated (e.g., a threshold distance maintained).

Some devices (e.g., an FeRAM device, among other memory devices) may perform various operations associated with memory cell selection. For example, a memory device 110 may perform a write operation, a read operation, or another type of access operation. To facilitate these operations, the memory device 110 may activate (e.g., bias)

access lines such as a word line and a digit line of a memory array. By biasing the word line and the digit line (e.g., applying a voltage to the access lines), a single memory cell of the memory array that is coupled with the word line and the digit line may be selected (e.g., accessed). Thus, the selection process is based on application of combinations of voltages to the respective access lines. Additionally, in some cases access devices such as transistors may be arranged vertically, with word lines that at least partially surround the vertical channels of the devices (e.g., are located on more than one side). To limit voltage or current leakage (e.g., cross-talk, cross-coupling) between word lines, which may result in false selections, the memory array may be configured to maintain isolation between adjacent word lines (e.g., the memory cells may be rectangular with space dedicated to the word lines to maintain isolation). However, maintaining isolation limits a physical size of the memory device (e.g., limits shrinking the memory array), which may limit memory device capabilities, efficiency (e.g., latency, delay), and various use cases related to the size of the memory array, among other drawbacks.

The techniques and configurations described herein enable a memory device 110 to minimize the constraint of isolation between word lines, which may result in a more condensed and efficient (e.g., increased word line conductivity and decreased latency due to wider word lines) memory device. For example, according to a memory array configuration, a memory array 170 of a memory device 110 may include shared word lines (e.g., an access device may be coupled with more than one word line). Thus, the narrow trench created between the transistors is at least partially filled by the shared word lines. Additionally, digit lines may be coupled with respective terminals (e.g., source terminals, drain terminals) of respective transistors of alternating rows of transistors. For example, a first digit line may be coupled with transistors of a first subset of alternating rows (e.g., every even row) and a second digit line may be coupled with transistors of a second subset of alternating rows (e.g., every odd row) that is exclusive from the first subset of alternating rows.

FIG. 2 illustrates an example of a memory die 200 that supports memory array configuration for shared word lines in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a state (e.g., a polarization state, a dielectric charge) representative of the programmable states in a capacitor. The memory cell 205 may include a logic storage component, such as capacitor 240, and a switching component 245 (e.g., a cell selection component). A first node of the capacitor 240 may be coupled with the switching component 245 and a second node of the capacitor 240 may be coupled with a plate line 220. The switching component 245 may be an example of a transistor or any other type of switch device that selectively establishes or de-establishes electronic communication between two components. In FeRAM architectures, the memory cell 205 may include a capacitor 240 (e.g., a ferroelectric capacitor) that includes a ferroelectric material to store a charge (e.g., a polarization) representative of the programmable state.

The memory die 200 may include access lines (e.g., word lines 210, digit lines 215, plate lines 220) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, bit lines, or plate lines, or their analogues, are interchangeable without loss of understanding. Memory cells 205 may be positioned at intersections of the word lines 210, the digit lines 215, or the plate lines 220.

Operations such as reading and writing may be performed on memory cells 205 by activating access lines such as a word line 210, a digit line 215, or a plate line 220. By biasing a word line 210, a digit line 215, and a plate line 220 (e.g., applying a voltage to the word line 210, digit line 215, or plate line 220), a single memory cell 205 may be accessed at their intersection. The intersection of a word line 210 and a digit line 215 in a two-dimensional or in a three-dimensional configuration may be referred to as an address of a memory cell 205. Activating a word line 210, a digit line 215, or a plate line 220 may include applying a voltage to the respective line.

Accessing the memory cells 205 may be controlled through a row decoder 225, a column decoder 230, or a plate driver 235, or any combination thereof. For example, a row decoder 225 may receive a row address from the local memory controller 265 and activate a word line 210 based on the received row address. A column decoder 230 may receive a column address from the local memory controller 265 and activate a digit line 215 based on the received column address. A plate driver 235 may receive a plate address from the local memory controller 265 and activate a plate line 220 based on the received plate address.

Selecting or deselecting the memory cell 205 may be accomplished by activating or deactivating the switching component 245. The capacitor 240 may be in electronic communication with the digit line 215 using the switching component 245. For example, the capacitor 240 may be isolated from digit line 215 when the switching component 245 is deactivated, and the capacitor 240 may be coupled with digit line 215 when the switching component 245 is activated.

A word line 210 may be a conductive line in electronic communication with a memory cell 205 that is used to perform access operations on the memory cell 205. In some architectures, the word line 210 may be in electronic communication with a gate of a switching component 245 of a memory cell 205 and may be operable to control the switching component 245 of the memory cell. In some architectures, the word line 210 may be in electronic communication with a node of the capacitor of the memory cell 205 and the memory cell 205 may not include a switching component.

A digit line 215 may be a conductive line that couples the memory cell 205 with a sense component 250. In some architectures, the memory cell 205 may be selectively coupled with the digit line 215 during portions of an access operation. For example, the word line 210 and the switching component 245 of the memory cell 205 may be operable to selectively couple or isolate the capacitor 240 of the memory cell 205 and the digit line 215. In some architectures, the memory cell 205 may be in electronic communication (e.g., constant) with the digit line 215.

A plate line 220 may be a conductive line in electronic communication with a memory cell 205 that is used to perform access operations on the memory cell 205. The plate line 220 may be in electronic communication with a node (e.g., the cell bottom) of the capacitor 240. The plate line 220 may cooperate with the digit line 215 to bias the capacitor 240 during access operation of the memory cell 205.

The sense component 250 may determine a state (e.g., a polarization state, a charge) stored on the capacitor 240 of the memory cell 205 and determine a logic state of the memory cell 205 based on the detected state. The sense component 250 may include one or more sense amplifiers to amplify the signal output of the memory cell 205. The sense component 250 may compare the signal received from the memory cell 205 across the digit line 215 to a reference 255 (e.g., a reference voltage, a reference line). The detected logic state of the memory cell 205 may be provided as an output of the sense component 250 (e.g., to an input/output 260), and may indicate the detected logic state to another component of a memory device (e.g., a memory device 110) that includes the memory die 200.

The local memory controller 265 may control the operation of memory cells 205 through the various components (e.g., row decoder 225, column decoder 230, plate driver 235, and sense component 250). The local memory controller 265 may be an example of the local memory controller 165 described with reference to FIG. 1. In some examples, one or more of the row decoder 225, column decoder 230, and plate driver 235, and sense component 250 may be co-located with the local memory controller 265. The local memory controller 265 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 265 may generate row signals and column address signals to activate the target word line 210, the target digit line 215, and the target plate line 220. The local memory controller 265 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 265 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 265 in response to various access commands (e.g., from a host device 105). The local memory controller 265 may be operable to perform other access operations not listed here or other operations related to the operating of the memory die 200 that are not directly related to accessing the memory cells 205.

The local memory controller 265 may be operable to perform a write operation (e.g., a programming operation) on one or more memory cells 205 of the memory die 200. During a write operation, a memory cell 205 of the memory die 200 may be programmed to store a desired state (e.g., logic state, charge state). The local memory controller 265 may identify a target memory cell 205 on which to perform the write operation. The local memory controller 265 may identify a target word line 210 and a target digit line 215 coupled with the target memory cell 205 (e.g., an address of the target memory cell 205). The local memory controller 265 may activate the target word line 210 and the target digit line 215 (e.g., applying a voltage to the word line 210 or digit line 215) to access the target memory cell 205. The local memory controller 265 may apply a signal (e.g., a write pulse, a write voltage) to the digit line 215 during the write operation to store a specific state (e.g., charge) in the capacitor 240 of the memory cell 205. The signal used as part of the write operation may include one or more voltage levels over a duration.

The local memory controller 265 may be operable to perform a read operation (e.g., a sense operation) on one or more memory cells 205 of the memory die 200. During a read operation, the state (e.g., logic state, charge state, polarization state) stored in a memory cell 205 of the memory die 200 may be evaluated (e.g., read, determined, identified). The local memory controller 265 may identify a target memory cell 205 on which to perform the read operation. The local memory controller 265 may identify a target word line 210, a target digit line 215, and target plate line 220 coupled with the target memory cell 205. The local memory controller 265 may activate the target word line 210, the target digit line 215, and the target plate line 220 (e.g., applying a voltage to the word line 210, digit line 215, or plate line 220) to access the target memory cell 205. The target memory cell 205 may transfer a signal (e.g., charge, voltage) to the sense component 250 in response to biasing the access lines. The sense component 250 may amplify the signal. The local memory controller 265 may activate the sense component 250 (e.g., latch the sense component) and compare the signal received from the memory cell 205 to a reference (e.g., the reference 255). Based on that comparison, the sense component 250 may determine a logic state that is stored on the memory cell 205.

In some cases, a memory device may perform a write operation, a read operation, or another type of access operation. To facilitate these operations, the memory device may activate (e.g., bias) access lines such as a word line 210 and a digit line 215 of a memory array. By biasing the word line 210 and the digit line 215 (e.g., applying a voltage to the access lines), a single memory cell 205 of the memory array that is coupled with the word line 210 and the digit line 215 may be selected (e.g., accessed). Thus, the selection process is based on application of combinations of voltages to the respective access lines. Additionally, in some cases access devices such as transistors may be arranged vertically, with word lines that at least partially surround the vertical channels of the devices (e.g., are located on more than one side). To limit voltage or current leakage (e.g., cross-talk, cross-coupling) between word lines, which may result in false selections, the memory array may be configured to maintain isolation between adjacent word lines 210 (e.g., the memory cells 205 may be rectangular with space dedicated to the word lines 210 to maintain isolation). However, maintaining isolation limits a physical size of the memory device (e.g., limits shrinking the memory array), which may limit memory device capabilities, efficiency (e.g., latency, delay), and various use cases related to the size of the memory array, among other drawbacks.

The techniques and configurations described herein enable a memory device to minimize the constraint of isolation between word lines 210, which may result in a more condensed and efficient (e.g., increased word line conductivity and decreased latency due to wider word lines) memory device. For example, according to a memory array configuration, a memory device may include shared word lines 210 (e.g., an access device may be coupled with more than one word line). Additionally, digit lines 215 may be coupled with respective terminals (e.g., source terminals, drain terminals) of respective transistors (e.g., switching components 245) of alternating rows of transistors. For example, a first digit line 215 may be coupled with transistors of a first subset of alternating rows (e.g., every even row) and a second digit line 215 may be coupled with transistors of a second subset of alternating rows (e.g., every odd row) that is exclusive from the first subset of alternating rows.

Figure 3A:
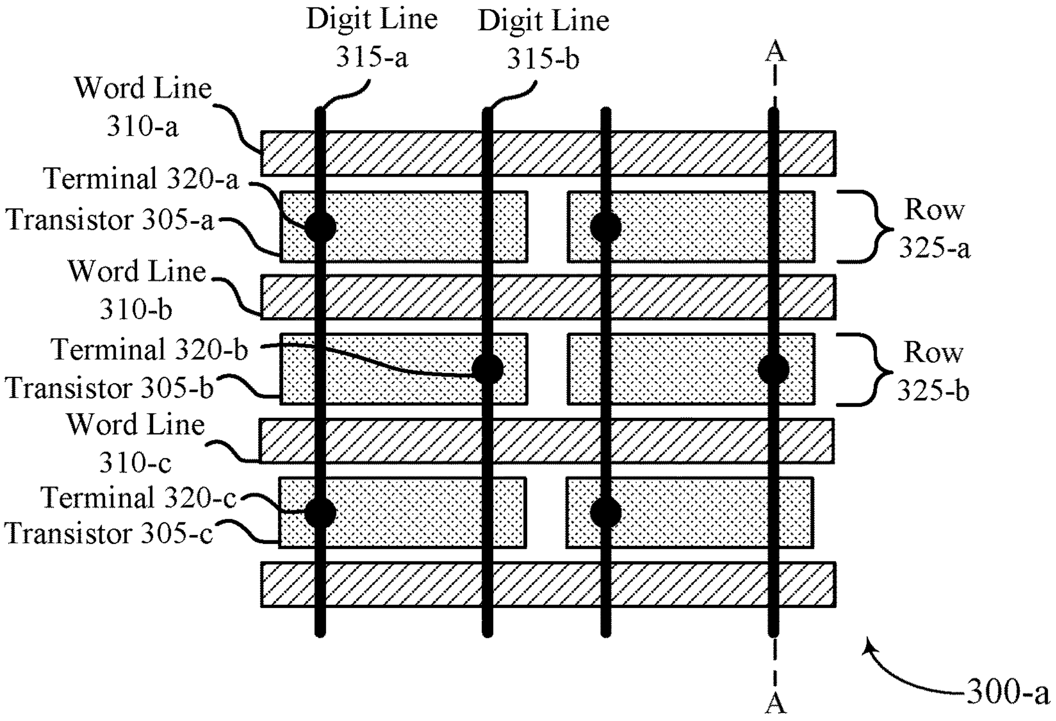
FIGS. 3A, 3B, 3C, and 4 illustrate examples of memory arrays that support memory array configurations for shared word lines in accordance with examples as disclosed herein.
Figure 3B:
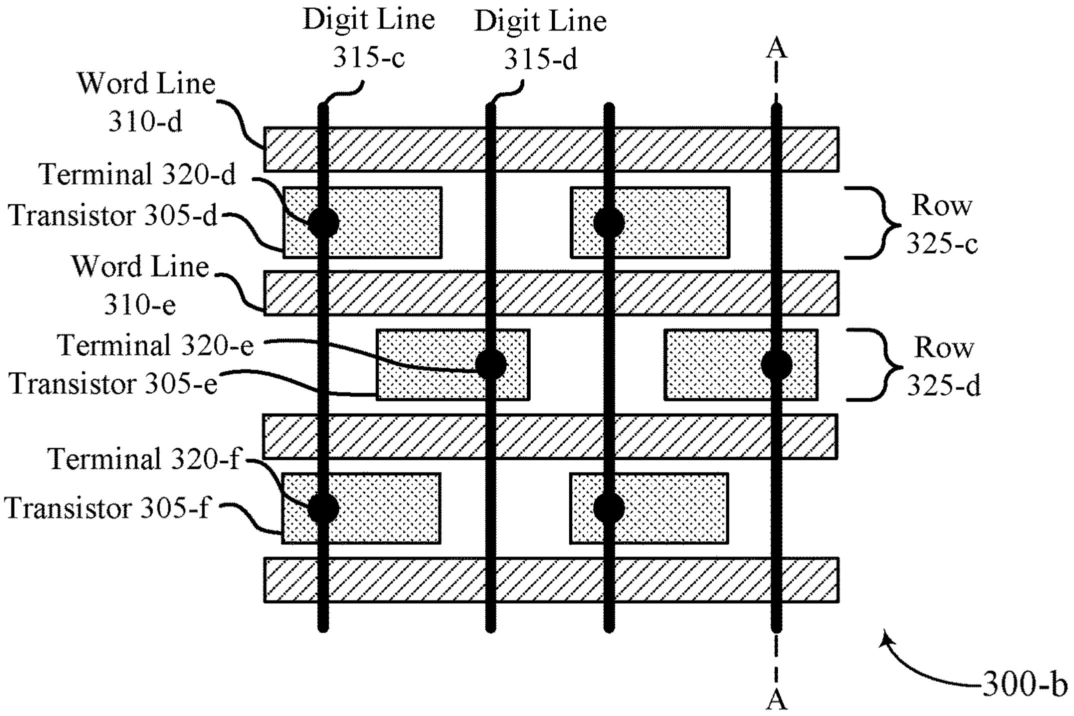
Figure 3C:
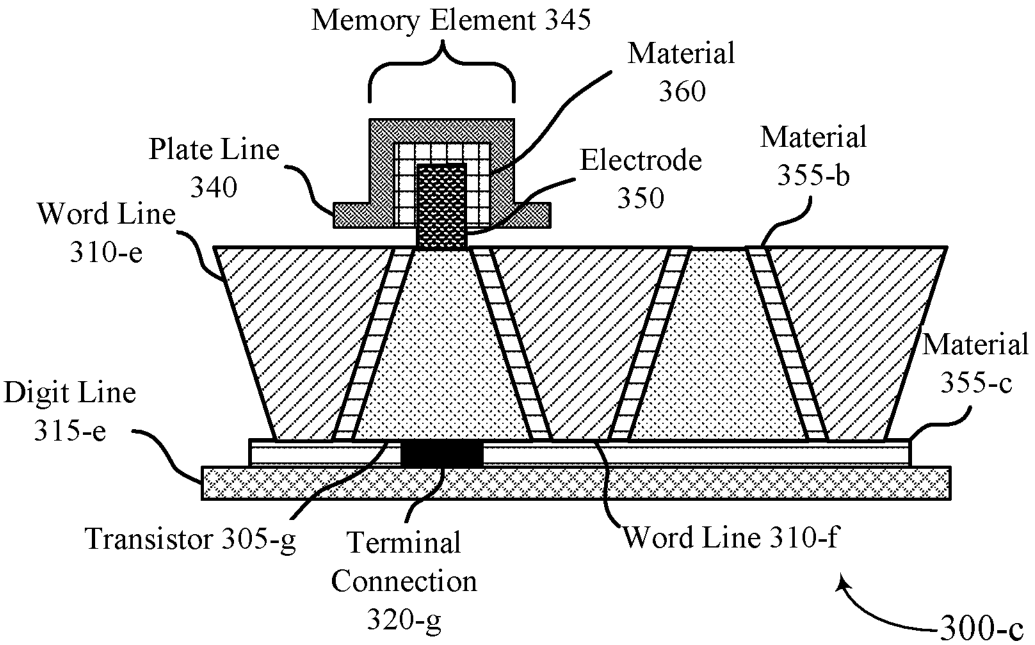

FIGS. 3A, 3B, and 3C illustrate examples of a memory array 300-*a*, a memory array 300-*b*, and a memory array 300-*c*, that support configuration of memory arrays for shared word lines in accordance with examples as disclosed herein. In some examples, the memory array 300-*a*, the memory array 300-*b*, and the memory array 300-*c* may be examples of or implement aspects of a system 100 or a memory die 200, as described herein with reference to FIGS. 1 and 2. For example, a memory array 300, a transistor 305, a word line 310, and a digit line 315 may be examples of or included as part of a memory array 170, a switching component 245, a word line 210, and a digit line 215, respectively.

The memory arrays 300 may include multiple components such as transistors 305 in rows 325, word lines 310, digit lines 315, and terminal connections 320. The multiple components may be examples of or implement aspects of components as described herein with reference to FIGS. 1 and 2. In some implementations, the memory arrays 300 may have additional types or quantities of components, and/or some components may be absent from the memory arrays 300. For example, the transistors 305 may be coupled with memory cells (e.g., memory cells 205 with reference to FIG. 2). In some examples, operations described as being included or performed at one component or system may additionally or alternatively be performed at another component or system. In some examples, accessing or selecting a memory cell may be an example of applying a voltage or current through one or more access lines to the transistors 305.

In some implementations, the transistors 305 may serve as access transistors of the memory cells of the memory array 300. For example, in an access operation of a memory device (e.g., for an FeRAM device), the transistors 305 may be coupled with a word line 310 and a digit line 315. The transistor 305 may act as a switching component of a memory cell to connect a sense amplifier (e.g., a sense component 250 with reference to FIG. 2) with a capacitor of the memory cell when the coupled word line 310 and digit line 315 are selected. This may facilitate various operations associated with writing or reading data to or from the various memory cells of the memory array. In some cases, the transistors 305 may be examples of thin film transistors (TFT).

According to some configurations, the transistors 305 may be coupled with a single word line 310. For example, a gate of a transistor 305 may be coupled with a word line 310. The transistor 305 may be arranged vertically (e.g., have a vertical channel) where the word line 310 may at least partially surround a first side of the vertical channel of the transistor 305 and a second side of the vertical channel of the transistor 305. In some cases, processing steps associated with forming vertical channels may be not completely anisotropic. Thus, in some cases the processing steps may result in the transistor channels having a trapezoidal shape (e.g., being narrower towards a top of the channel). Thus, a word line 310 may be split and located on two sides of a transistor 305. However, when a first row 325 of transistors 305 is adjacent to a second row 325 of transistors 305, the word lines 310 surrounding each respective row 325 may experience cross-talk or coupling faults (e.g., voltage or current leakage), which may result in false memory cell selections, among other problems. To minimize faults, the transistors 305 (and therefore the word lines 310) may be arranged to maintain a threshold distance between each word line 310. Maintaining this distance may utilize a relatively large amount of space respective to the size of the memory array and the other components, and may be a relatively challenging aspect of processing a memory array 300 without faults (e.g., without breaking isolation between word lines 310). For example, the word lines 310 may be constrained to a limited width that may trade conductivity for isolation (increasing latency but decreasing a likelihood of false memory cell selection). As such, to save space but still maintain a low latency, manufacturing a memory array 300 may include attempting to form adjacent word lines 310 wide enough and close enough to each other to maintain the distance threshold while maintaining a rate of conductivity.

The examples described with reference to FIGS. 3A, 3B, and 3C may depict examples of memory array configurations for shared word lines. In some implementations, the word lines 310 may be shared word lines such that each transistor 305 may be coupled with two word lines 310. In some cases, the transistors 305 may be rectangular. In such cases, the transistors 305 may be configured in a horizontal orientation in which the horizontal side (e.g., the x-axis) of the transistor 305 is longer than the vertical side (e.g., the y-axis) of the transistor 305 (e.g., allowing for two different digit lines 315 to connect with the transistor 305). In some cases, the transistors 305 may be square, rhombus, or resemble another shape. In some examples, a digit line 315 may connect with a first transistor 305 of alternating rows 325 or a first transistor 305 per multiple rows 325 (e.g., every third row, and the like).

In the example of FIG. 3A, the memory array 300-*a* may include a transistor 305-*a*, a transistor 305-*b*, and a transistor 305-*c* (e.g., although any quantity of transistors may be supported), where the transistor 305-*a* is coupled with a word line 310-*a* (e.g., via a gate of the transistor 305-*a*), a word line 310-*b*, and a terminal connection 320-*a* (e.g., via a source, drain, or both, of the transistor 305-*a*); the transistor 305-*b* is coupled with the word line 310-*b*, the word line 310-*c*, and a terminal connection 320-*b*; and the transistor 305-*c* is coupled with a terminal connection 320-*c*. In some implementations, the components of FIG. 3A may be coupled with additional word lines 310, terminal connections 320, or other components.

In some cases, a digit line 315-*a* and a digit line 315-*b* may both overlap the transistor 305-*a*, the transistor 305-*b*, and the transistor 305-*c* and be coupled with alternating rows 325 of the transistors. For example, the digit line 315-*a* may be coupled with the transistor 305-*a* of the row 325-*a* at the terminal connection 320-*a* and the transistor 305-*c* at the terminal connection 320-*c* via a contact (e.g., an active material, a conductive layer) and not coupled with the transistor 305-*b* (e.g., no contact between the digit line 315-*a* and the terminals of transistor 305-*b*). Additionally, the digit line 315-*b* may be coupled with the transistor 305-*b* of the row 325-*b* at the terminal connection 320-*b* via a contact and not coupled with the transistor 305-*a* or the transistor 305-*c*. In this way, although the digit line 315-*a* and the digit line 315-*b* each overlap the transistors 305-*a*, 305-*b*, and 305-*c*, the digit lines 315-*a* and 315-*b* are coupled with transistors of alternating and exclusive rows (e.g., subsets of transistors).

In the example of FIG. 3B, the memory array 300-*b* may be a memory array configured according to a hexagonal configuration. For example, the memory array 300-*b* may include a transistor 305-*d*, a transistor 305-*e*, and a transistor 305-*f* (although any quantity of transistors may be supported), where the transistor 305-*d* is coupled with a word line 310-*d*, a word line 310-*c*, and a digit line 315-*c* via a terminal connection 320-*d*; the transistor 305-*c* is coupled with the word line 310-*e* and a digit line 315-*d* via a terminal connection 320-*c*; and the transistor 305-*f* is coupled with the digit line 315-*c* via a terminal connection 320-*f*.

In some cases, a digit line 315-*c* may be coupled with the transistor 305-*d* and the transistor 305-*f* (and not coupled with transistor 305-*e*) and a digit line 315-*d* may be coupled with the transistor 305-*c* (and not coupled with transistor 305-*d* or transistor 305-*f*). In this way, the digit line 315-*c* may be coupled with a first subset of alternating rows 325 and the digit line 315-*d* may be coupled with a second subset of alternating rows 325 that are exclusive of the first subset of alternating rows 325. For example, the digit line 315-*c* may be coupled with the transistor 305-*d* of the row 325-*c* at the terminal connection 320-*d* and the transistor 305-*f* at the terminal connection 320-*f* (e.g., via contacts). Additionally, the digit line 315-*d* may be coupled with the transistor 305-*e* of the row 325-*d* at the terminal connection 320-*c* (e.g., via a contact). Thus, the transistors 305 may be staggered such that each transistor 305 has one digit line 315 that is partially or fully overlapping with the terminal portion of the vertical channel of the transistor 305.

In some cases, the example of FIG. 3B may be advantageously structured to couple a transistor 305 with a respective digit line 315 while reducing an area of the transistor 305 and the example of FIG. 3A may be advantageously structured to increase or maintain the area of the transistor 305 while including a dielectric material between decoupled digit lines 315. In some use cases the hexagonal configuration (e.g., staggered transistors 305) of the FIG. 3B may be used over the configuration of FIG. 3A and in other use cases the configuration of FIG. 3A may be used over the hexagonal configuration of FIG. 3B.

The example of FIG. 3C depicts a cross-sectional view of a memory array 300-*c*. For example, the cross-sectional view of FIG. 3C may show memory array 300-*a* of FIG. 3A or memory array 300-*b* of FIG. 3B along at least a portion of section line A-A. The memory array 300-*c* may include a transistor 305-*g* coupled with a word line 310-*e*, a word line 310-*f*, and a digit line 315-*c* at terminal connection 320-*g*. Between the transistor 305-*g* and the digit line 315-*e* and surrounding the terminal connection 320-*g* may be a material 355-*c* (e.g., a dielectric material). The transistor 305-*g* may be a vertical transistor, and may be formed by a process that results in a trapezoidal shape for the channel of transistor 305-*g*. A terminal (e.g., source or drain region) of the transistor 305-*g* may be coupled with a memory element 345.

In some cases, the memory element 345 may include a top electrode, a bottom electrode, and a ferroelectric material in between the top electrode and the bottom electrode. For example, the memory element 345 may include a capacitor (e.g., a capacitor 240) that includes a portion of a plate line 340 (e.g., a top electrode, a first plate) and a bottom electrode 350 (e.g., a second plate), as described herein with reference to FIG. 2. The capacitor may also include a ferroelectric material 360 between the plate line 340 and the bottom electrode 350. In some cases, the memory element 345 may be an example of a first type of capacitor (e.g., a stud-type capacitor), where multiple types (e.g., a container capacitor, fin capacitor, and the like) of capacitors may be used by the techniques described herein. For example, a portion of the plate line 340 may be included in a container in which the portion is surrounded by the ferroelectric material 360 and the bottom electrode 350 surrounds the ferroelectric material 360 and is coupled with the transistor 305-*g* (e.g., a source or drain of the transistor 305-*g*).

In some cases, the terminal connection 320-*g* (e.g., contact, redistribution layer, metal) may couple a terminal (e.g., source or drain region) of the transistor 305-*g* with the digit line 315-*c*. In some cases, the transistor 305-*g* may be operatively connected with the word line 310-*e* and the word line 310-*f* (e.g., the transistor 305-*g* may be activated when one or both of the word lines 310-*e* and 310-*f* are asserted). For example, along the sides of the transistor 305-*g* may be the word line 310-*e* and the word line 310-*f*, respectively. The transistor 305-*g* may include a channel (e.g., extending between a source region and a drain region) with material 355-*b* (e.g., a gate oxide, a dielectric material) between the channel and the word lines 310-*c* and 310-*f* such that a portion of the word line 310-*e* and a portion of the word line 310-*f* are gate terminals of the transistor 305-*g*. In some cases, the source region and the drain region of the transistor 305-*g* may be isolated from each other (e.g., not connected, not in electronic communication) until one or both of the word lines 310-*e* or 310-*f* are asserted (e.g., raised above a threshold voltage of the transistor 305-*g*).

Figure 4:
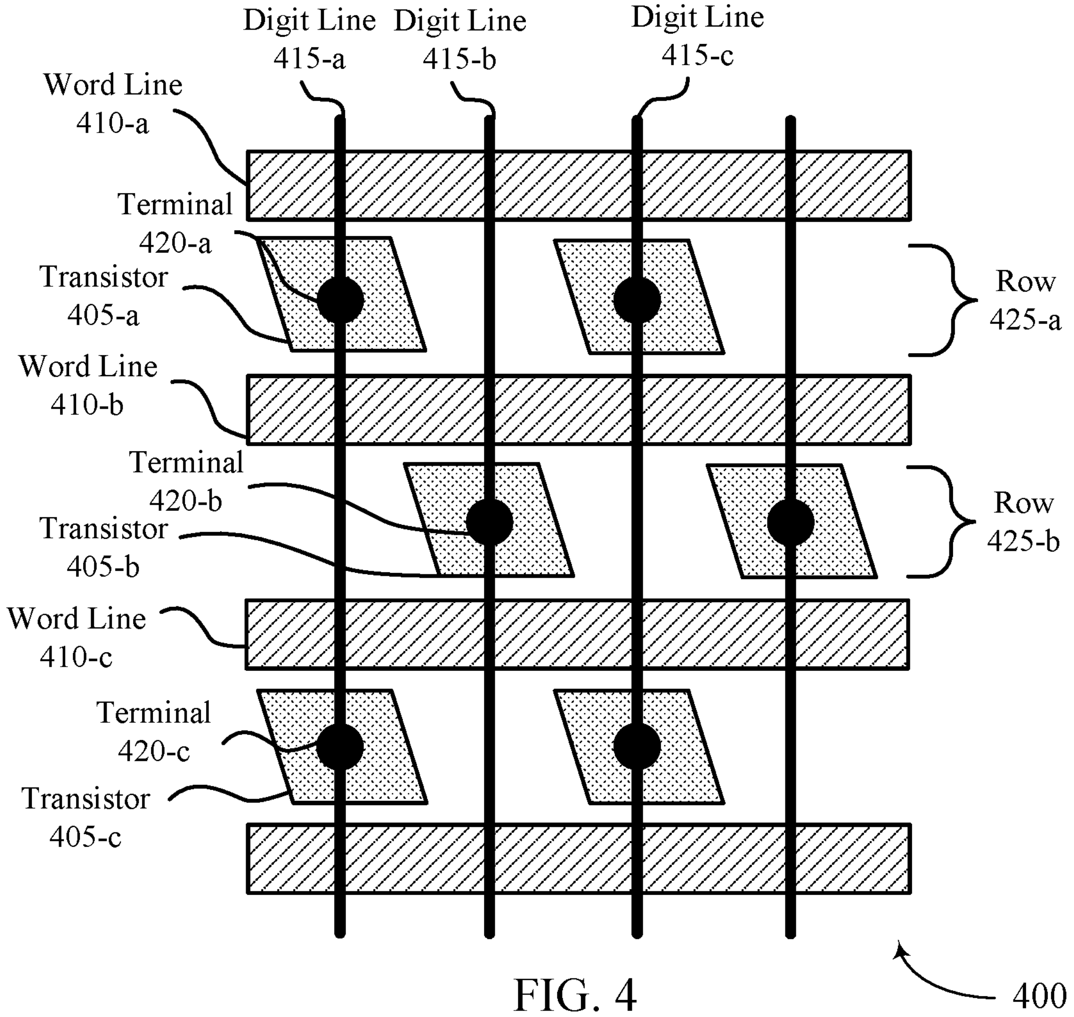

FIG. 4 illustrates an example of a memory array 400 that supports configuration of memory arrays for shared word lines in accordance with examples as disclosed herein. In some examples, the memory array 400 may be an example of or implement aspects of a system 100, a memory die 200, or memory arrays 300*a*, 300*b*, or 300*c*, as described herein with reference to FIGS. 1 through 3C. For example, memory array 400, transistors 405, word lines 410, digit lines 415, and terminal connections 420 may be examples of or included as part of a memory array 170, a memory array 300, switching components 245, transistors 305, word lines 210 or 310, digit lines 215 or 315, and terminal connections 320, respectively.

The memory array 400 may include multiple components in a similar configuration as the memory arrays 300. For example, the memory array 400 may include a transistor 405-*a*, a transistor 405-*b*, a transistor 405-*c*, a word line 410-*a*, a word line 410-*b*, a word line 410-*c*, a digit line 415-*a*, a digit line 415-*b*, a digit line 415-*c*, a terminal connection 420-*a*, a terminal connection 420-*b*, and a terminal connection 420-*c*. The memory array 400 may be configured to share a word line 410 between multiple transistors. For example, each transistor of the row 425-*a* and the row 425-*b* may share the word line 410-*b*, which may result in a more compact memory array, an increased conductivity of word lines 410 (e.g., by affording a wider word line without word line isolation factoring in), and reduced latency. In some implementations, the memory array 400 may have additional types or quantities of components, and/or some components may be absent from the memory array 400. For example, the transistors 405 may be coupled with memory cells (e.g., memory cells 205 with reference to FIG. 2). In some examples, operations described as being included or performed at one component or system may additionally or alternatively be performed at another component or system.

In some cases, the memory array 400 may include a similar topology as the offset (e.g., the staggered) memory array 300-*b*. For example, each transistor 405 may have a terminal (e.g., source, drain) that is coupled with (e.g., via a contact) a digit line 415, creating a staggered configuration of transistors 405. The memory array 400 may additionally be structured according to a diagonal pattern. For example, the transistors 405-*a* may be in the shape of a parallelogram (e.g., a rhombus). In some cases, the diagonal pattern may result in a tighter (e.g., closer together) configuration of transistors 405 while maintaining the staggered topology.

In some examples, a memory device may perform an access operation utilizing the memory array 400. For example, the memory device may select a first memory cell associated with the transistor 405-*a* of row 425-*a* based on biasing the digit line 415-*a* to a first voltage value different from a second voltage value of the digit line 415-*b* and biasing the word line 410-*b* to a third voltage value different from a fourth voltage value of the word line 410-*c*, as described herein with reference to FIG. 5. For example, the memory device may positively bias the digit line 415-*a* to the first voltage value greater than the second voltage value of the digit line 415-*b* and the word line 410-*b* to the third voltage value greater than the fourth voltage value of the word line 410-*c*. In some cases, by biasing the word line 410-*b* to the third voltage value, the transistor 405-*a* may establish electronic communication (e.g., switch on, connect) between a capacitor of the memory cell and the digit line 415-*a*. To perform a write operation, a voltage value of the digit line 415-*a* may be selected to program the cell with a desired charge state (e.g. a polarization state). To perform a read operation, a voltage value of the digit line 415-*a* may be different from a program voltage of the digit line, thus establishing a voltage across the ferroelectric capacitor of the memory cell, such that the charge state of the capacitor may be read by the current on the digit line. For both read and program access operations, a voltage value of adjacent digit lines may be maintained at the plate voltage, which may disable access (the memory cells may not be read or programmed) even though setting the word line 410-*b* to the third voltage may at least partially turn on transistors (e.g., transistor 405-*b*) coupled with other digit lines (e.g., digit line 415-*b*).

Additionally, or alternatively, the memory device may select the first memory cell further based on biasing the word line 410-*a* to the third voltage value. For example, in some cases, biasing word lines on both sides of a transistor 405 to the third voltage value (e.g., a voltage value associated with selecting memory cells of the memory array 400) may result in a stronger coupling (e.g., electrical conductivity) than biasing a single word line on one side of the transistor 405 to the third voltage value. Thus, the electronic communication coupling between the capacitor of the memory cell and the terminal connection 420 a may be more reliable (e.g., may have higher conductivity).

In some implementations, the memory device may select both the first memory cell associated with the transistor 405-*a* and one or more second memory cells. For example, the memory device may additionally select a second memory cell associated with the transistor 405-*b* of row 425-*b* based on biasing the digit line 415-*b* to the first voltage value. In this way, the memory device may select multiple memory cells of adjacent rows 425 by biasing a single word line (e.g., word line 410-*b*) to the third voltage value and multiple digit lines 415 to the first voltage value. In some cases, this multiple selection operation may be compatible with dielectric compensation sense amplifier (DCSA) operation.

Figure 5:
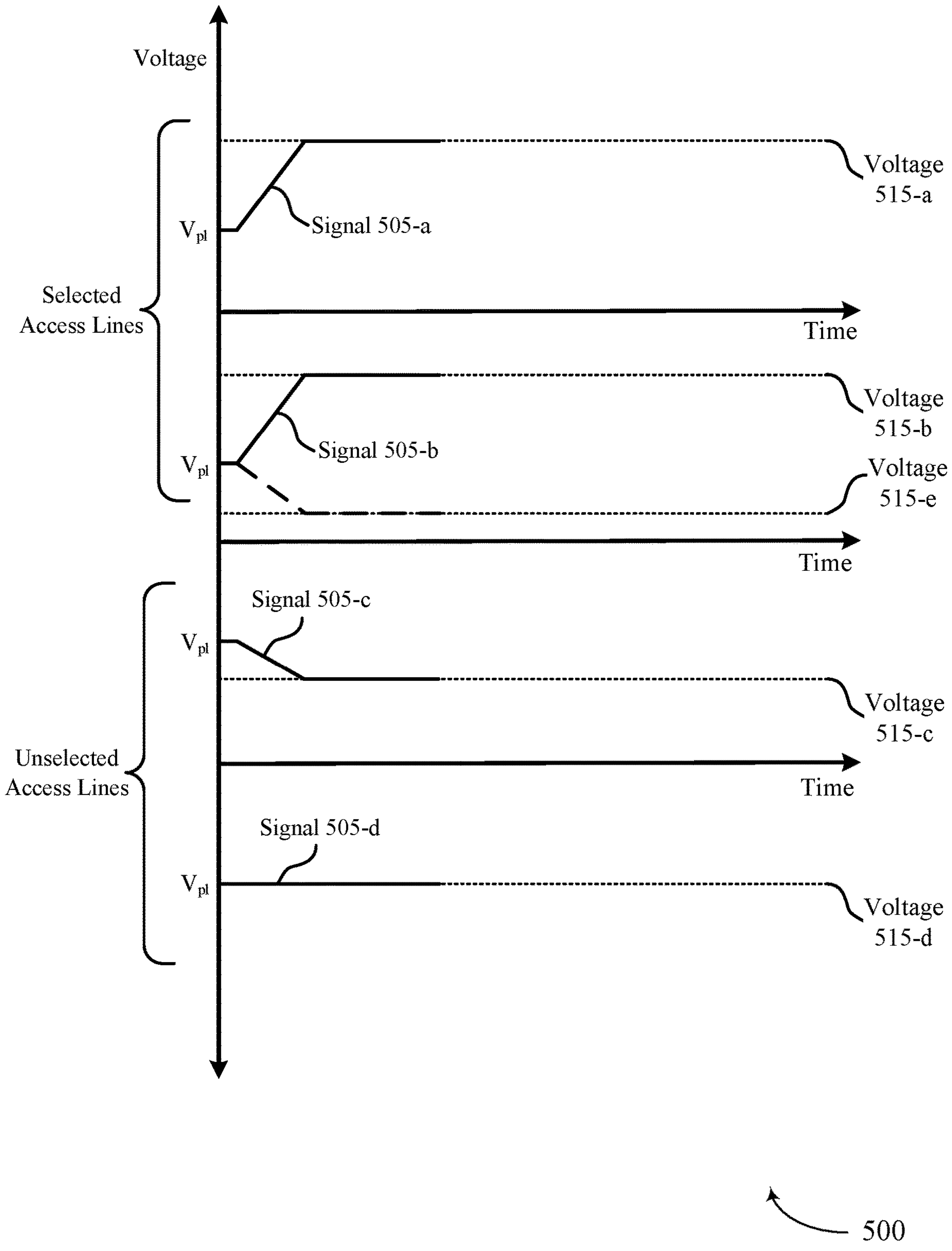
FIG. 5 illustrates an example of a timing diagram that supports memory array configuration for shared word lines in accordance with examples as disclosed herein.

FIG. 5 illustrates an example of a timing diagram 500 that supports memory array configuration for shared word lines in accordance with examples as disclosed herein. In some examples, the timing diagram 500 may be an example of or implement aspects of a system 100, a memory die 200, or memory arrays 300-*a*, 300-*b*, 300-*c*, or 400 as described herein with reference to FIGS. 1 through 4. For example, signals 505 may be used to control operation of a memory array 170, a memory array 300, a memory array 400, a word line 210, a word line 310, a word line 410, a digit line 215, a digit line 315, and a digit line 415, respectively.

The timing diagram may depict various access lines during an access operation of a memory device. In some implementations, the signals 505 may represent signals for one or more word lines or one or more digit lines associated with a memory array of the memory device. For example, the signal 505-*a* and the signal 505-*c* may be associated with word lines and the signal 505-*b* and the signal 505-*d* may be associated with digit lines. The word lines may be coupled with one or more rows of transistors of the memory array, such that each transistor is coupled with two word lines and one digit line in an alternating configuration (e.g., the digit line coupled with a first subset of rows of transistors), as described herein with reference to FIGS. 1 through 4. In some examples, the voltages 515 may be less than or greater than the examples shown and discussed below. The examples of FIG. 5 are for illustrative purposes and do not include an exhaustive list of possible examples for an access operation according to the techniques described herein.

In some examples, the memory device may determine to perform an access operation on a memory cell (e.g., select the memory cell). To perform the access operation the memory device may bias various access lines (e.g., word lines and digit lines) such that selected access lines coupled with the memory cell establish a voltage differential across the memory cell. For example, the memory device may bias one or more word lines coupled with the memory cell to a first voltage 515-*a* (e.g., 3 volts (V)) resulting in signal 505-*a* and bias other word lines not coupled with the memory cell to a second voltage 515-*c* (e.g., –0.2 V) different from the first voltage 515-*a* resulting in signal 505-*c*. The first voltage 515-*a* may turn on the transistor coupled with the memory cell, and the memory device may bias a first digit line coupled with the memory cell to a third voltage 515-*b* (e.g., a voltage greater than $V_{pl}$) using signal 505-*b* to program the memory cell to a first charge state or a fourth voltage 515-*c* (e.g., a voltage lower than $V_{pl}$) to program the memory cell to a second charge state. The memory device may bias other digit lines not coupled with the memory cell to a fifth voltage 515-*d* (e.g., a voltage that is the same as or close to $V_{pl}$) using signal 505-*d*. Thus, even though other transistors that are adjacent to the one or more word lines (e.g., have gate voltages that are set by the one or more word lines) may be at least partially turned on by biasing the one or more word lines to the first voltage 515-*a*, the associated memory cells for the other transistors may not have a voltage across the memory cell due to the digit lines being the same or close to the plate line voltage. Thus, these memory cells may not change charge states. For a read operation, the digit line associated with the memory cell subject to the access operation may be set to a voltage that may be different from the plate voltage, but may be different from the voltages used for programming the cell (e.g., the third voltage 515-*a* and the fourth voltage 515-*c*). The memory device may then determine the charge state of the memory cell by detecting current from the memory cell via the digit line.

In some implementations, the other digit lines associated with signal 505-*d* may include adjacent digit lines associated with signal 505-*d* that are coupled with respective terminals of respective transistors of a second subset of rows of transistors that are exclusive of the first subset of rows. For example, the memory array may include transistors coupled with a single digit line (e.g., according to the hexagonal configuration with reference to FIG. 3B or the configuration with reference to FIG. 3A) such that each digit line may be used to select a single memory cell (whereas a single word line may be used to select multiple memory cells, as described herein with reference to FIGS. 3A through 4).

In some cases, the memory device may select multiple memory cells. For example, the memory device may bias a second digit line coupled with a second memory cell of the second subset of rows to the third voltage 515-*b* (e.g., a voltage greater than $V_{pl}$) using signal 505-*b* to program the second memory cell to the first charge state or the fourth voltage 515-*c* (e.g., a voltage lower than $V_{pl}$) to program the second memory cell to the second charge state, where the second memory cell is also coupled with the first word line associated with the signal 505-*a*, as described herein with reference to FIG. 4. Because the memory cells share a word line (e.g., though located at different rows of the memory array), both memory cells may be selected based on the first word line biased to the first voltage 515-*a* and the first digit line and the second digit line both biased to the third voltage 515-*b* or fourth voltage 515-*c*, as described herein with reference to FIG. 4.

In some examples, the memory device may select the first memory cell based on biasing the first word line, a second word line, and the first digit line. For example, as described herein with reference to FIG. 4, the first memory cell may be coupled with the first word line (e.g., word line 410-*b*), the second word line (e.g., word line 410-*c*) (e.g., a gate voltage may be set by the first word line and the second word line), and the first digit line (e.g., digit line 415-*b*). The memory device may keep other digit lines (e.g., digit lines 415 coupled with row 425-*a*) unselected (e.g., maintained at the same voltage value as the plate voltage value) and may bias the first digit line (e.g., digit line 415-*b* of row 425-*b*) to the third voltage 515-*b* using signal 505-*b* to program the first memory cell to the first charge state or the fourth voltage 515-*e* to program the first memory cell to the second charge state, thus accessing the transistors in row 425-*b* using alternating digit lines. The memory device may bias both word lines to the first voltage 515-*a*, which may result in a stronger connection (e.g., selection) with the first memory cell, selecting the first memory cell based on biasing both word lines and the first digit line.

FIGS. 6A through 6F illustrate examples of processing steps 600 that support memory array configuration for shared word lines in accordance with examples as disclosed herein. The processing steps 600 may illustrate aspects of a sequence of manufacturing operations for fabricating aspects of a memory array 300-*a*, 300-*b*, 300-*c*, or a memory array 400, as described with reference to FIGS. 3A, 3B, 3C, and 4, respectively. For illustrative purposes, aspects of the memory array may be described with reference to an x-direction (e.g., a first direction), a y-direction (e.g., a second direction), and/or a z-direction (e.g., a third direction) of the illustrated coordinate system. For example, the processing steps 600 may illustrate various cross-sectional views of the memory array in an xz-plane. In some examples, the z-direction may be illustrative of a direction (e.g., a layer direction) orthogonal to a surface of a substrate (e.g., a surface in an xy-plane, a surface upon or over which other materials may be deposited), and each of the related regions, illustrated by their respective cross section in the xz-plane, may extend for some distance along the y-direction (e.g., above or on the substrate). Although the processing steps 600 illustrate exam les of relative dimensions and quantities of various features, aspects of the memory array may be implemented with other relative dimensions or quantities of such features in accordance with examples as disclosed herein.

Operations illustrated in and described with reference to FIGS. 6A through 6F may be performed by a manufacturing system, such as a semiconductor fabrication system configured to perform additive operations such as deposition or bonding, subtractive operations such as etching, trenching, planarizing, or polishing, and supporting operations such as masking, patterning, photolithography, or aligning, among other operations that support the described techniques. In some examples, operations performed by such a manufacturing system may be supported by a process controller or its components as described herein.

Figure 6A:
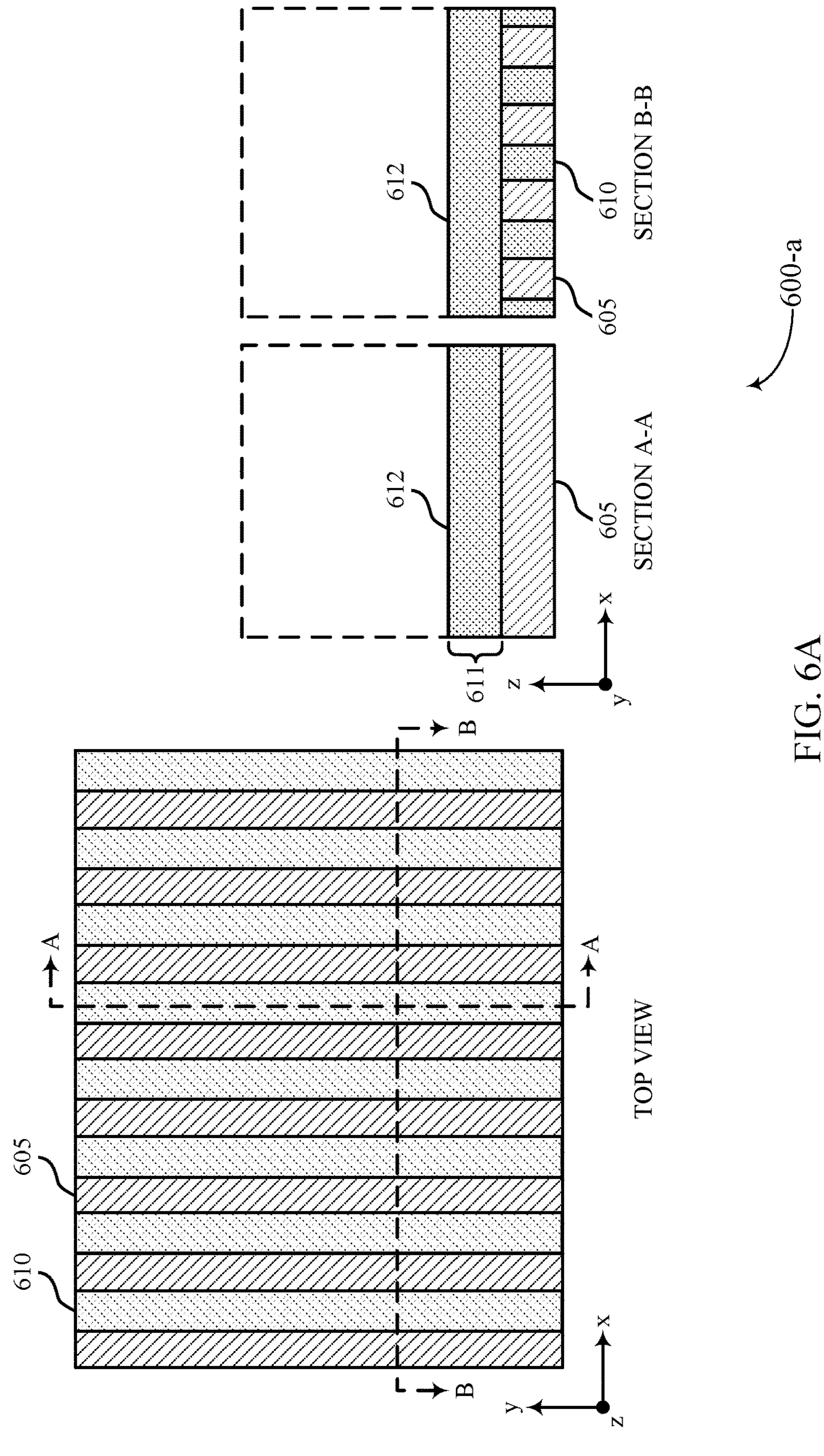
FIGS. 6A, 6B, 6C, 6D, 6E, and 6F illustrate examples of processing steps that support memory array configuration for shared word lines in accordance with examples as disclosed herein.

FIG. 6A illustrates first processing steps 600-*a* for forming a memory array configuration for shared word lines. The first processing steps 600-*a* may include forming digit lines 605 and a redistribution layer 611. Forming the digit lines 605 may include depositing a layer of a conductive material (e.g., tungsten, ruthenium, molybdenum, or another transition metal) in an xy-plane above the substrate or supporting circuitry (e.g., decoding circuitry, control circuitry). Next, forming the digit lines 605 may include forming a mask above (e.g., along the z-direction) the conductive material in an xy-plane, where the mask may be patterned to expose portions of the conductive material. For example, the mask may be patterned to expose alternating portions (e.g., across the x-direction) of the conductive material, each portion extending along the y-direction. In some cases, the mask may be resistant to an etching operation such that the exposed portions of the conductive material may be removed by the etching operation.

Performing the etching operation may form trenches extending to a depth contacting a bottom surface of the layer of conductive material. Further, the trenches may extend along the y-direction and alternate across the x-direction. After performing the etching operation, a dielectric material 610 may be deposited into the trenches. In some examples, the dielectric material 610 may be an oxide material, a nitride material, a silicon material, or any combination thereof. Additionally, the dielectric material 610 and the conductive material may be planarized such that the digit lines 605 and the dielectric material 610 may share a same height along the z-direction. A first material (e.g., dielectric material 612) of a redistribution layer 611 may be deposited in an xy-plane above the digit lines 605 and the dielectric material 610. In some examples, the dielectric material 612 of the redistribution layer 611 may be the same as dielectric material 610, while in other examples it may be a different material (e.g., an oxide material, a nitride material, or any combination thereof). In some implementations, after depositing the dielectric material 612 as part of the redistribution layer 611. the dielectric material 612 may be planarized. The redistribution layer 611 may be omitted from the top view for illustrative clarity.

Figure 6B:
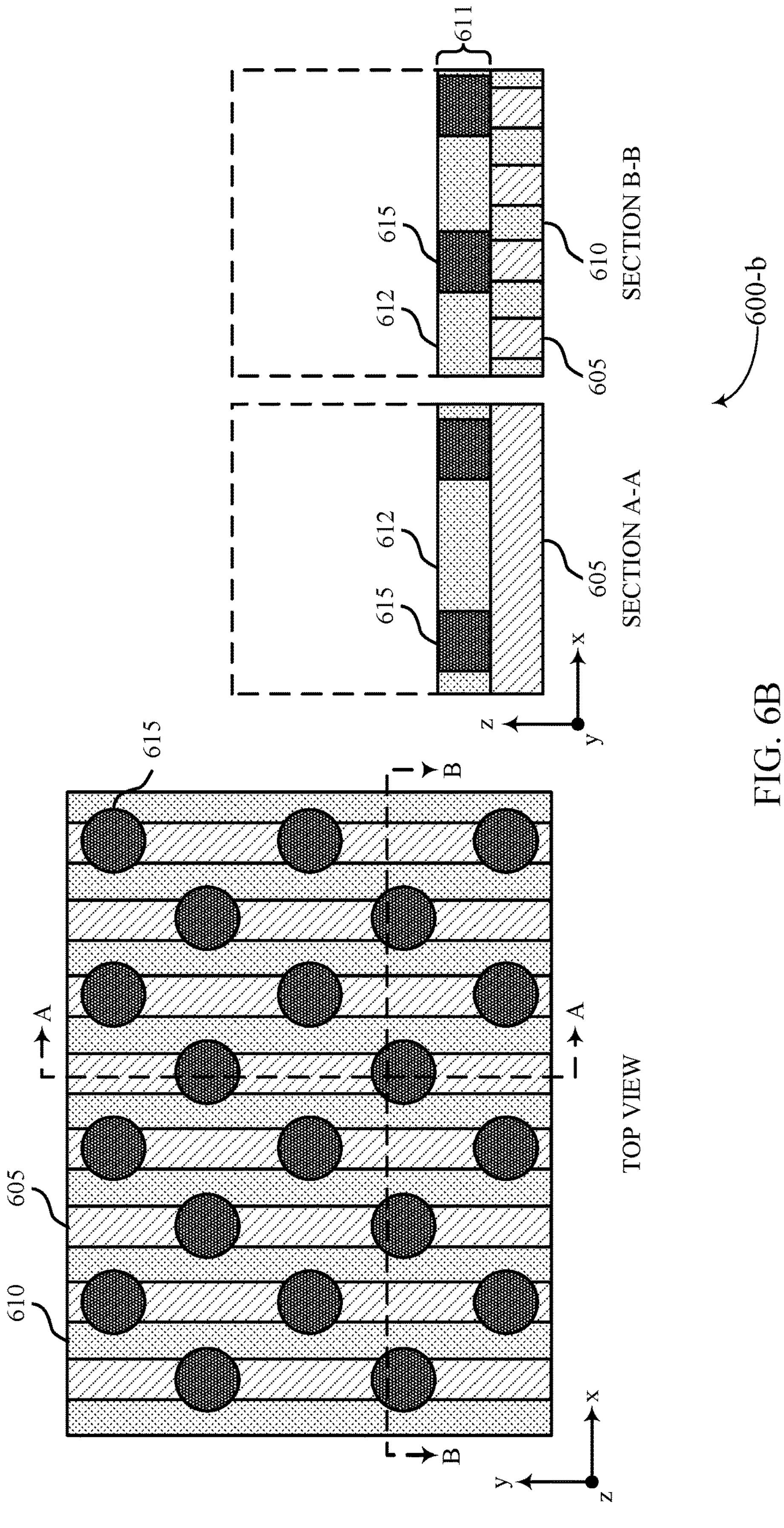

FIG. 6B illustrates second processing steps 600-*b* for forming a memory array configuration for shared word lines. The second processing steps 600-*b* may include forming terminal contacts 615. Forming the terminal contacts 615 may include forming a second mask over (e.g., along the z-direction) the redistribution layer 611 in an xy-plane, where the second mask may be patterned to expose portions of the dielectric material 612. For example, each exposed portion may be centered above a respective digit line 605, such that alternating digit lines 605 may have a similarly staggered patterning of exposed portions above them extending along the y-direction. In some cases, the mask may be resistant to a second etching operation such that the exposed portions of the redistribution layer 611 may be removed by the second etching operation. Performing the second etching operation may form cavities extending to a depth (e.g., along the z-direction contacting the digit lines 605. After performing the second etching operation, the terminal contacts 615 may be deposited into the cavities. In some examples, the terminal contacts 615 may be a conductive material (e.g., polysilicon, tungsten, ruthenium, molybdenum, or another transition metal). In some examples, the terminal contacts 615 may be a same material as the digit lines 605, whereas in other examples, the terminal contacts 615 may not be the same material as the digit lines 605.

Figure 6C:
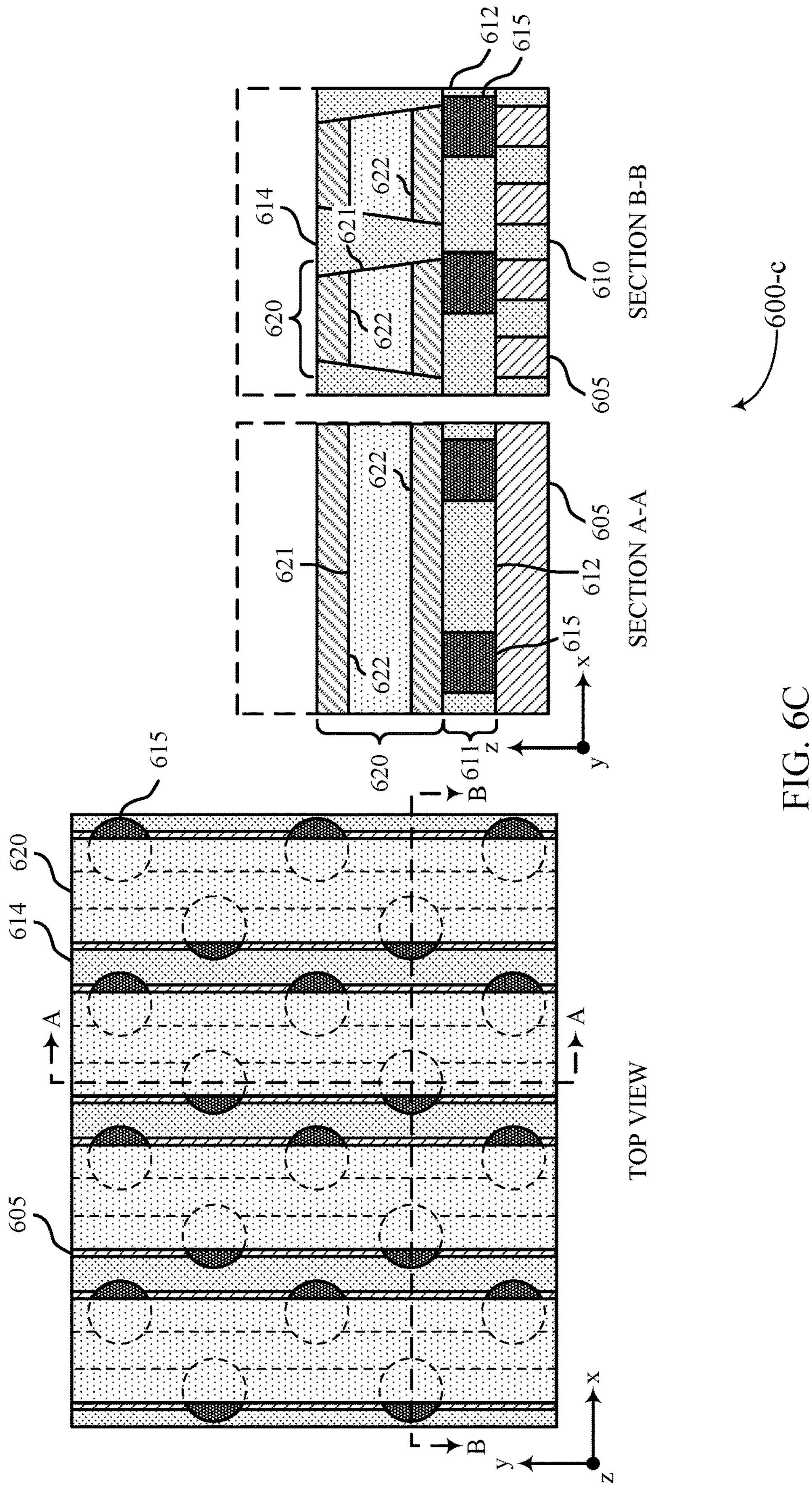

FIG. 6C illustrates third processing steps 600-*c* for forming a memory array configuration for shared word lines. The third processing steps 600-*c* may include forming channels 620. Forming the channels 620 may include depositing a layer of polysilicon material 621 (e.g., a semiconductor material) in an xy-plane above the redistribution layer 611. In some cases, the polysilicon material 621 may be doped via in-situ doping (e.g., or diffusion doping, ion doping) with a dopant (e.g., phosphine, diborane), such that regions 622 at the top and bottom of the polysilicon material 621 may include a relatively high concentration of the dopant (e.g., compared to the polysilicon material 621). After doping the polysilicon material 621, a third mask may be formed above the layer of polysilicon material 621 in an xy-plane, where the third mask may be patterned to expose portions of the polysilicon material 621. For example, the third mask may be patterned to expose alternating portions of the polysilicon material 621 extending along the y-direction. In some implementations, the exposed portions may extend parallel to the digit lines 605. In some cases, the third mask may be resistant to a third etching operation such that the exposed portions of the polysilicon material 621 may be removed by the third etching operation. Performing the third etching operation may form trenches extending to a depth contacting the terminal contacts 615. In some examples, the trenches may form the channels 620 by separating the polysilicon material 621 such that the channels 620 extend along the y-direction and alternate across the x-direction. After performing the third etching operation, a dielectric material 614 may be deposited into the trenches. The dielectric material 614 may be the same as the dielectric material 610. or the dielectric material 614 may be a different dielectric material than the dielectric material 610. The channels 620 and the dielectric material 614 may be planarized such that the channels 620 and the dielectric material 614 may share a same height along the z-direction. The dielectric material 614 may be omitted from the top view for illustrative clarity.

Figure 6D:
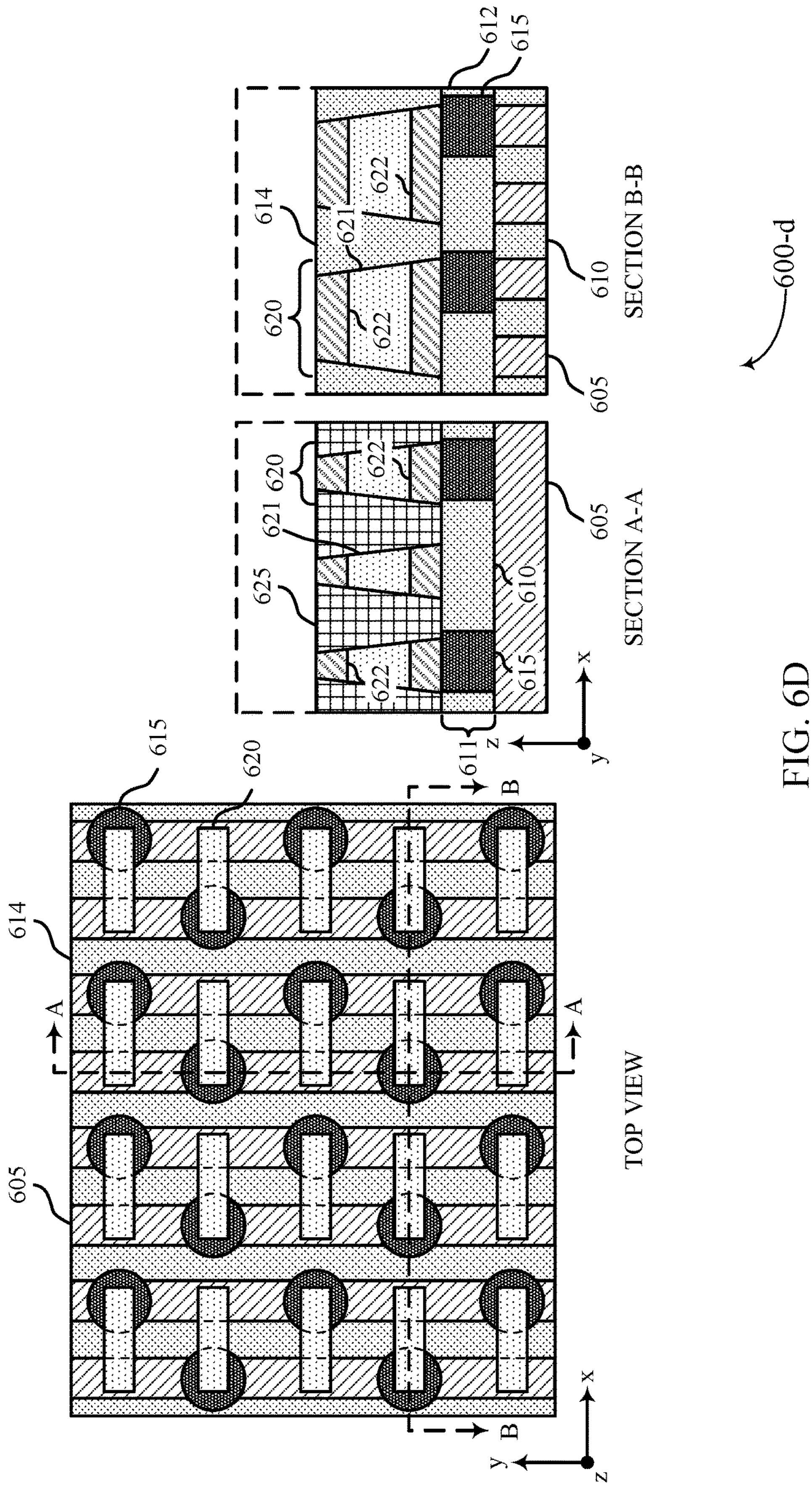

FIG. 6D illustrates fourth processing steps 600-*d* for forming a memory array configuration for shared word lines. The fourth processing steps 600-*d* may include dividing the channels 620 and the dielectric material 614. Dividing the channels 620 may include forming a fourth mask over (e.g., along the z-direction) the channels 620 and the dielectric material 614 in an xy-plane. where the fourth mask may be patterned to expose portions of the channels 620 and the dielectric material 614. For example, the fourth mask may be patterned to expose alternating portions (e.g., strips) of the channels 620 and the dielectric material 614 extending along the x-direction. In some implementations, the exposed portions may extend perpendicular to the channels 620 and the dielectric material 614. In some cases, the fourth mask may be resistant to a fourth etching operation such that the exposed portions of the channels 620 and the dielectric material 614 may be removed by the fourth etching operation. Performing the fourth etching operation may form trenches extending to a depth (e.g., along the z-direction) contacting the redistribution layer 611. In some cases, performing the third etching operation and the fourth etching operation may divide the channels 620 into rows extending along the x-direction and columns extending along the y-direction, where each channel 620 in a respective column of channels 620 is coupled with a respective digit line 605 below the channel 620. In some examples, each column of channels 620 may include channels 620 from alternating rows of channels 620. After performing the fourth etching operation, an oxide material 625 (e.g., silicon oxide) may be deposited into the trenches. Finally, the oxide material 625 may be planarized such that the oxide material 625, the channels 620, and the dielectric material 614 may share a same height along the z-direction. The oxide material 625 may be omitted from the top view for illustrative clarity.

Figure 6E:
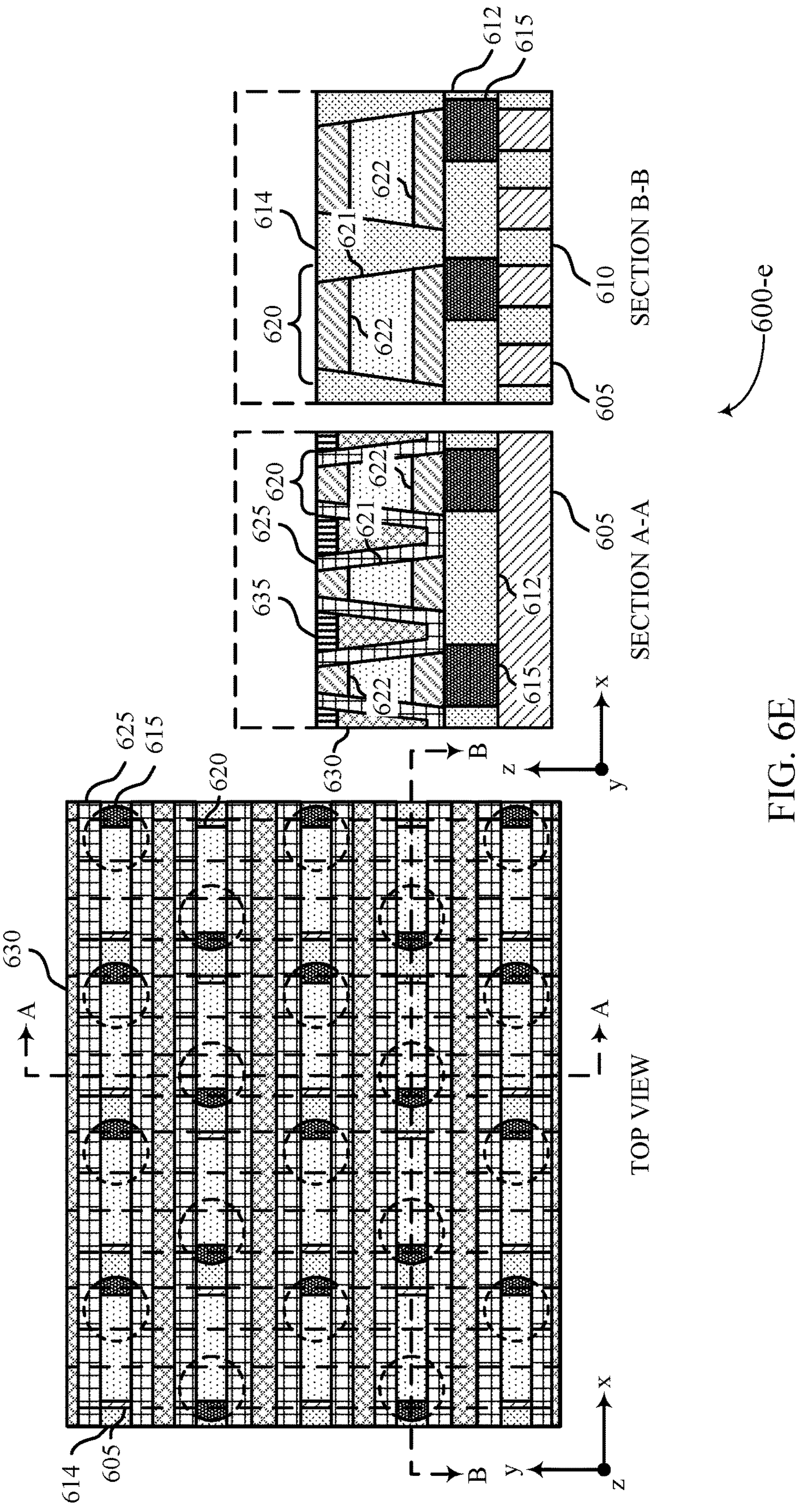

FIG. 6E illustrates fifth processing steps 600-*e* for forming a memory array configuration for shared word lines. The fifth processing steps 600-*e* may include forming word lines 630. Forming the word lines 630 may include performing a fifth etching operation on the oxide material 625. In some cases, performing the fifth etching operation may include etching the oxide material 625 to form trenches through the oxide material 625, such that the oxide material 625 includes sidewalls contacting the channels 620 and the dielectric material 614 and bottom walls contacting the redistribution laver 611 and the terminal contacts 615. In some cases, performing the fifth etching operation may include etching the oxide material 625 from the trenches. In some implementations, a fifth mask may be used to protect portions of the oxide material 625 from the fifth etching operation. In some cases, a liner material (e.g., an oxide) may deposited into the trenches to form an active gate oxide for the channels 620. Additionally, or alternatively, a conductive material (e.g., polysilicon, tungsten, ruthenium, molybdenum, titanium nitride, or another transition metal) may be deposited into the trenches to form the word lines 630. In some cases, the conductive material may be deposited to a height (e.g., in the z-direction) less than a surface of the channels 620, thereby forming shallow trenches above the word lines 630. In other cases, the conductive material may be deposit to a same height as the channels 620, and subjected to an etch operation, such that the conductive material may be a height (e.g., in the z-direction) less than the surface of the channels 620. Finally, an insulating material 635 may be deposited into the shallow trenches and planarized, such that the insulating material 635, the oxide material 625, the channels 620, and the dielectric material 614 may share a same height along the z-direction. In some implementations, the insulating material 635 may be a nitride material, a silicon material, an oxide material (e.g., such as the oxide material 625), or any combination thereof.

In some cases, each word line 630 may be formed between adjacent rows of channels 620. In some such cases, each word line 630 may be coupled with the respective adjacent rows of channels 620. In some examples, forming the word lines 630 may enable the channels 620 to function as transistors, such that each channel 620 may be associated with a respective transistor. In some such examples, the word lines 630 on each side of a channel 620 may form gates of the transistors.

Figure 6F:
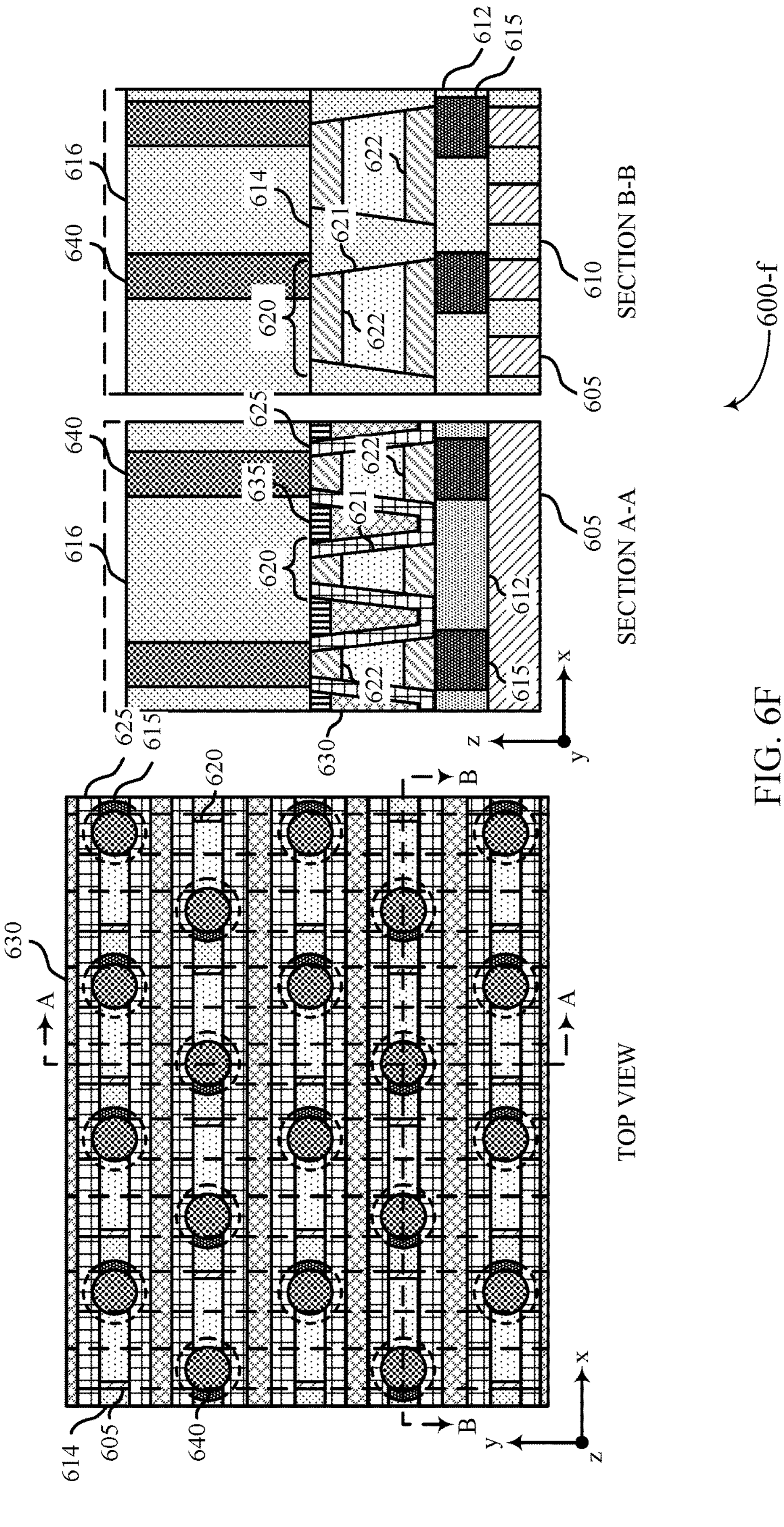

FIG. 6F illustrates sixth processing steps 600-*f* for forming a memory array configuration for shared word lines. The sixth processing steps 600-*f* may include forming electrodes for memory cells 640. In some cases, the memory cells 640 may include STUD capacitors. In such cases, forming the memory cells 640 may include forming electrodes (not shown) above the channels 620. centered above the terminal contacts 615. After forming the electrodes, a memory material (not shown) may be formed around each electrode, where the memory material may form the memory cells. Then, a plate line (not shown) may be formed around the memory material in the shape of a column or pillar extending along the z-direction. In other cases, the memory cells 640 may include container capacitors. In such cases, forming the memory cells 640 may include forming plate lines above the channels 620, centered above the terminal contacts 615, where the plate lines include an inner space. A dielectric material 616 may be used to fill between the memory cells 640. In some examples, the plate lines may be formed in the shape of a column of pillar extending along the z-direction. After forming the plate lines, memory material may be formed in the inner space such that the memory material may include an additional inner space. Then, an electrode may be formed in the additional inner space.

In some cases, forming the memory array as described herein may enable shared word lines to be implemented in the memory array. For example, each word line 630 may be shared by two respective rows of transistors (e.g., the channels 620), such that activating the word line 630 may activate each transistor in the respective rows of transistors. However, because each digit line 605 is coupled with a respective transistor (e.g., via the terminal contacts 615) in alternating rows of transistors, activating a digit line 605 in tandem with the word line 630 may activate a singular respective transistor. In some cases, activating the singular respective transistor may enable access operations to be performed on the memory cells associated with the respective transistor. Therefore, the memory array may support accessing memory cells using shared word lines in the configuration as described herein.

FIG. 7A through 7F illustrate examples of processing steps 700 that support memory array configuration for shared word lines in accordance with examples as disclosed herein. The processing steps 700 may illustrate aspects of a sequence of manufacturing operations for fabricating aspects of a memory array 300-*a*, 300-*b*, 300-*c*, or a memory array 400, as described with reference to FIGS. 3A, 3B, 3C, and 4, respectively. In some cases, the memory array may implement aspects of the memory array described with reference to FIGS. 6A through 6F. For illustrative purposes, aspects of the memory array may be described with reference to an x-direction (e.g., a first direction), a y-direction (e.g., a second direction), and/or a z-direction (e.g., a third direction) of the illustrated coordinate system. For example, the processing steps 700 may illustrate various cross-sectional views of the memory array in an xz-plane. In some examples, the z-direction may be illustrative of a direction (e.g., a laver direction) orthogonal to a surface of a substrate (e.g., a surface in an xy-plane, a surface upon or over which other materials may be deposited), and each of the related regions, illustrated by their respective cross section in the xz-plane, may extend for some distance along the y-direction (e.g., above or on the substrate). Although the processing steps 700 illustrate examples of relative dimensions and quantities of various features, aspects of the memory array may be implemented with other relative dimensions or quantities of such features in accordance with examples as disclosed herein.

Operations illustrated in and described with reference to FIGS. 7A through 7F may be performed by a manufacturing system, such as a semiconductor fabrication system configured to perform additive operations such as deposition or bonding, subtractive operations such as etching, trenching, planarizing, or polishing, and supporting operations such as masking, patterning, photolithography, or aligning, among other operations that support the described techniques. In some examples, operations performed by such a manufacturing system may be supported by a process controller or its components as described herein.

Figure 7A:
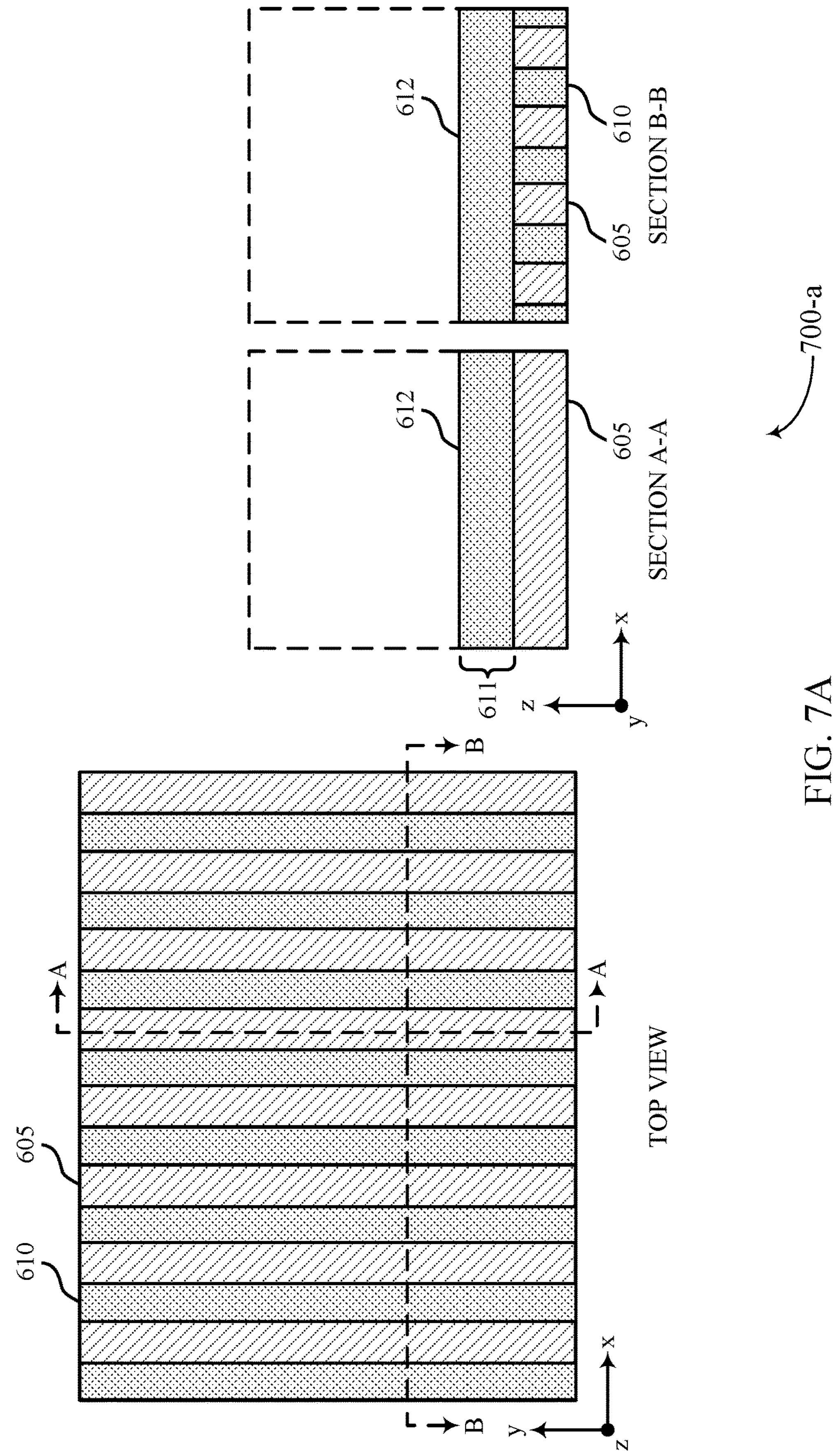
FIGS. 7A, 7B, 7C, 7D, 7E, and 7F illustrate examples of processing steps that support memory array configuration for shared word lines in accordance with examples as disclosed herein.

FIG. 7A illustrates first processing steps 700-*a* for forming a memory array configuration for shared word lines. The first processing steps 700-*a* may include forming digit lines 605. Forming the digit lines 605 may include depositing a layer of a conductive material in an xy-plane above the substrate or supporting circuitry (e.g., decoding circuitry, control circuitry). Next, forming the digit lines 605 may include forming a mask over (e.g., along the z-direction) the conductive material in an xy-plane, where the mask may be patterned to expose portions of the conductive material. For example, the mask may be patterned to expose alternating portions (e.g., across the x-direction) of the conductive material, each portion extending along the y-direction. In some cases, the mask may be resistant to an etching operation such that the exposed portions of the conductive material may be removed by the etching operation.

Performing the etching operation may form trenches extending to a depth contacting a bottom surface of the laver of conductive material. Further, the trenches may extend along the y-direction and alternate across the x-direction. After performing the etching operation, a dielectric material 610 may be deposited into the trenches. Additionally, the dielectric material 610 and the conductive material may be planarized such that the digit lines 605 and the dielectric material 610 may share a same height along the z-direction. A dielectric material 612 may be deposited in an xy-plane above the digit lines 605 and the dielectric material 610. The dielectric material 612 may be an oxide material, a nitride material, or any combination thereof. In some examples, the dielectric material 612 may be the same as the dielectric material 610. In other mines, the dielectric material 612 may be different from the dielectric material 610. After depositing the dielectric material 612, the dielectric material 612 may be planarized. The dielectric material 612 may be omitted from the top view for illustrative clarity. The dielectric material 612 may be part of a redistribution laver 611.

Figure 7B:
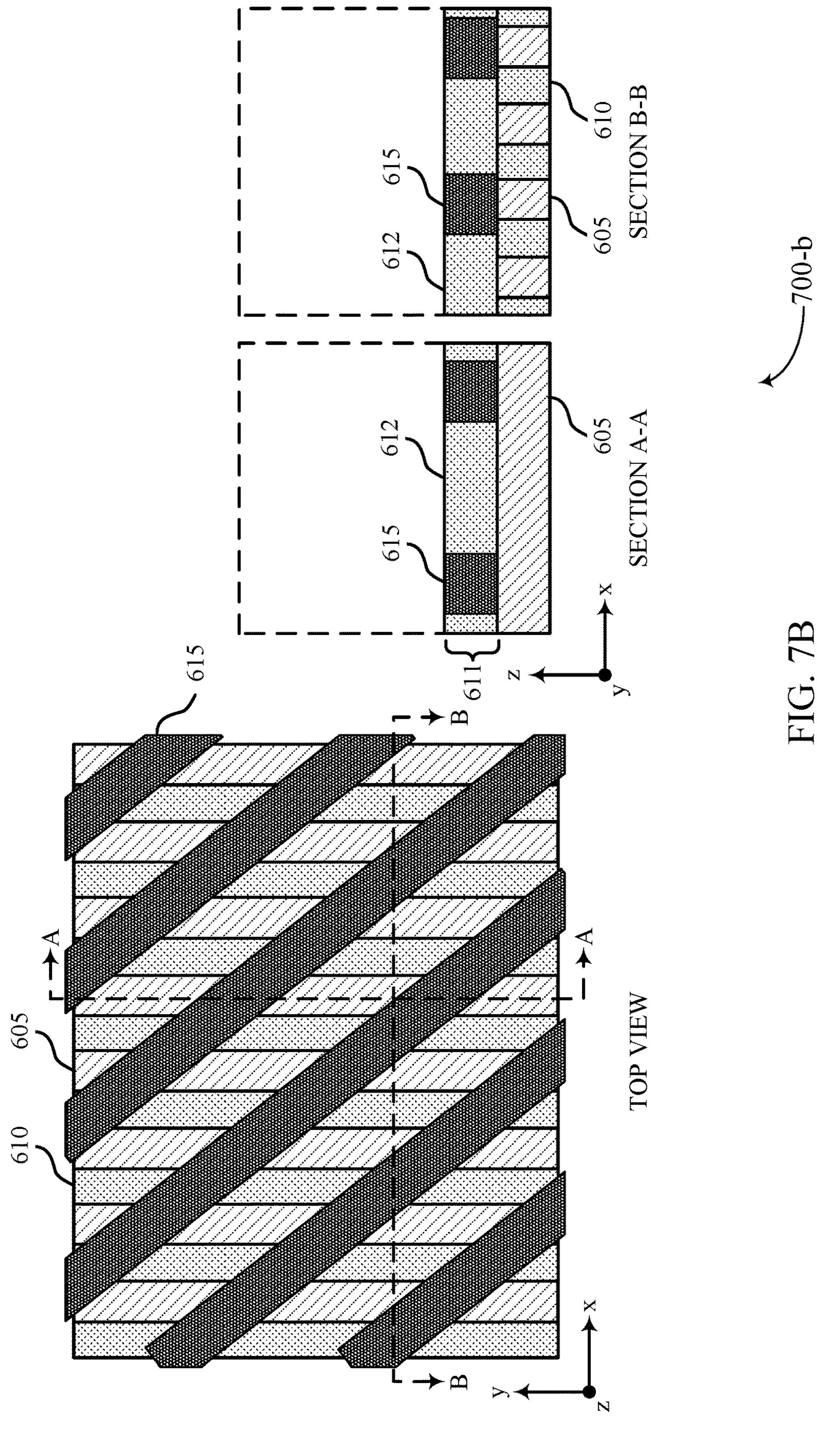

FIG. 7B illustrates second processing steps 700-*b* for forming a memory array configuration for shared word lines. The second processing steps 700-*b* may include forming terminal contacts 615. Forming the terminal contacts 615 may include forming a second mask over (e.g., along the z-direction) the redistribution laver 611 in an xy-plane. where the second mask may be patterned to expose portions of the dielectric material 612. For example, the second mask may be patterned to expose alternating portions of the dielectric material 612, each portion extending along a diagonal direction (e.g., a fourth direction between the x-direction and the y-direction) in the xy-plane. In some cases, the mask may be resistant to a second etching operation such that the exposed portions of the redistribution laver 611 may be removed by the second etching operation. Performing the second etching operation may form trenches extending to a depth (e.g., along the z-direction) contacting the digit lines 605. After performing the second etching operation, the terminal contacts 615 may be deposited into the trenches. In some examples, the terminal contacts 615 may be a conductive material (e.g., polysilicon, tungsten, ruthenium, molybdenum, or another transition metal). In some examples, the terminal contacts 615 may be a same material as the digit lines 605, whereas in other examples, the terminal contacts 615 may not be the same material as the digit lines 605.

Figure 7C:
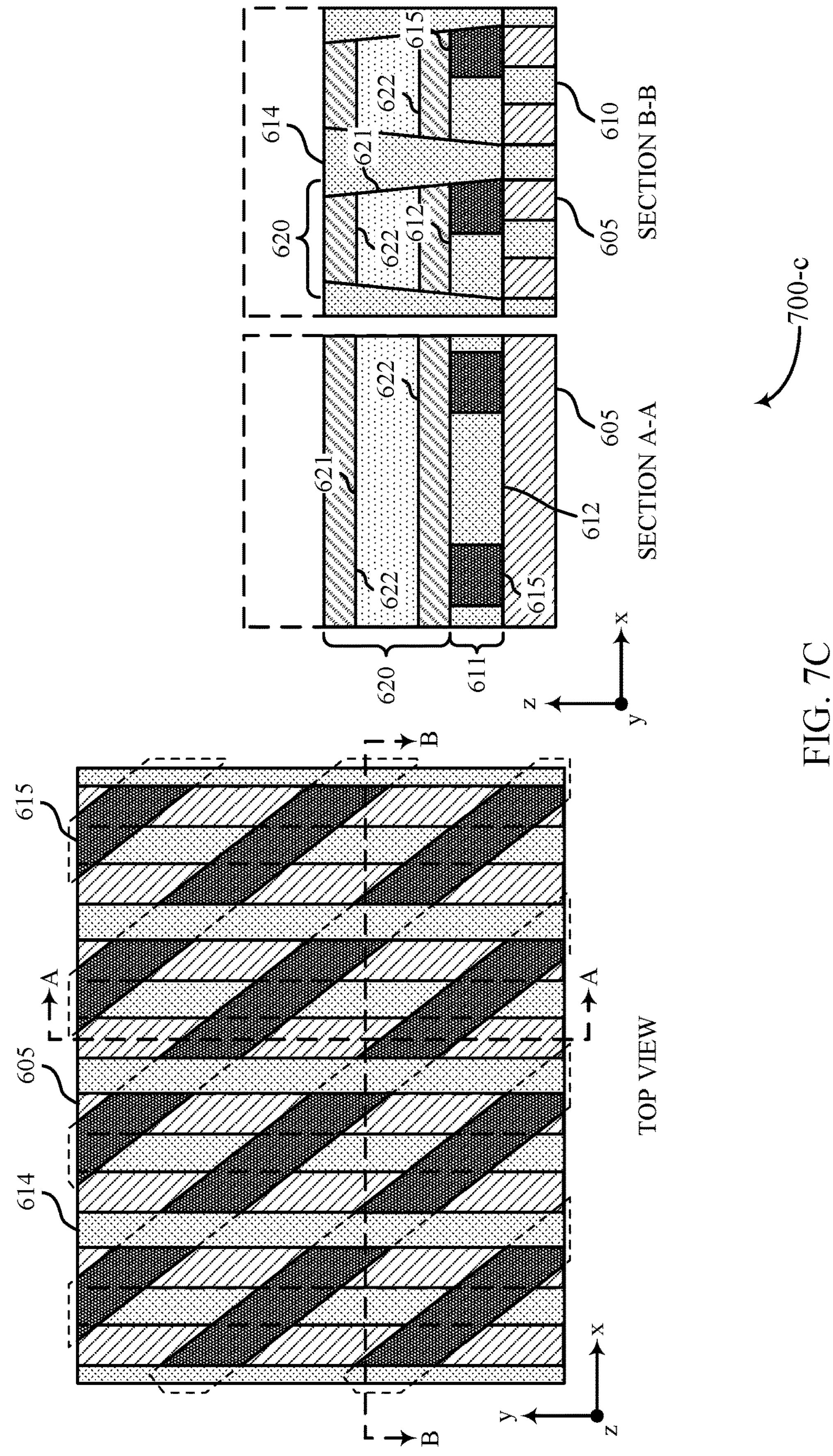

FIG. 7C illustrates third processing steps 700-*c* for forming a memory array configuration for shared word lines. The third processing steps 700-*c* may include forming channels 620. Forming the channels 620 may include depositing a laver of polysilicon material 621 (e.g., a semiconductor material) in an xy-plane above the redistribution layer 611. In some cases, the polysilicon material 621 may be doped via in-situ doping with a dopant (e.g., phosphine, diborane), such that regions 622 at the top and bottom of the polysilicon material 621 may include a relatively high concentration of the dopant (e.g., compared to the polysilicon material 621). After doping the polysilicon material 621, a third mask may be formed above the layer of polysilicon material 621 in an xy-plane, where the third mask may be patterned to expose portions of the polysilicon material 621. For example, the third mask may be patterned to expose direction. In some implementations, the exposed portions may extend parallel to the digit lines 605. In some cases, the third mask may be resistant to a third etching operation such that the exposed portions of the polysilicon material 621 may be removed bv the third etching operation. Performing the third etching operation may form trenches extending to a depth contacting the digit lines 605. For example, the etching operation may remove portions of the redistribution laver 611 and the terminal contacts 615. In some examples, the trenches may form the channels 620 by separating the polysilicon material 621 such that the channels 620 extend along the y-direction and alternate across the x-direction. After performing the third etching operation, the dielectric material 614 may be deposited into the trenches. The dielectric material 614 may be the same as the dielectric material 610, or, in some examples, the trenches may be filled with a different dielectric material (e.g., an oxide material a nitride material a silicon material, or any combination thereof) than the dielectric material 610. Finally, the channels 620 and the dielectric material 614 may be planarized such that the channels 620 and the dielectric material 614 may share a same height along the z-direction. The dielectric material 614 may be omitted from the top view for illustrative clarity.

Figure 7D:
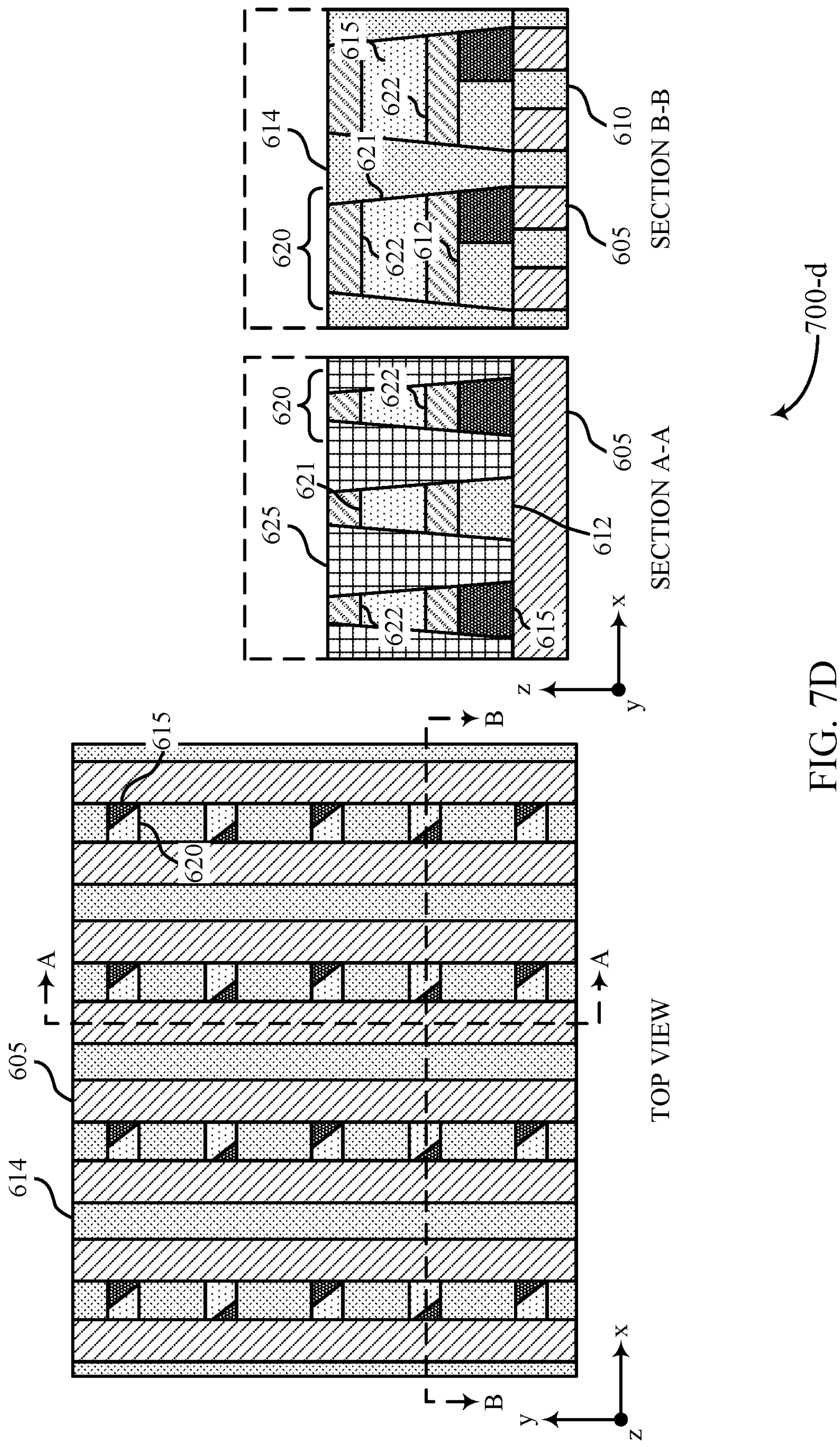

FIG. 7D illustrates fourth processing steps 700-*d* for forming a memory array configuration for shared word lines. The fourth processing steps 700-*d* may include dividing the channels 620. Dividing the channels 620 may include forming a fourth mask over (e.g., along the z-direction) the channels 620, the redistribution layer 611, the terminal contacts 615, and the dielectric material 614 in an xy-plane, where the fourth mask may be patterned to expose portions of the channels 620, the redistribution laver 611, the terminal contacts 615, and the dielectric material 614. For example, the fourth mask may be patterned to expose alternating portions (e.g., strips) of the channels 620, the redistribution laver 611, the terminal contacts 615, and the dielectric material 614 extending along the x-direction. In some implementations, the exposed portions may extend perpendicular to the channels 620. In some cases, the fourth mask may be resistant to a fourth etching operation such that the exposed portions of the channels 620, the redistribution layer 611, the terminal contacts 615, and the dielectric material 614 may be removed by the fourth etching operation. Performing the fourth etching operation may form trenches extending to a depth (e.g., along the z-direction) contacting the digit lines 605. In some cases, performing the third etching operation and the fourth etching operation may divide the channels 620 into rows extending along the x-direction and columns extending along the y-direction, where each channel 620 in a respective column of channels 620 is coupled with a respective digit line 605 below the channel 620. In some examples, each column of channels 620 may include channels 620 from alternating rows of channels 620. In some cases, performing the third etching operation and the fourth etching operation may form an array of the terminal contacts 615, where each terminal contact 615 is coupled with alternating channels 620 along a digit line 605. Further, the terminal contacts 615 may be shaped similar to a right trapezoid. After performing the fourth etching operation, an oxide material 625 (e.g., silicon oxide) may be deposited into the trenches. Finally, the oxide material 625 may be planarized such that the oxide material 625, the channels 620, and the dielectric material 614 may share a same height along the z-direction. The oxide material 625 may be omitted from the top view for illustrative clarity.

FIG. 7E illustrates fifth processing steps 700-*e* for forming a memory array configuration for shared word lines. The fifth processing steps 700-*e* may include forming word lines 630. Forming the word lines 630 may include performing a fifth etching operation on the oxide material 625. In some cases, performing the fifth etching operation may include etching the oxide material 625 to form trenches through the oxide material 625, such that the oxide material 625 includes sidewalls contacting the channels 620, the redistribution layer 611, the terminal contacts 615, and the dielectric material 614 and bottom walls contacting the dielectric material 610 and the digit lines 605. In some cases. performing the fifth etching operation may include etching the oxide material 625 from the trenches. In some implementations, a fifth mask may be used to protect portions of the oxide material 625 from the fifth etching operation. In some cases. a liner material (e.g., an oxide) may deposited into the trenches to form an active gate oxide for the channels 620. Additionally, or alternatively, a conductive material (e.g., polysilicon, tungsten, ruthenium, molybdenum, titanium nitride, or another transition metal) may be deposited into the trenches to form the word lines 630. In some cases, the conductive material may be deposited to a height (e.g., in the z-direction) less than a surface of the channels 620, thereby forming shallow trenches above the word lines 630. In other cases, the conductive material may be deposit to a same height as the channels 620, and subjected to an etch operation, such that the conductive material may be a height (e.g., in the z-direction) less than the surface of the channels 620. Finally, an insulating material 635 may be deposited into the shallow trenches and planarized. such that the insulating material 635, the oxide material 625, the channels 620, and the dielectric material 610 may share a same height along the z-direction. In some implementations, the insulating material 635 may be a nitride material, a silicon material, an oxide material (e.g., such as the oxide material 625), or any combination thereof.

In some cases, each word line 630 may be formed between adjacent rows of channels 620. In some such cases, each word line 630 may be coupled with the respective adjacent rows of channels 620. In some examples, forming the word lines 630 may enable the channels 620 to function as transistors, such that each channel 620 may be associated with a respective transistor. In some such examples, the word lines 630 on each side of a channel 620 may form gates of the transistors.

Figure 7F:
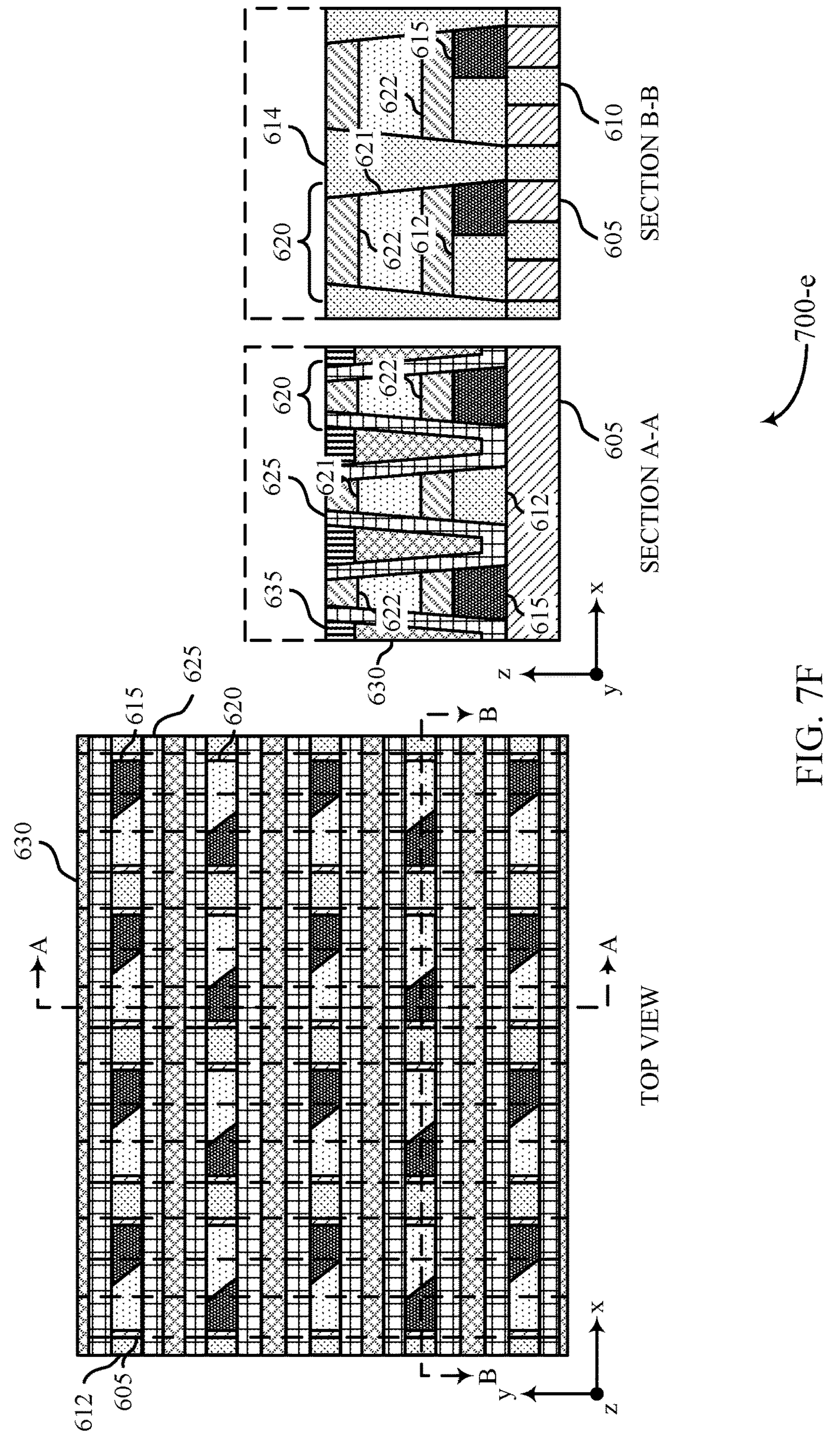
Figure 7G:
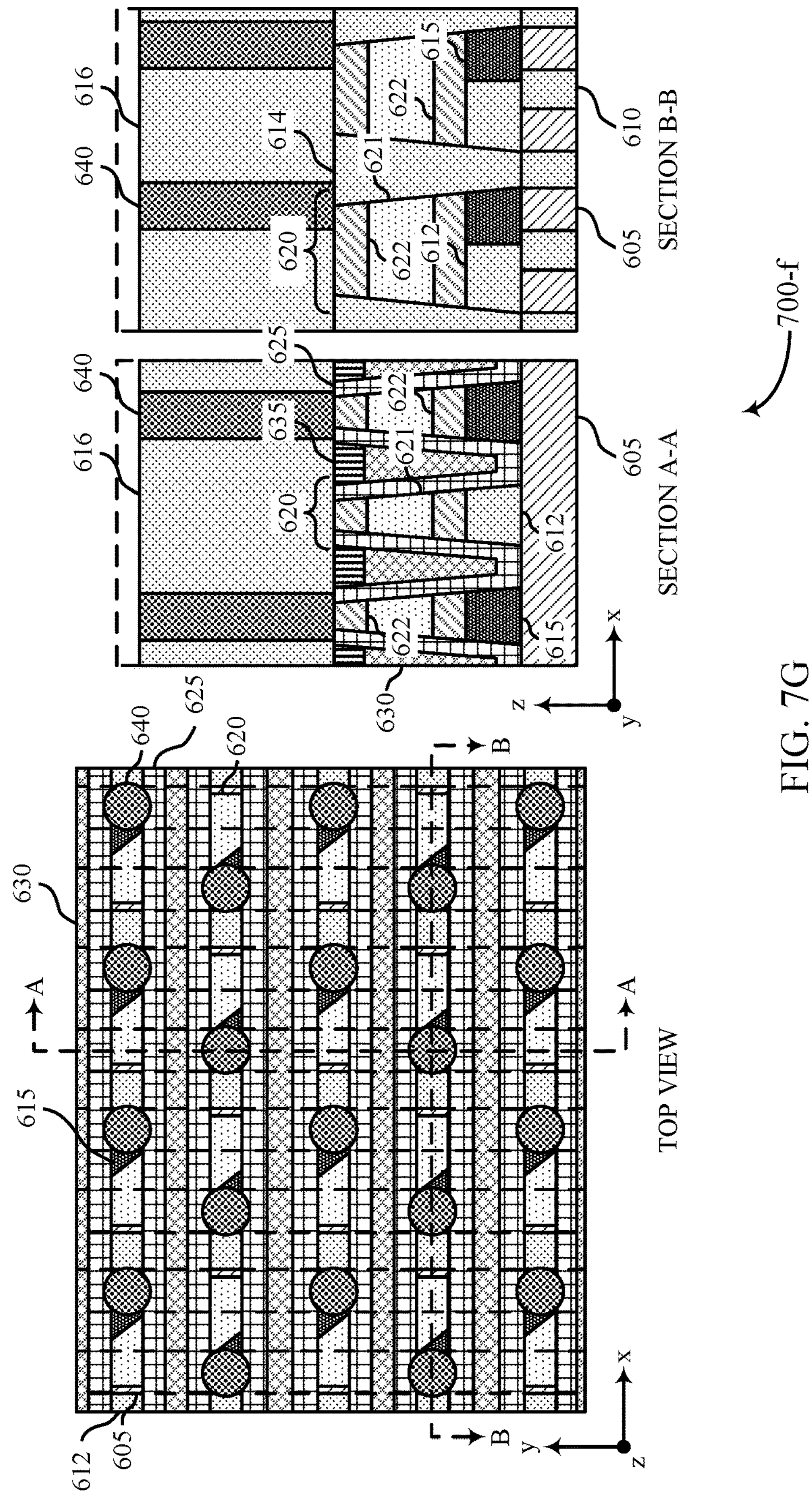

FIG. 7F illustrates sixth processing steps 700-*f* for forming a memory array configuration for shared word lines. The sixth processing steps 700-*f* may include forming memory cells 640. In some cases, the memory cells 640 may include STUD capacitors. In such cases, forming the memory cells 640 may include forming electrodes (not shown) above the channels 620, centered above the terminal contacts 615. After forming the electrodes, memory material (not shown) may be formed around each electrode, where the memory material may form the memory cells 640. Then, a plate line (not shown) may be formed around the memory material in the shape of a column or pillar extending along the z-direction. In other cases, the memory cells may include container capacitors. In such cases, forming the memory cells 640 may include forming plate lines above the channels 620, centered above the terminal contacts 615, where the plate lines include an inner space, In some examples, the plate lines may be formed in the shape of a column of pillar extending along the z-direction. After forming the plate lines, memory material may be formed in the inner space such that the memory material may include an additional inner space. Then, an electrode may be formed in the additional inner space. A dielectric material 616 may be used to separate the memory cells 640.

In some cases, forming the memory array as described herein may enable shared word lines to be implemented in the memory array. For example, each word line 630 may be shared bv two respective rows of transistors (e.g., the channels 620), such that activating the word line 630 may activate each transistor in the respective rows of transistors. However, because each digit line 605 is coupled with a respective transistor (e.g., via the terminal contacts 615) in alternating rows of transistors, activating a digit line 605 in tandem with the word line 630 may activate a singular respective transistor. In some cases, activating the singular respective transistor may enable access operations to be performed on the memory cells associated with the respective transistor. Therefore, the memory array may support accessing memory cells using shared word lines in the configuration as described herein.

FIG. 8A through 8E illustrate examples of processing steps 800 that support memory array configuration for shared word lines in accordance with examples as disclosed herein. The processing steps 800 may illustrate aspects of a sequence of manufacturing operations for fabricating aspects of a memory array 300-*a*. 300-*b*. 300-*c* or a memory array 400, as described with reference to FIGS. 3A, 3B, 3C, and 4, respectively. In some cases, the memory array may implement aspects of the memory array described with reference to FIGS. 6A through 6F. For illustrative purposes, aspects of the memory array may be described with reference to an x-direction (e.g., a first direction a y-direction (e.g., a second direction), and/or a z-direction (e.g., a third direction) of the illustrated coordinate system. For example, the processing steps 800 may illustrate various cross-sectional views of the memory array in an xz-plane. In some examples, the z-direction may be illustrative of a direction (e.g., a layer direction orthogonal to a surface of a substrate (e.g., a surface in an xy-plane, a surface upon or over which other materials may be deposited), and each of the related regions, illustrated by their respective cross section in the xz-plane, may extend for some distance along the y-direction (e.g., above or on the substrate). Although the processing steps 800 illustrate examples of relative dimensions and quantities of various features, aspects of the memory array may be implemented with other relative dimensions or quantities of such features in accordance with examples as disclosed herein.

Operations illustrated in and described with reference to FIGS. 8A through 8E may be performed by a manufacturing system, such as a semiconductor fabrication system configured to perform additive operations such as deposition or bonding, subtractive operations such as etching, trenching, planarizing, or polishing, and supporting operations such as masking, patterning, photolithography, or aligning, among other operations that support the described techniques. In some examples operations performed by such a manufacturing system may be supported by a process controller or its components as described herein.

Figure 8A:
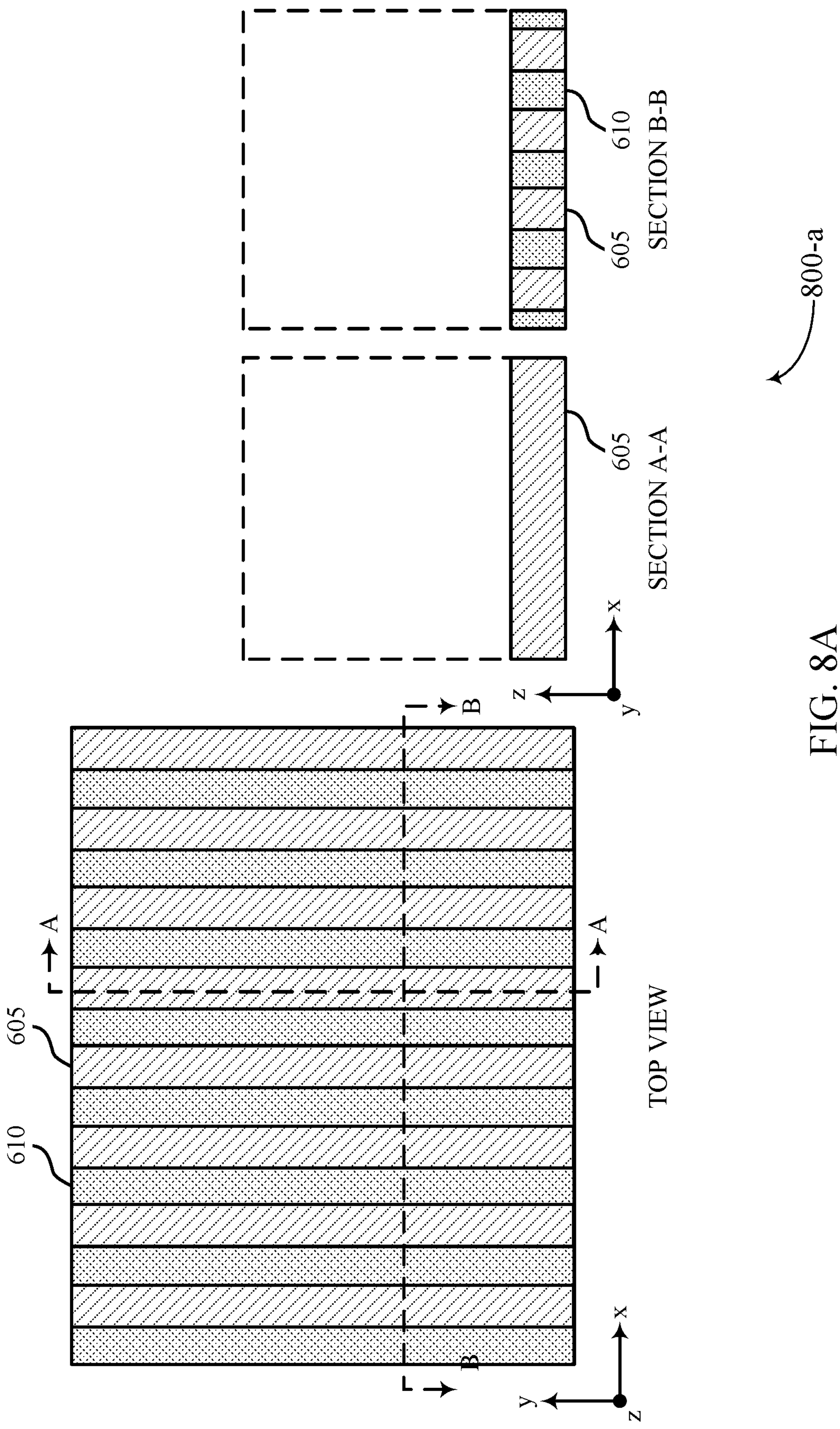
FIGS. 8A, 8B, 8C, 8D, and 8E illustrate examples of processing steps that support memory array configuration for shared word lines in accordance with examples as disclosed herein.

FIG. 8A illustrates first processing steps 800-*a* for forming a memory array configuration for shared word lines. The first processing steps 800-*a* may include forming digit lines 605. Forming the digit lines 605 may include depositing a layer of a conductive material in an xy-plane above the substrate or supporting circuitry (e.g., decoding circuit control circuit. Next, forming the digit lines 605 may include forming a mask over (e.g., along the z-direction) the conductive material in an xy-plane, where the mask may be patterned to expose portions of the conductive material. For example, the mask may be patterned to expose alternating portions (e.g., across the x-direction) of the conductive material, each portion extending along the y-direction. In some cases. the mask may be resistant to an etching operation such that the exposed portions of the conductive material may be removed by the etching operation.

Performing the etching operation may form trenches extending to a depth contacting a bottom surface of the layer of conductive material. Further, the trenches may extend along the y-direction and alternate across the x-direction. After performing the etching operation, a dielectric material 610 may be deposited into the trenches. Additionally, the dielectric material 610 and the conductive material may be planarized such that the digit lines 605 and the dielectric material 610 may share a same height along the z-direction.

Figure 8B:
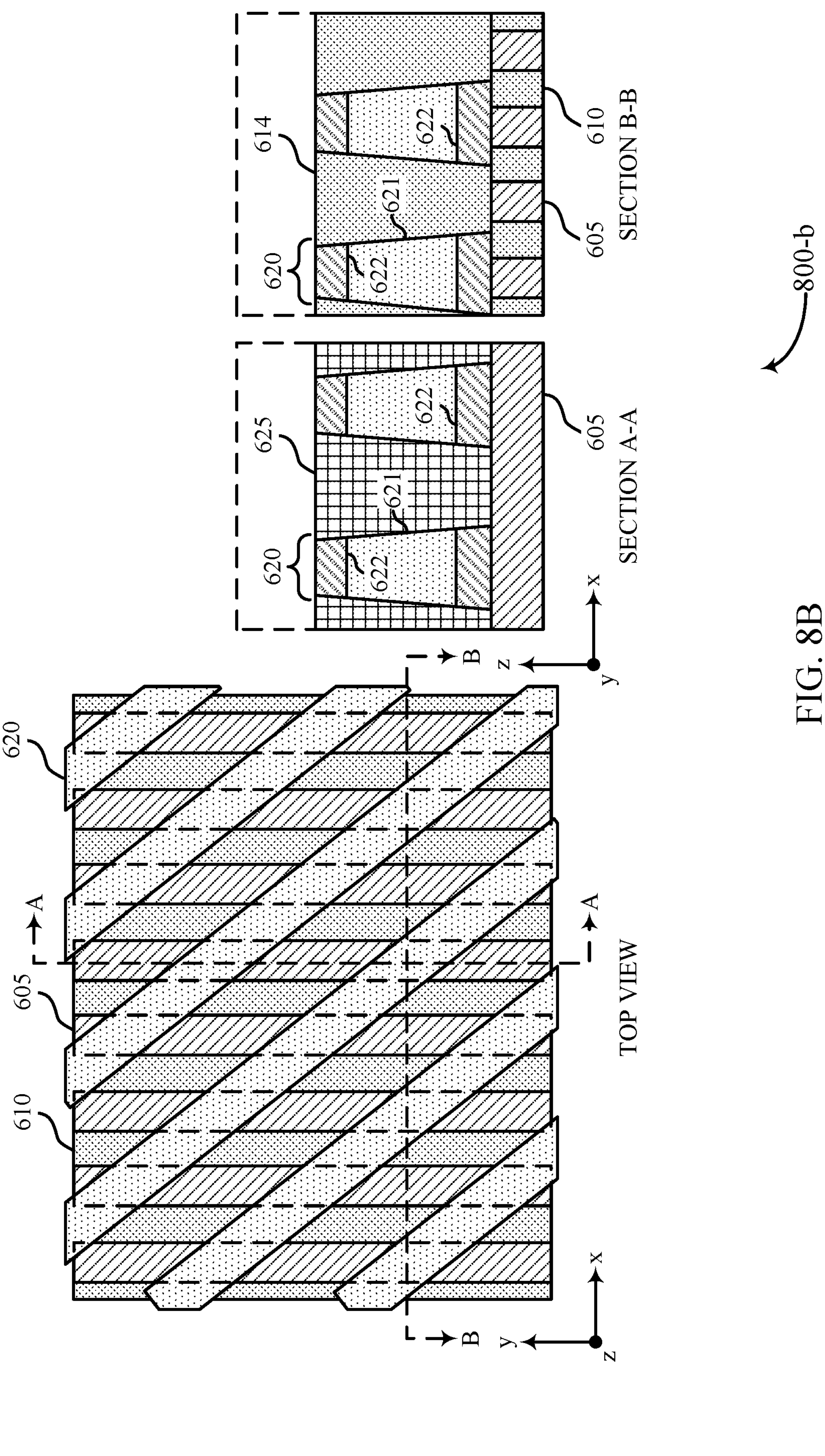

FIG. 8B illustrates second processing steps 800-*b* for forming a memory array configuration for shared word lines. The second processing steps 800-*b* may include forming channels 620. Forming the channels 620 may include depositing a layer of polysilicon material 621 (e.g., a semiconductor material) in an xy-plane above the digit lines 605 and the dielectric material 610. In some cases, the polysilicon material 621 may be doped via in-situ doping with a dopant (e.g., phosphine, diborane), such that regions 622 at the top and bottom of the polysilicon material 621 may include a relatively high concentration of the dopant (e.g., compared to the polysilicon material 621). After doping the polysilicon material 621, a third mask may be formed above the layer of polysilicon material 621 in an xy-plane, where the third mask may be patterned to expose portions of the polysilicon material 621. For example, the second mask may be patterned to expose alternating portions of the polysilicon material 621, each portion extending along a diagonal direction (e.g., a fourth direction between the x-direction and the y-direction) in the xy-plane. In some cases, the third mask may be resistant to a third etching operation such that the exposed portions of the polysilicon material 621 may be removed by the third etching operation. Performing the third etching operation may form trenches extending to a depth contacting the digit lines 605. In some examples, the trenches may form the channels 620 by separating the polysilicon material 621 such that the channels 620 extend along the diagonal direction and alternate across the memory array. After performing the third etching operation, a dielectric material 614 may be deposited into the trenches. The dielectric material 614 may be the same as the dielectric material 610, or, in some examples, the dielectric material 614 may be different from the dielectric material 610. The channels 620 and the dielectric material 614 may be planarized such that the channels 620 and the dielectric material 614 may share a same height along the z-direction. The dielectric material 614 may be omitted from the top view for illustrative clarity.

Figure 8C:
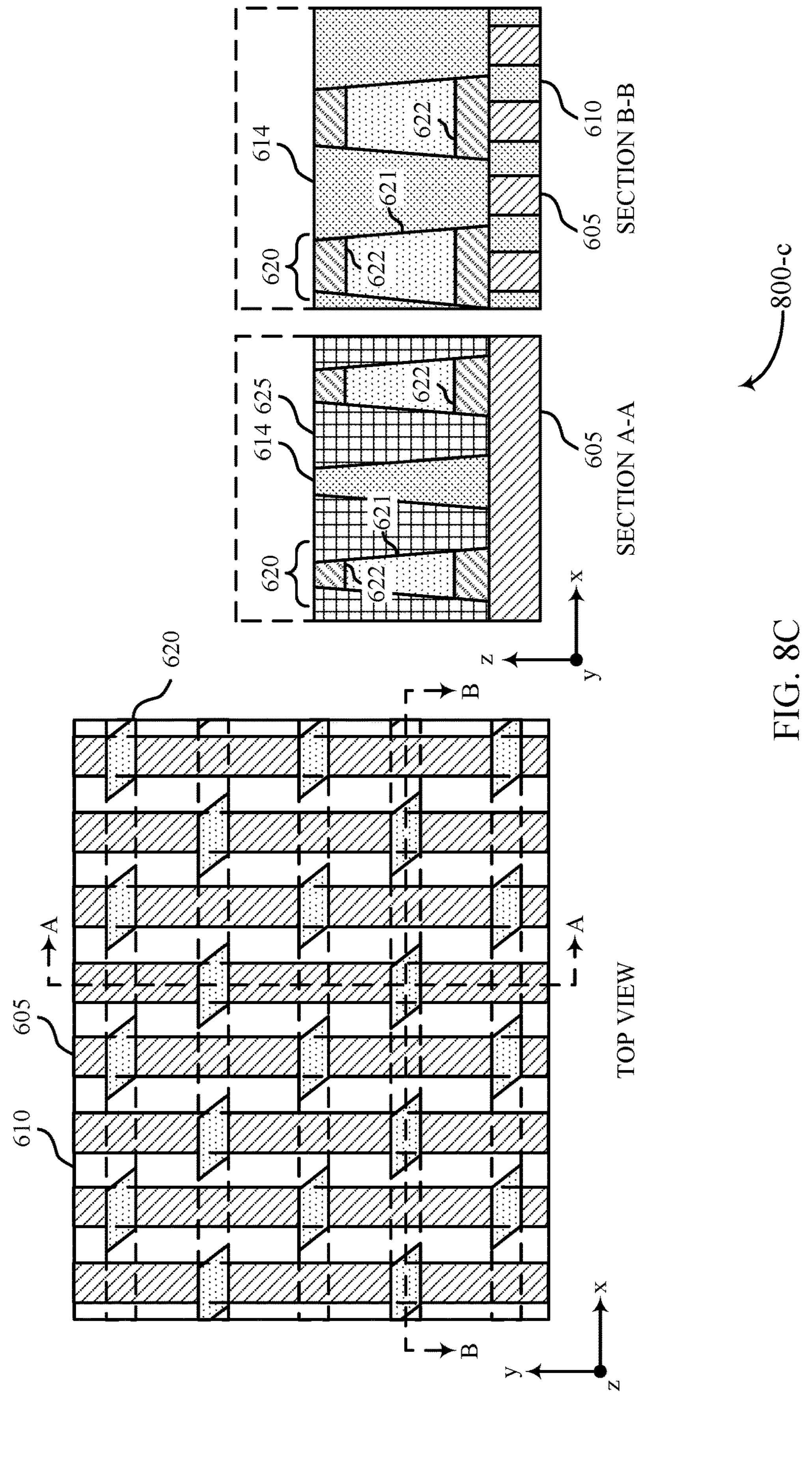

FIG. 8C illustrates third processing steps 800-*c* for forming a memory array configuration for shared word lines. The third processing steps 800-*c* may include dividing the channels 620. Dividing the channels 620 may include forming a fourth mask over (e.g., along the z-direction) the channels 620 and the dielectric material 610 in an xy-plane, where the fourth mask may be patterned to expose portions of the channels 620 and the dielectric material 610. For example, the fourth mask may be patterned to expose alternating portions (e.g., strips) of the channels 620 and the dielectric material 610 extending along the x-direction. In some implementations, the exposed portions may extend perpendicular to the digit lines 605. In some cases, the fourth mask may be resistant to a fourth etching operation such that the exposed portions of the channels 620 and the dielectric material 614 may be removed by the fourth etching operation. Performing the fourth etching operation may form trenches extending to a depth (e.g., along the z-direction) contacting the digit lines 605. In some cases, performing the third etching operation and the fourth etching operation may divide the channels 620 into rows extending along the x-direction and columns extending along the y-direction, where each channel 620 in a respective column of channels 620 is coupled with a respective digit line 605 below the channel 620. In some examples, each column of channels 620 may include channels 620 from alternating rows of channels 620. After performing the fourth etching operation, an oxide material 625 (e.g., silicon oxide) may be deposited into the trenches. Finally the oxide material 625 may be planarized such that the oxide material 625, the channels 620, and the dielectric material 614 may share a same height along the z-direction. The oxide material 625 may be omitted from the top view for illustrative clarity.

Figure 8D:
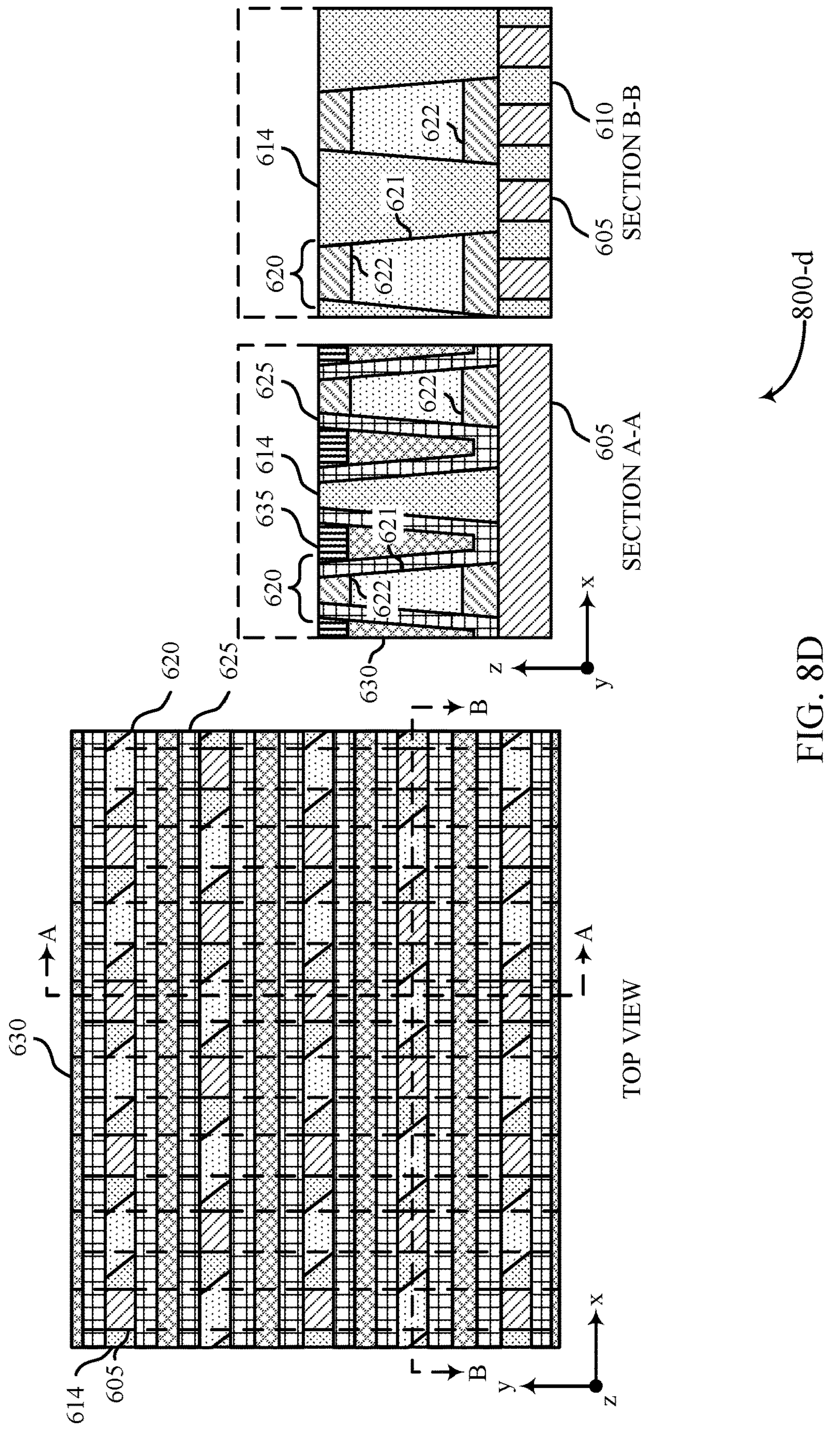

FIG. 8D illustrates fourth processing steps 800-*d* for forming a memory array configuration for shared word lines. The fourth processing steps 800-*d* may include forming word lines 630. Forming the word lines 630 may include performing a fifth etching operation on the oxide material 625. In some cases, performing the fifth etching operation may include etching the oxide material 625 to form trenches through the oxide material 625, such that the oxide material 625 includes sidewalls contacting the channels 620 and the dielectric material 614 and bottom walls contacting the dielectric material 610 and the digit lines 605. In some cases, performing the fifth etching operation may include etching the oxide material 625 from the trenches. In some implementations, a fifth mask may be used to protect portions of the oxide material 625 from the fifth etching operation. In some cases, a liner material (e.g., an oxide) may deposited into the trenches to form an active gate oxide for the channels 620. Additionally, or alternatively, a conductive material (e.g., polysilicon, tungsten, ruthenium, molybdenum, titanium nitride, or another transition metal) may be deposited into the trenches to form the word lines 630. In some cases, the conductive material may be deposited to a height (e.g., in the z-direction) less than a surface of the channels 620, thereby forming shallow trenches above the word lines 630. In other cases, the conductive material may be deposit to a same height as the channels 620, and subjected to an etch operation, such that the conductive material may be a height (e.g., in the z-direction) less than the surface of the channels 620. Finally, an insulating material 635 may be deposited into the shallow trenches and planarized, such that the insulating material 635, the oxide material 625, the channels 620, and the dielectric material 614 may share a same height along the z-direction. In some implementations, the insulating material 635 may be a nitride material, a silicon material, an oxide material (e.g., such as the oxide material 625), or any combination thereof.

In some cases, each word line 630 may be formed between adjacent rows of channels 620. In some such cases, each word line 630 may be coupled with the respective adjacent rows of channels 620. In some examples, forming the word lines 630 may enable the channels 620 to function as transistors, such that each channel 620 may be associated with a respective transistor. In some such examples, the word lines 630 on each side of a channel 620 may form gates of the transistors.

Figure 8E:
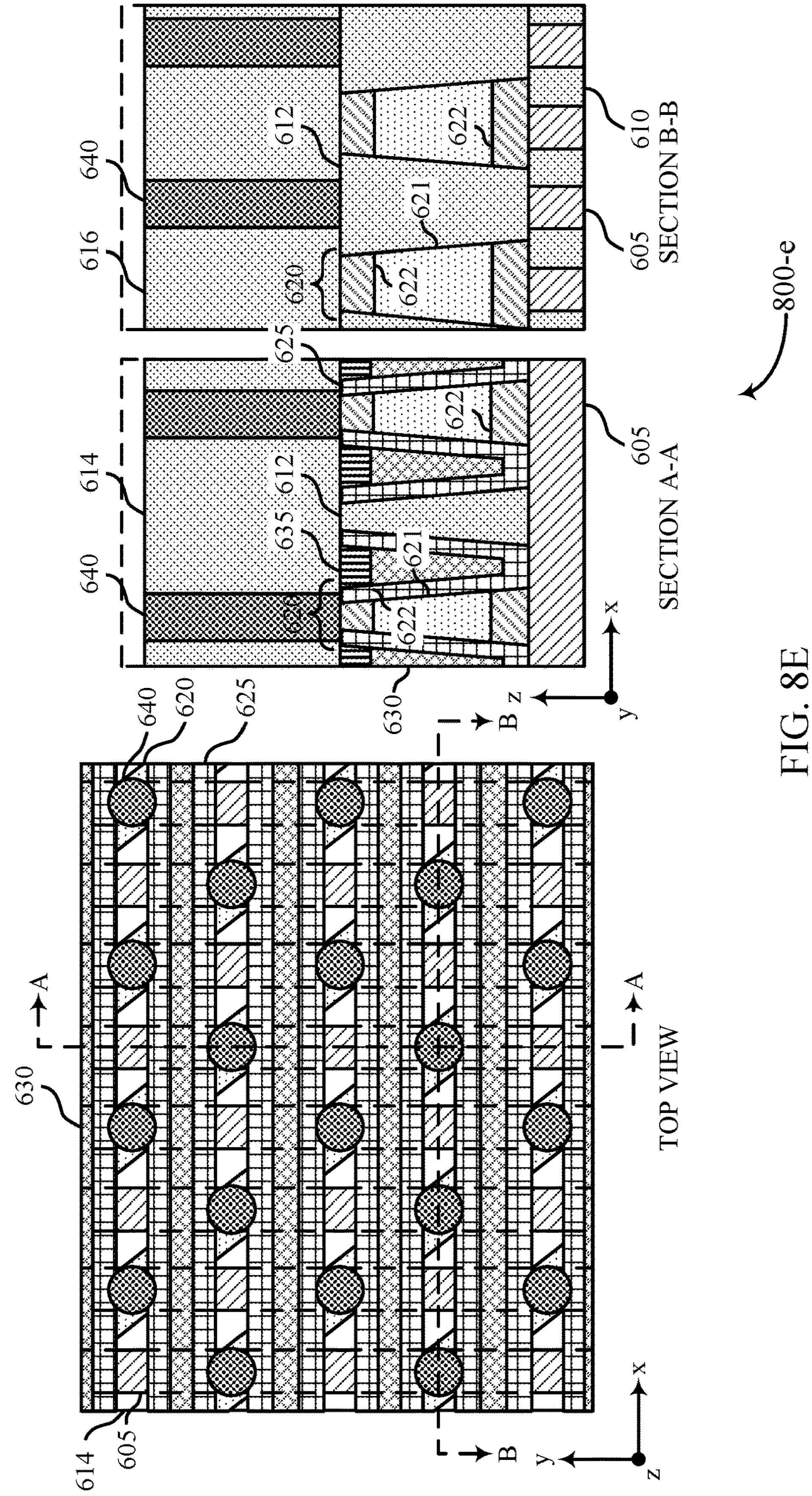

FIG. 8E illustrates fifth processing steps 800-*e* for forming a memory array configuration for shared word lines. The fifth processing steps 800-*e* may include forming memory cells 640. In some cases, the memory cells may include STUD capacitors. In such cases, forming the memory cells 640 may include forming electrodes (not shown) centered above the channels 620. After forming the electrodes, memory material (not shown) may be formed around each electrode, where the memory material may form the memory cells 640. Then, a plate line (not shown) may be formed around the memory material in the shape of a column or pillar extending along the z-direction. In other cases, the memory cells 640 may include container capacitors. In such cases, forming the memory cells 640 may include forming plate lines above the channels 620, centered above the channels 620, where the plate lines include an inner space. In some examples, the plate lines may be formed in the shape of a column of pillar extending along the z-direction. After forming the plate lines, memory material may be formed in the inner space such that the memory material may include an additional inner space. Then, an electrode may be formed in the additional inner space.

In some cases, forming the memory array as described herein may enable shared word lines to be implemented in the memory array. For example, each word line 630 may be shared by two respective rows of transistors (e.g., the channels 620). such that activating the word line 630 may activate each transistor in the respective rows of transistors. However, because each digit line 605 is coupled with a respective transistor in alternating rows of transistors, activating a digit line 605 in tandem with the word line 630 may activate a singular respective transistor. In some cases, activating the singular respective transistor may enable access operations to be performed on the memory cells associated with the respective transistor. Therefore, the memory array may support accessing memory cells using shared word lines in the configuration as described herein.

FIG. 9A through 9D illustrate examples of processing steps 900 that support memory array configuration for shared word lines in accordance with examples as disclosed herein. The processing steps 900 may illustrate aspects of a sequence of manufacturing operations for fabricating aspects of a memory array 300-*a*, 300-*b*, 300-*c*, or a memory array 400, as described with reference to FIGS. 3A, 3B, 3C, and 4, respectively. In some cases, the memory array may implement aspects of the memory array described with reference to FIGS. 6A through 6F. For illustrative purposes, aspects of the memory array may be described with reference to an x-direction (e.g., a first direction), a y-direction (e.g., a second direction), and/or a z-direction (e.g., a third direction) of the illustrated coordinate system. For example, the processing steps 900 may illustrate various cross-sectional views of the memory array in an xz-plane. In some examples, the z-direction may be illustrative of a direction (e.g., a layer direction) orthogonal to a surface of a substrate (e.g., a surface in an xy-plane, a surface upon or over which other materials may be deposited), and each of the related regions, illustrated by their respective cross section in the xz-plane, may extend for some distance along the y-direction (e.g., above or on the substrate). Although the processing steps 900 illustrate examples of relative dimensions and quantities of various features, aspects of the memory array may be implemented with other relative dimensions or quantities of such features in accordance with examples as disclosed herein.

Operations illustrated in and described with reference to FIGS. 9A through 9D may be performed by a manufacturing system, such as a semiconductor fabrication system configured to perform additive operations such as deposition or bonding, subtractive operations such as etching, trenching, planarizing, or polishing, and supporting operations such as masking, patterning, photolithography, or aligning, among other operations that support the described techniques. In some examples, operations performed by such a manufacturing system may be supported by a process controller or its components as described herein.

Figure 9A:
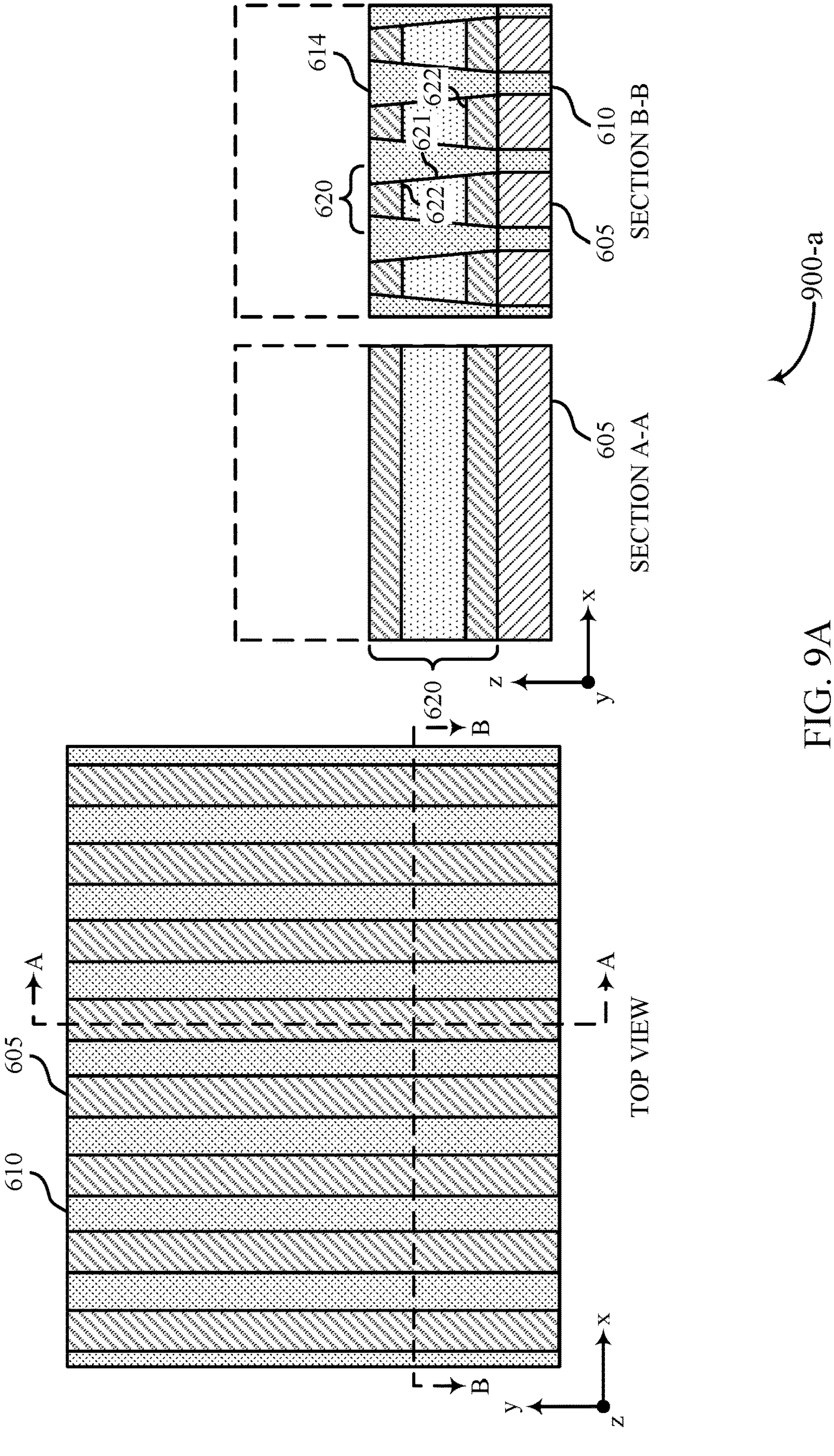
FIGS. 9A, 9B, 9C, and 9D illustrate examples of processing steps that support memory array configuration for shared word lines in accordance with examples as disclosed herein.

FIG. 9A illustrates first processing steps 900-*a* for forming a memory array configuration for shared word lines. The first processing steps 900-*a* may include forming digit lines 605 and channels 620. Forming the digit lines 605 may include depositing a layer of a conductive material in an xy-plane above the substrate or supporting circuitry (e.g., decoding circuitry, control circuitry). Forming the channels 620 may include depositing a layer of polysilicon material 621 (e.g., a semiconductor material) in an xy-plane above the conductive material. In some cases, the polysilicon material 621 may be doped via in-situ doping with a dopant (e.g., phosphine, diborane), such that regions 622 at the top and bottom of the polysilicon material 621 may include a relatively high concentration of the dopant (e.g., compared to the polysilicon material 621). Next, forming the digit lines 605 and channels 620 may include forming a mask over (e.g., along the z-direction) the polysilicon material 621 in an xy-plane, where the mask may be patterned to expose portions of the polysilicon material 621. For example, the mask may be patterned to expose alternating portions (e.g., across the x-direction) of the polysilicon material 621, each portion extending along the y-direction. In some cases, the mask may be resistant to an etching operation such that the exposed portions of the polysilicon material 621 and the conductive material may be removed by the etching operation. Performing the etching operation may form trenches extending to a depth contacting a bottom surface of the laver of conductive material. In some examples, the trenches may form the digit lines 605 by separating the conductive material such that the digit lines 605 extend along the y-direction and alternate across the x-direction. In some examples, the trenches may form the channels 620 by separating the polysilicon material 621 such that the channels 620 extend along the y-direction and alternate across the x-direction, and are centered over the digit lines 605. After performing the etching operation, a dielectric material 610 may be deposited into the trenches to a height (e.g., along the z-direction) of a top surface of the digit lines 605. Then, dielectric material 614 may be deposited into the trenches to a height of a top surface of the channels 620. Dielectric material 614 may be the same as, or different than, the dielectric material 610. Additionally, the dielectric material 614 and the polysilicon material 621 may be planarized such that the polysilicon material 621 and the dielectric material 614 may share a same height along the z-direction. The channels 620 may be omitted from the top view for illustrative clarity.

Figure 9B:
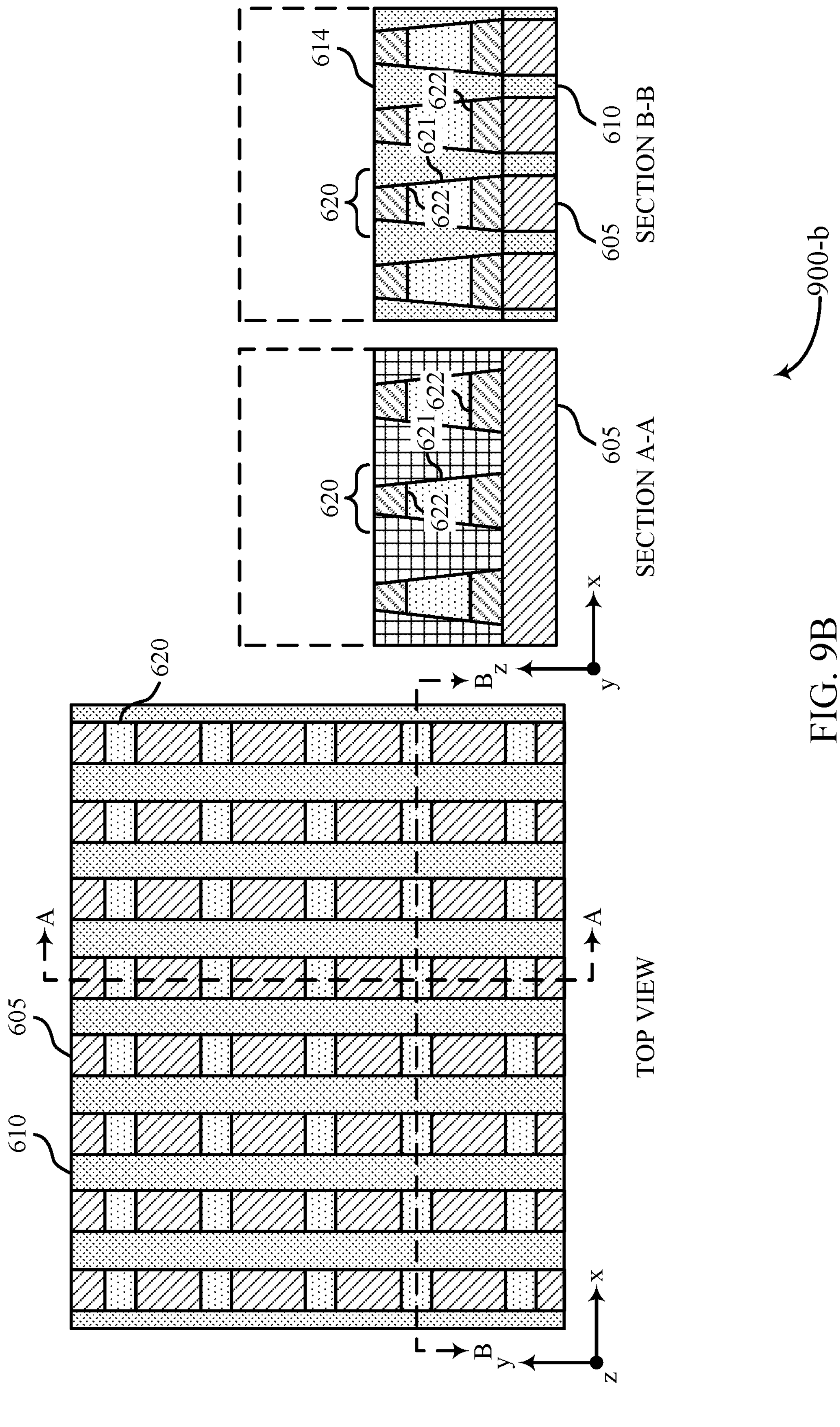

FIG. 9B illustrates second processing steps 900-*b* for forming a memory array configuration for shared word lines. The second processing steps 900-*b* may include dividing the channels 620. Dividing the channels 620 may include forming a second mask over (e.g., along the z-direction) the channels 620 and the dielectric material 614 in an xy-plane, where the second mask may be patterned to expose portions of the channels 620 and the dielectric material 614. For example, the second mask may be patterned to expose alternating portions (e.g., strips) of the channels 620 and the dielectric material 614 extending along the x-direction. In some implementations, the exposed portions may extend perpendicular to the channels 620. In some cases, the fourth mask may be resistant to a second etching operation such that the exposed portions of the channels 620 and the dielectric material 614 may be removed by the second etching operation. Performing the second etching operation may form trenches extending to a depth (e.g., along the z-direction) contacting the digit lines 605. In some cases, performing the etching operation and the second etching operation may divide the channels 620 into rows extending along the x-direction and columns extending along the y-direction, where each channel 620 in a respective column of channels 620 is coupled with a respective digit line 605 below the channel 620. In some examples, each column of channels 620 may include channels 620 from alternating rows of channels 620. After performing the second etching operation, an oxide material 625 (e.g., silicon oxide) may be deposited into the trenches. Finally, the oxide material 625 may be planarized such that the oxide material 625, the channels 620, and the dielectric material 614 may share a same height along the z-direction. The oxide material 625 may be omitted from the top view for illustrative clarity.

Figure 9C:
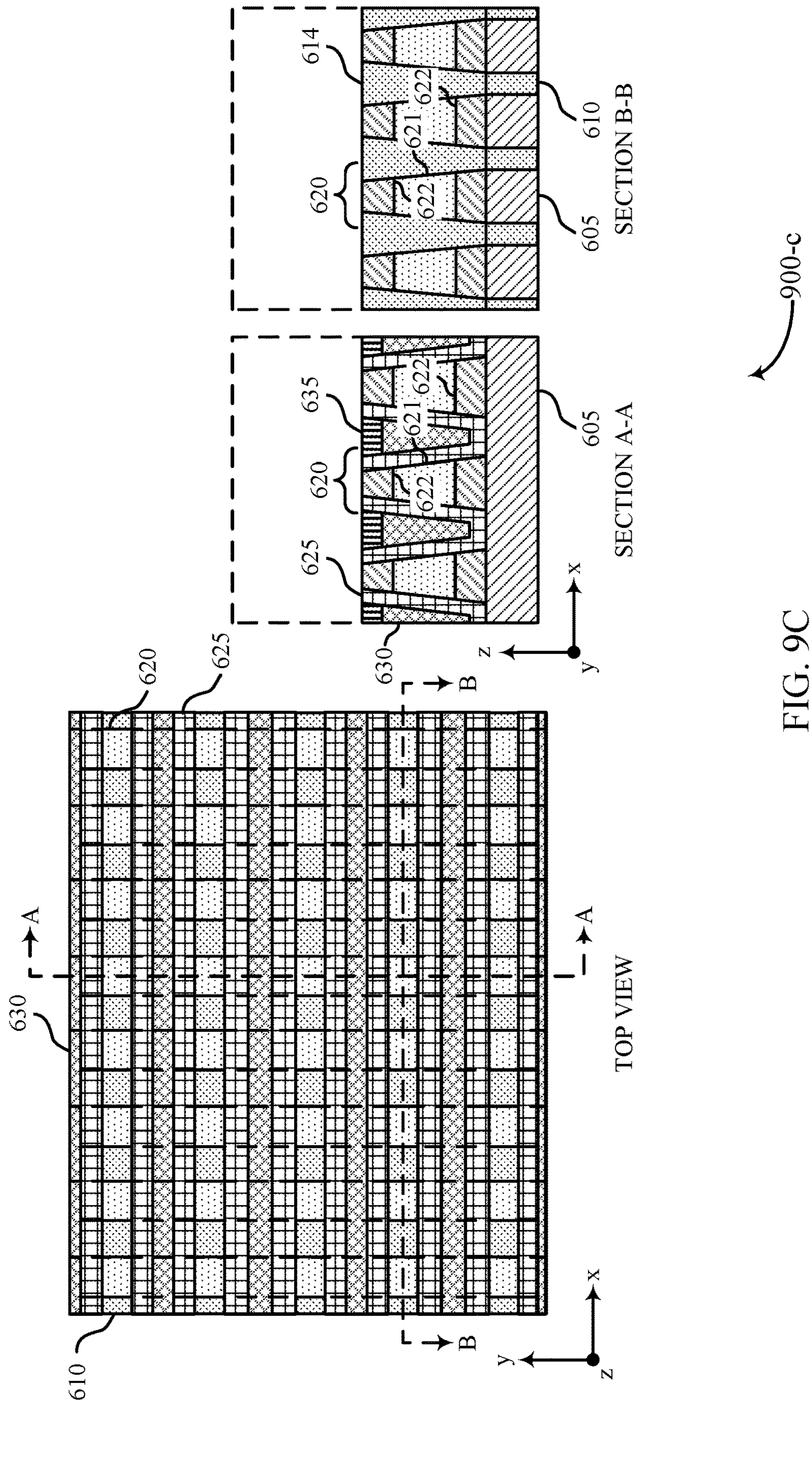

FIG. 9C illustrates third processing steps 900-*c* for forming a memory array configuration for shared word lines. The third processing steps 900-*c* may include forming word lines 630. Forming the word lines 630 may include performing a third etching operation on the oxide material 625. In some cases, performing the third etching operation may include etching the oxide material 625 to form trenches through the oxide material 625, such that the oxide material 625 includes sidewalls contacting the channels 620 and the dielectric material 614 and bottom walls contacting the dielectric material 610 and the digit lines 605. In some cases, performing the third etching operation may include etching the oxide material 625 from the trenches. In some implementations, a third mask may be used to protect portions of the oxide material 625 from the third etching operation. In some cases, a liner material (e.g., an oxide) may deposited into the trenches to form an active gate oxide for the channels 620. Additionally, or alternatively, a conductive material (e.g., polysilicon, tungsten. ruthenium, molybdenum, titanium nitride, or another transition metal) may be deposited into the trenches to form the word lines 630. In some cases, the conductive material may be deposited to a height (e.g., in the z-direction) less than a surface of the channels 620, thereby forming shallow trenches above the word lines 630. In other cases, the conductive material may be deposit to a same height as the channels 620, and subjected to an etch operation, such that the conductive material may be a height (e.g., in the z-direction) less than the surface of the channels 620. Finally, an insulating material 635 may be deposited into the shallow trenches and planarized, such that the insulating material 635, the oxide material 625, the channels 620, and the dielectric material 614 may share a same height along the z-direction. In some implementations, the insulating material 635 may be a nitride material, a silicon material, an oxide material (e.g., such as the oxide material 625), or an combination thereof.

In some cases, each word line 630 may be formed between adjacent rows of channels 620. In some such cases, each word line 630 may be coupled with the respective adjacent rows of channels 620. In some examples, forming the word lines 630 may enable the channels 620 to function as transistors, such that each channel 620 may be associated with a respective transistor. In some such examples, the word lines 630 on each side of a channel 620 may form gates of the transistors.

Figure 9D:
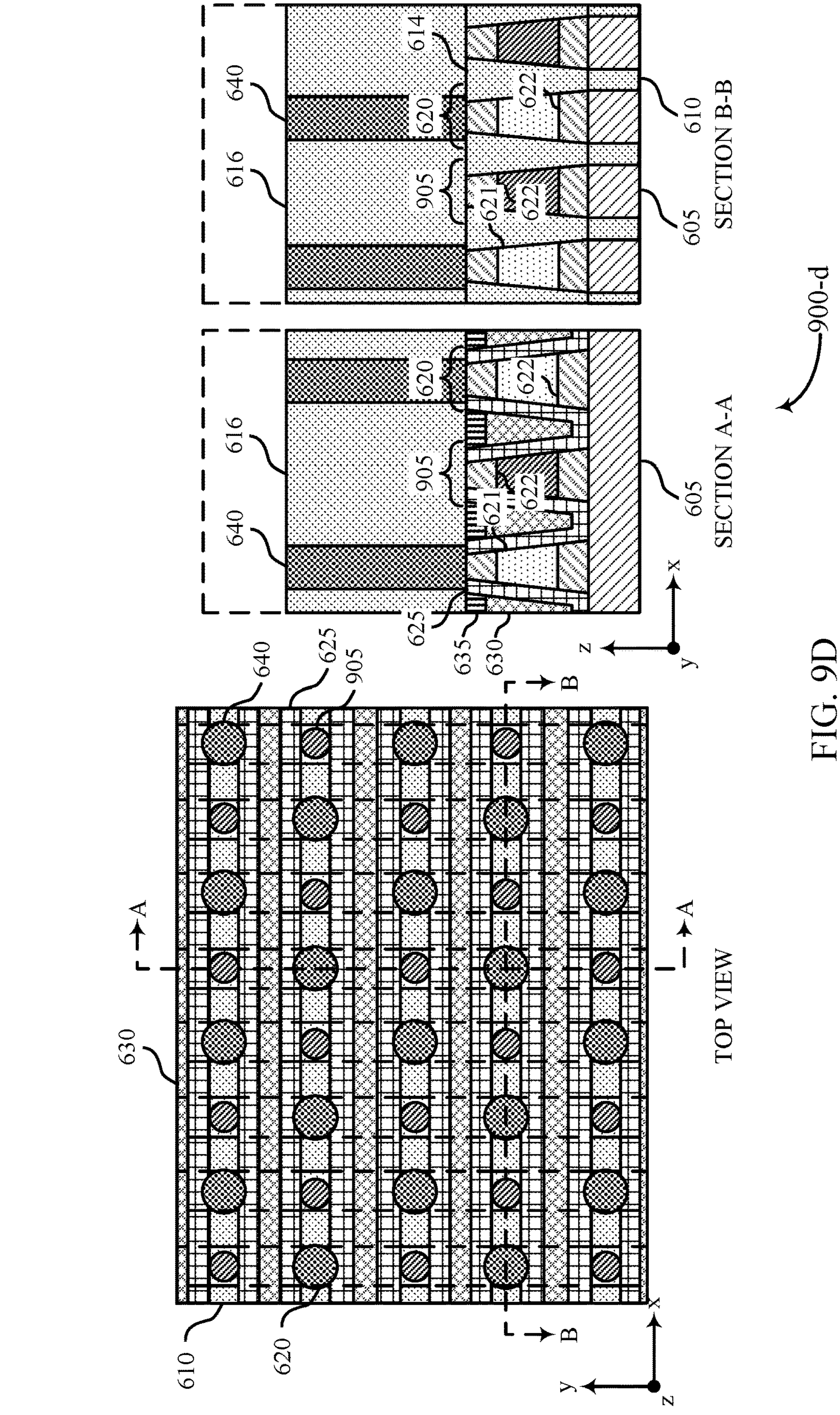

FIG. 9D illustrates fourth processing steps 900-*d* for forming a memory array configuration for shared word lines. The fourth processing steps 900-*d* may include forming memory cells 640. In some cases, the memory cells may include STUD capacitors. In such cases, forming the memory cells 640 may include forming electrodes (not shown) centered above alternating channels 620 along a respective digit line 605. After forming the electrodes, memory material (not shown) may be formed around each electrode, where the memory material may form the memory cells 640. Then, a plate line (not shown) may be formed around the memory material in the shape of a column or pillar extending along the z-direction. In other cases, the memory cells may include container capacitors. In such cases, forming the memory cells 640 may include forming plate lines above the channels 620, centered above alternating channels 620 along a respective digit line 605, where the plate lines include an inner space. In some examples, the plate lines may be formed in the shape of a column of pillar extending along the z-direction. After forming the plate lines, memory material may be formed in the inner space such that the memory material may include an additional inner space. Then, an electrode may be formed in the additional inner space. In some cases, the memory cells 640 may be formed centered above alternating channels 620 above a respective digit line 605, such that the channels 620 without memory cells above them may be dummy transistors 905. For example, because the channels 620 without associated memory cells are not coupled with one or more capacitors, the channels 620 may be electrically isolated and function as dummy transistors 905. A dielectric material 616 may be used in-between the memory cells 640. The dielectric material 616 may be the same as, or different than, the dielectric material 610.

In some cases, forming the memory array as described herein may enable shared word lines to be implemented in the memory array. For example, each word line 630 may be shared by two respective rows of transistors (e.g., the channels 620), such that activating the word line 630 may activate each transistor in the respective rows of transistors. However, because each digit line 605 is coupled with a respective transistor in alternating rows of transistors, activating a digit line 605 in tandem with the word line 630 may activate a singular respective transistor. In some cases, activating the singular respective transistor may enable access operations to be performed on the memory cells associated with the respective transistor. Therefore, the memory array may support accessing memory cells using shared word lines in the configuration as described herein.

FIG. 10A through 10H illustrate examples of processing steps 1000 that support memory array configuration for shared word lines in accordance with examples as disclosed herein. The processing steps 1000 may illustrate aspects of a sequence of manufacturing operations for fabricating aspects of a memory array 300-*a*. 300-*b*, 300-*c*, or a memory array 400, as described with reference to FIGS. 3A, 3B, 3C, and 4, respectively. In some cases, the memory array may implement aspects of the memory array described with reference to FIGS. 6A through 6F. For illustrative purposes, aspects of the memory array may be described with reference to an x-direction (e.g., a first direction), a y-direction (e.g., a second direction), and/or a z-direction (e.g., a third direction) of the illustrated coordinate system. For example, the processing steps 1000 may illustrate various isometric views of the memory array. Although the processing steps 1000 illustrate examples of relative dimensions and quantities of various features, aspects of the memory array may be implemented with other relative dimensions or quantities of such features in accordance with examples as disclosed herein.

Operations illustrated in and described with reference to FIGS. 10A through 10H may be performed bv a manufacturing system, such as a semiconductor fabrication system configured to perform additive operations such as deposition or bonding, subtractive operations such as etching, trenching, planarizing, or polishing, and supporting operations such as masking, patterning, photolithography, or aligning, among other operations that support the described techniques. In some examples, operations performed by such a manufacturing system may be supported by a process controller or its components as described herein.

Figure 10A:
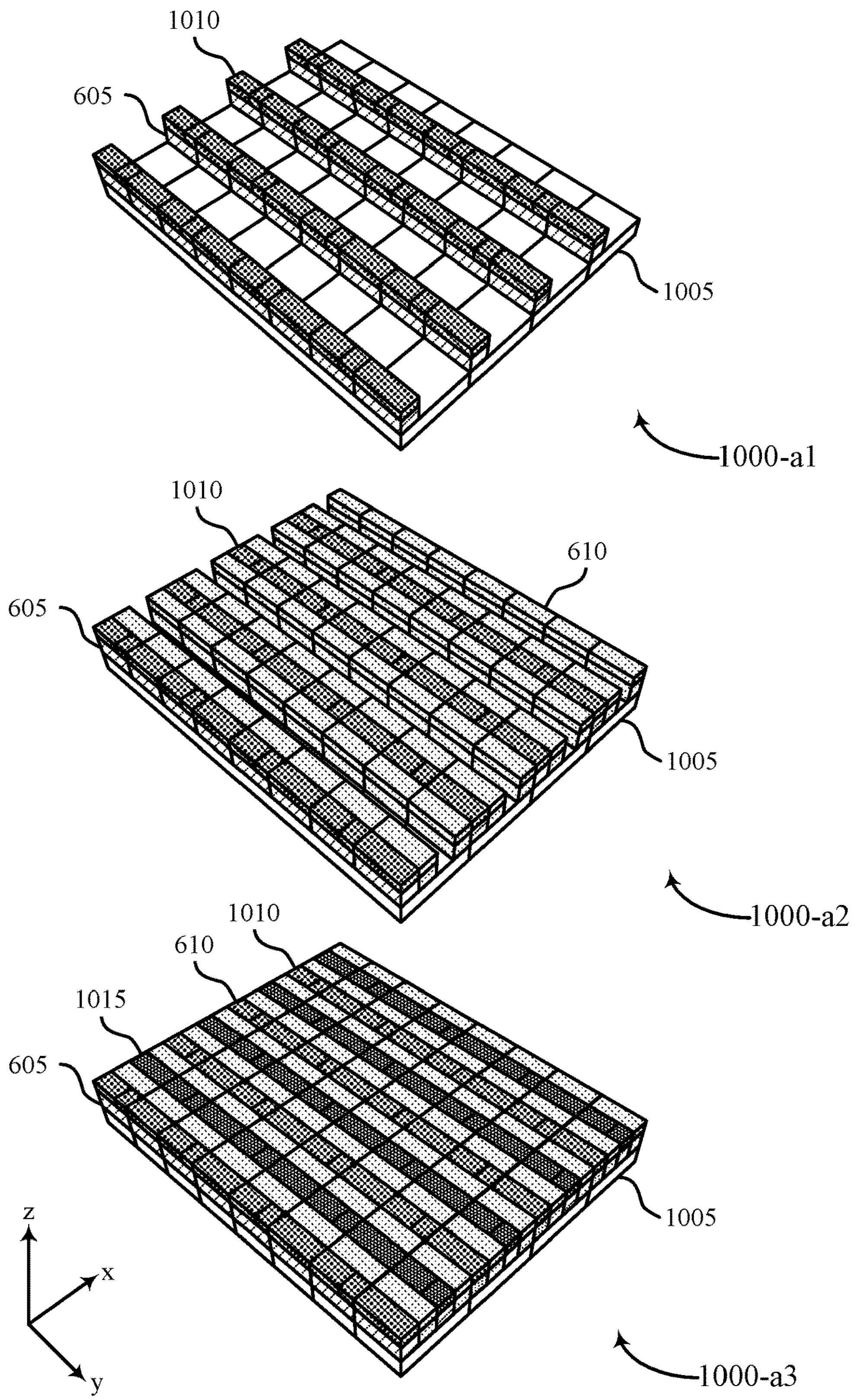
FIGS. 10A, 10B, 10C, 10D, 10E, 10F, 10G, and 10H illustrate examples of processing steps that support memory array configuration for shared word lines in accordance with examples as disclosed herein.

FIG. 10A illustrates first processing steps 1000-*a* for forming a memory array configuration for shared word lines. The first processing steps 1000-*a*1 may include forming digit lines 605. Forming the digit lines 605 may include depositing a layer of a conductive material (e.g., tungsten, ruthenium, molybdenum, or another transition metal) in an xy-plane above a substrate 1005 or supporting circuitry (e.g., decoding circuitry, control circuitry). Next, forming the digit lines 605 may include forming a mask over (e.g., along the z-direction) the conductive material in an xy-plane, where the mask may be patterned to expose portions of the conductive material. For example, the mask may be patterned to expose alternating portions (e.g., across the x-direction) of the conductive material, each portion extending along the y-direction. In some cases, the mask may be resistant to an etching operation such that the exposed portions of the conductive material may be removed by the etching operation. Performing the etching operation may form trenches extending to a depth contacting a bottom surface of the layer of conductive material. Further, the trenches may extend along the y-direction and alternate across the x-direction such that the trenches may be relatively wider (e.g., along the x-direction) than the digit lines 605. After performing the etching operation, a first hard mask 1010 (e.g., aluminum oxide or another similar material) may be deposited above the digit lines 605.

The first processing steps 1000-*a*2 may include depositing a dielectric material 610 into the trenches to a height of the first hard mask 1010. The dielectric material 610 may be deposited such that spaces (e.g., trenches along the y-direction) may exist between portions of the dielectric material 610 adjacent to (e.g., in the x-direction) the digit lines 605.

The first processing steps 1000-*a*3 may include depositing the conductive material into the spaces that exist between the portions of the dielectric material adjacent to the digit lines 605 to form additional digit lines 605. The conductive material may be deposited to a height of the digit lines 605. After depositing the conductive material, a second hard mask 1015 may be deposited above the conductive material. In some cases, the first hard mask 1010 and the second hard mask 1015 may be planarized.

Figure 10B:
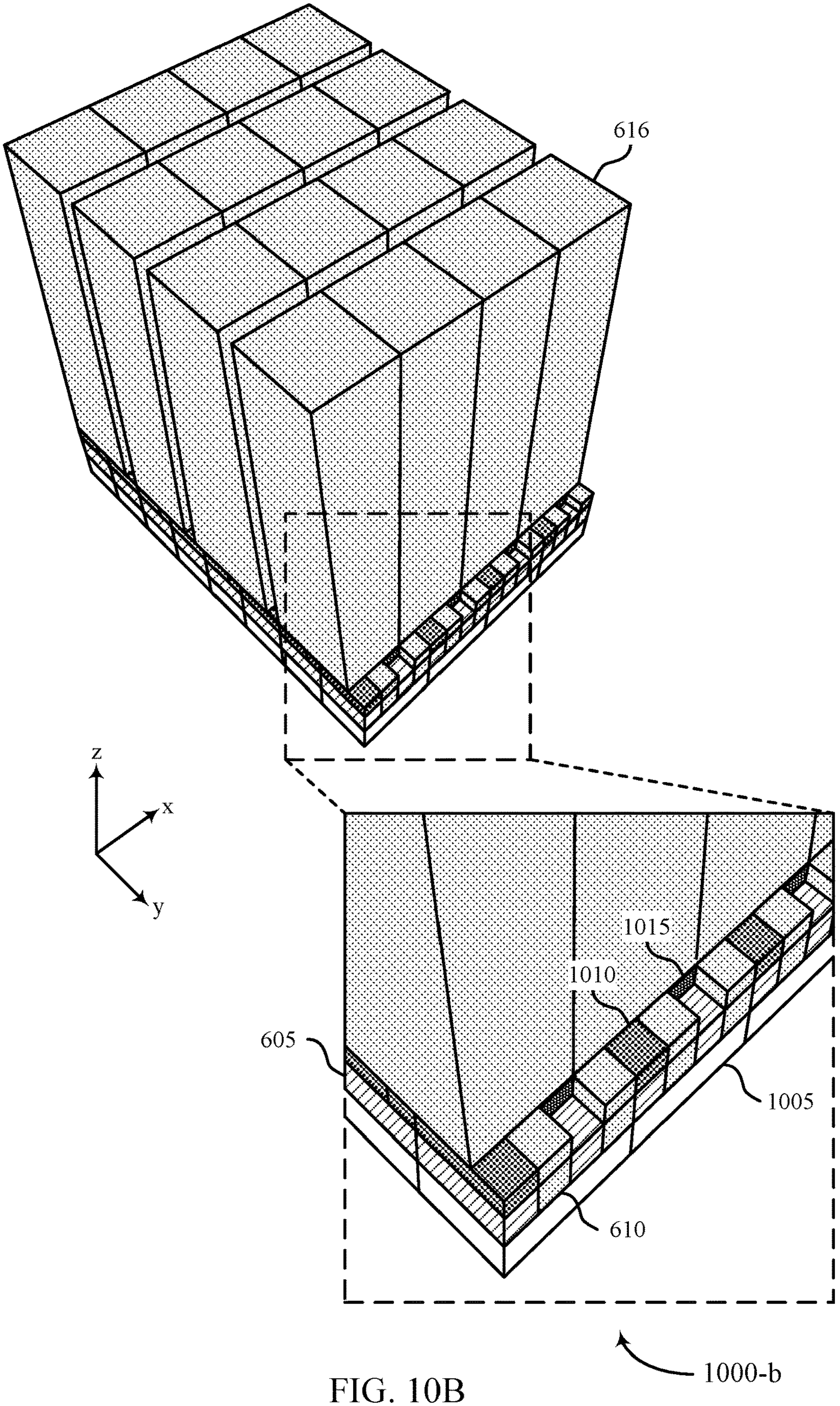

FIG. 10B illustrates second processing steps 1000-*b* for forming a memory array configuration for shared word lines. The second processing steps 1000-*b* may include depositing a dielectric material 616 above the first hard mask 1010 and the second hard mask 1015. The dielectric material 616 may be the same as, or different than, the dielectric material 610. Next, the second processing steps 1000-b may include forming a mask over (e.g., along the z-direction) the dielectric material 610 in an xy-plane, where the mask may be patterned to expose portions of the dielectric material 616. For example, the mask may be patterned to expose alternating portions (e.g., across the x-direction) of the dielectric material 616, each portion extending along the x-direction. In some cases, the mask may be resistant to an etching operation such that the exposed portions of the dielectric material may be removed by the etching operation. Performing the etching operation may form trenches extending to a depth contacting a top surface of the first hard mask 1010 and a top surface of the digit lines 605 below the second hard mask 1015. For example, the etching operation may etch the second hard mask 1015. Further, the trenches may extend along the x-direction and alternate across the y-direction such that the trenches may be relatively smaller (e.g., along the y-direction) than the dielectric material 610 in an xy-plane.

Figure 10C:
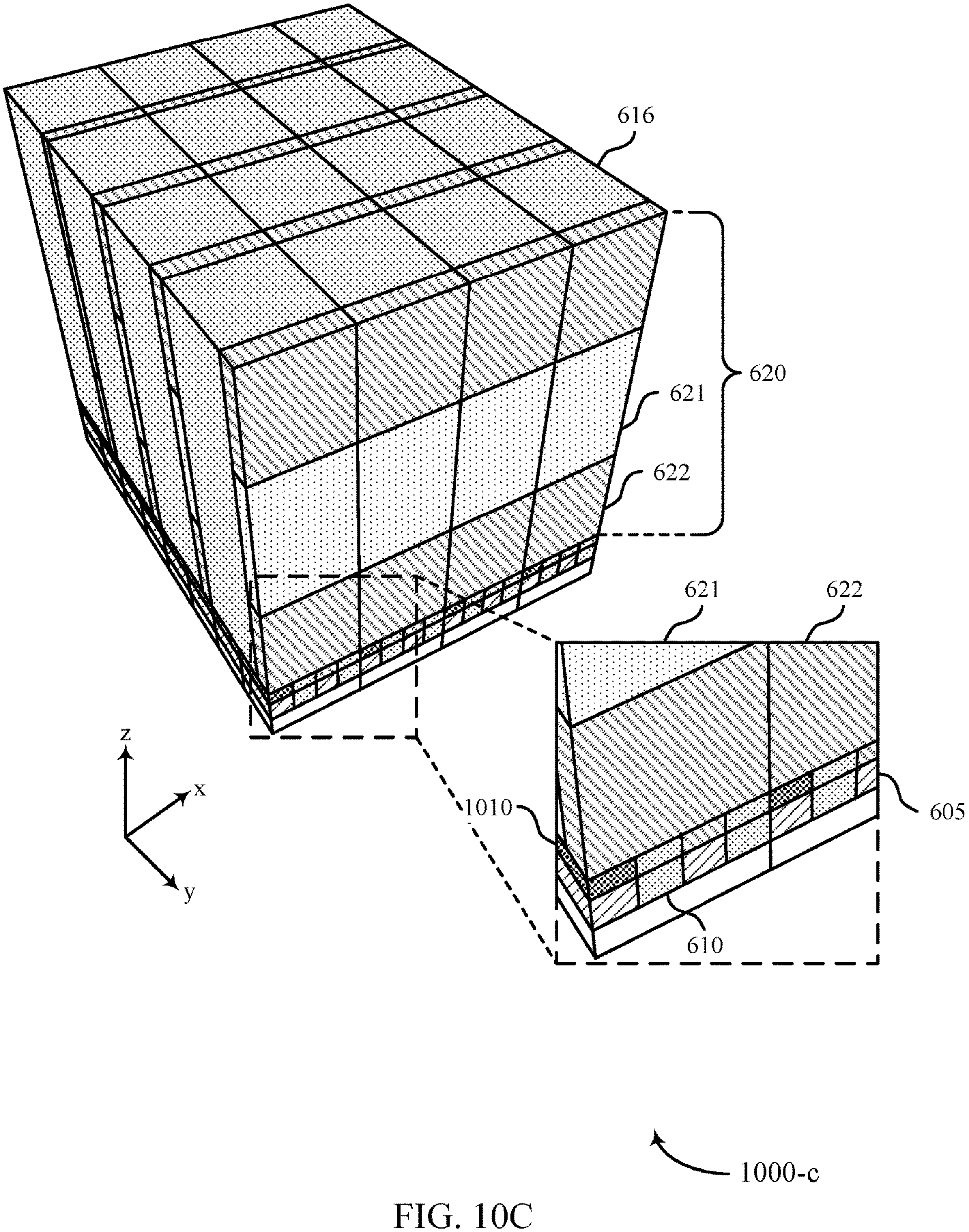

FIG. 10C illustrates third processing steps 1000-*c* for forming a memory array configuration for shared word lines. The third processing steps 1000-*c* may include forming channels 620. Forming the channels 620 may include depositing a polysilicon material 621 (e.g., a semiconductor material) in the trenches. In some cases, the polysilicon material 621 may be doped via in-situ doping with a dopant (e.g., phosphine, diborane), such that regions 622 at the top and bottom of the polysilicon material 621 may include a relatively high concentration of the dopant (e.g., compared to the polysilicon material 621). After doping the polysilicon material 621, the channels 620 and the dielectric material 616 may be planarized such that the channels 620 and the dielectric material 616 may share a same height along the z-direction.

Figure 10D:
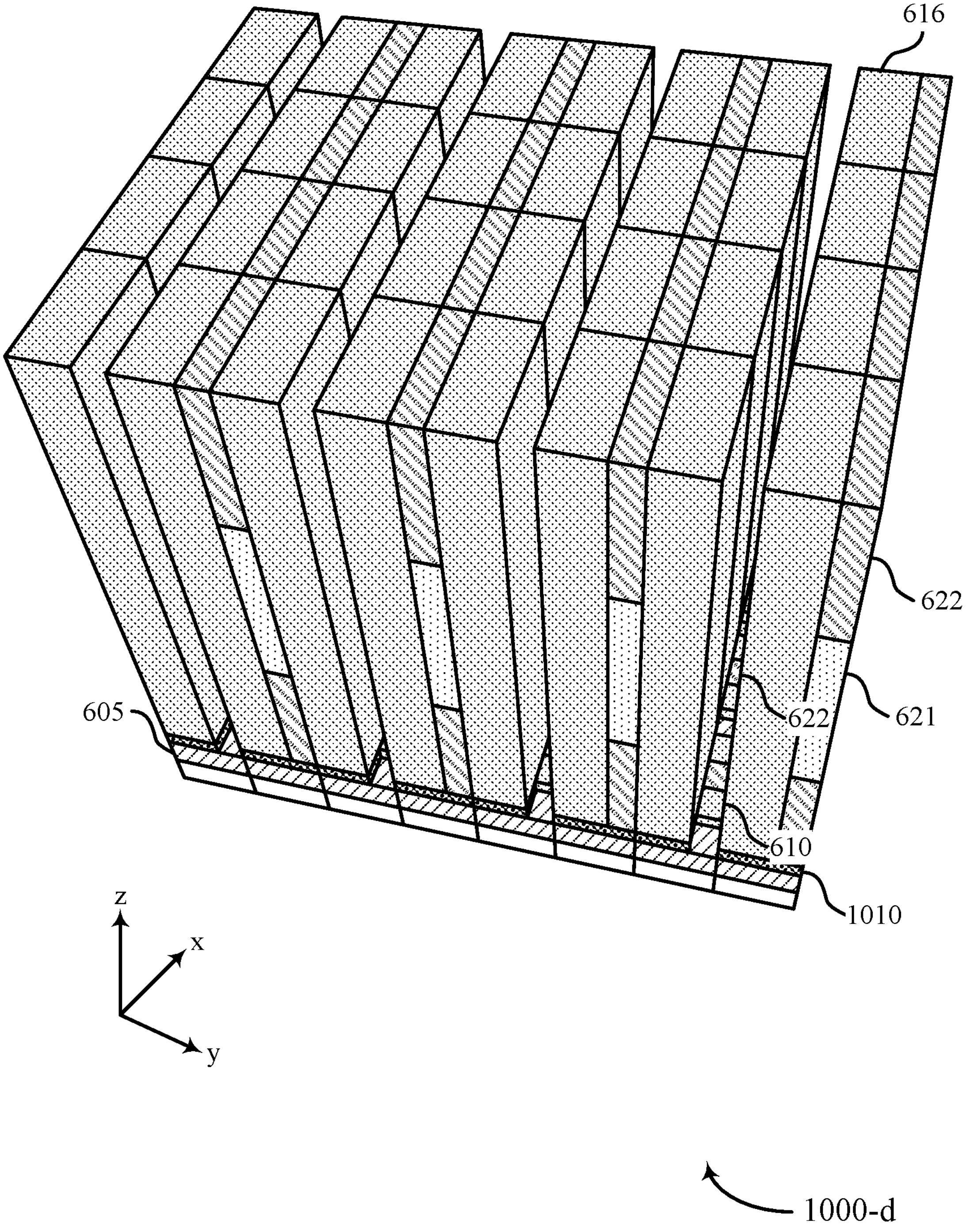

FIG. 10D illustrates fourth processing steps 1000-d for forming a memory array configuration for shared word lines. The fourth processing steps 1000-*d* may include forming a mask over (e.g., along the z-direction) the dielectric material 616 in an xy-plane, where the mask may be patterned to expose portions of the dielectric material 616. For example, the mask may be patterned to expose alternating portions (e.g., across the x-direction) of the dielectric material 616, each portion extending along the x-direction alternating between the channels 620. In some cases, the mask may be resistant to an etching operation such that the exposed portions of the conductive material may be removed by the etching operation. Performing the etching operation may form trenches extending to a depth contacting a top surface of the first hard mask 1010 and a top surface of the digit lines 605 below the first hard mask 1010. For example, the etching operation may etch the first hard mask 1010. Further, the trenches may extend along the x-direction and alternate across the y-direction between the channels 620.

Figure 10E:
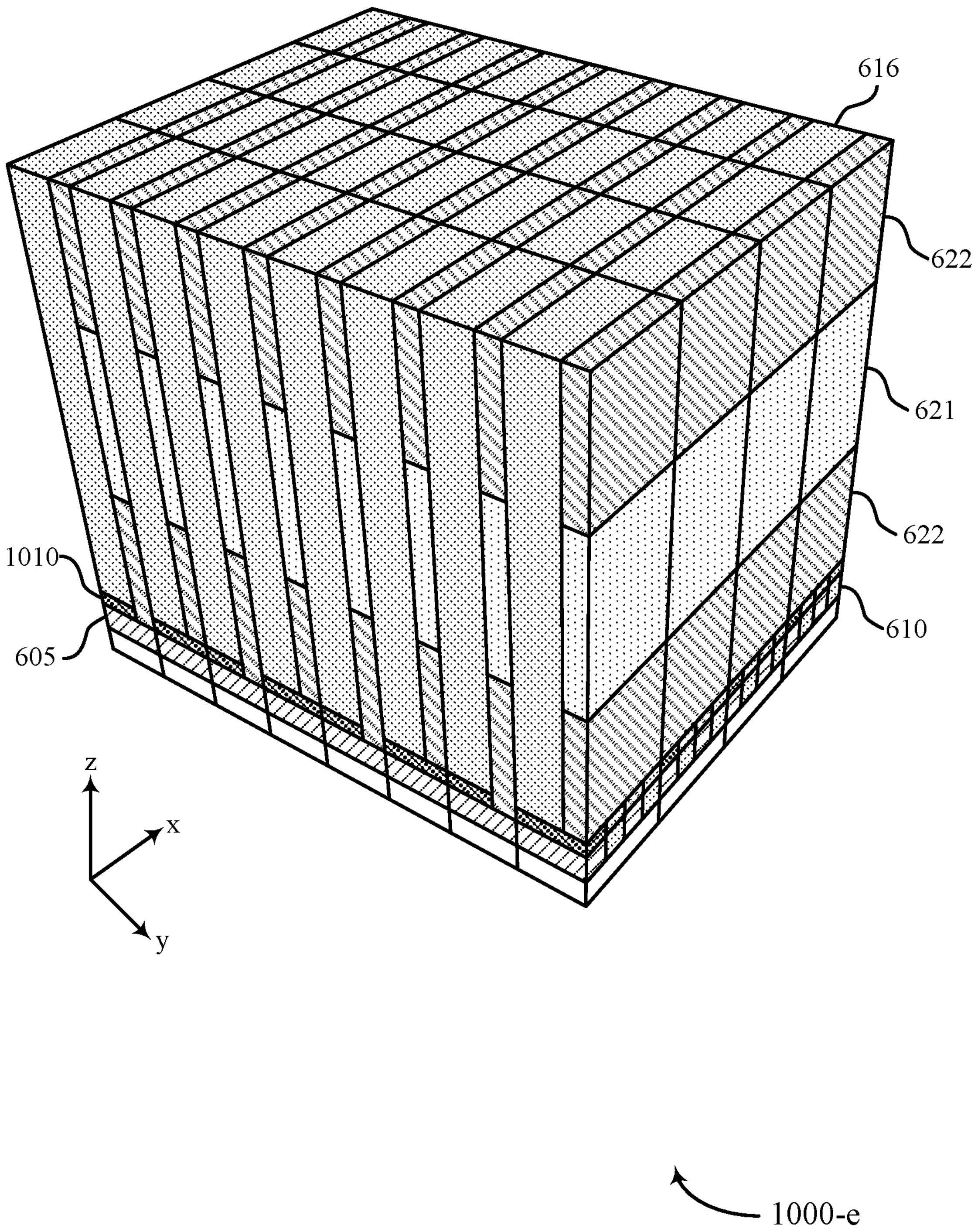

FIG. 10E illustrates fifth processing steps 1000-*e* for forming a memory array configuration for shared word lines. The fifth processing steps 1000-*e* may include forming additional channels 620. Forming the channels 620 may include depositing a polysilicon material 621 (e.g., a semiconductor material) in the trenches formed at the processing steps 1000-*d*. In some cases, the polysilicon material 621 may be doped via in-situ doping. After doping the polysilicon material 621, the channels 620 and the dielectric material 616 may be planarized such that the channels 620 and the dielectric material 616 may share a same height along the z-direction.

Figure 10F:
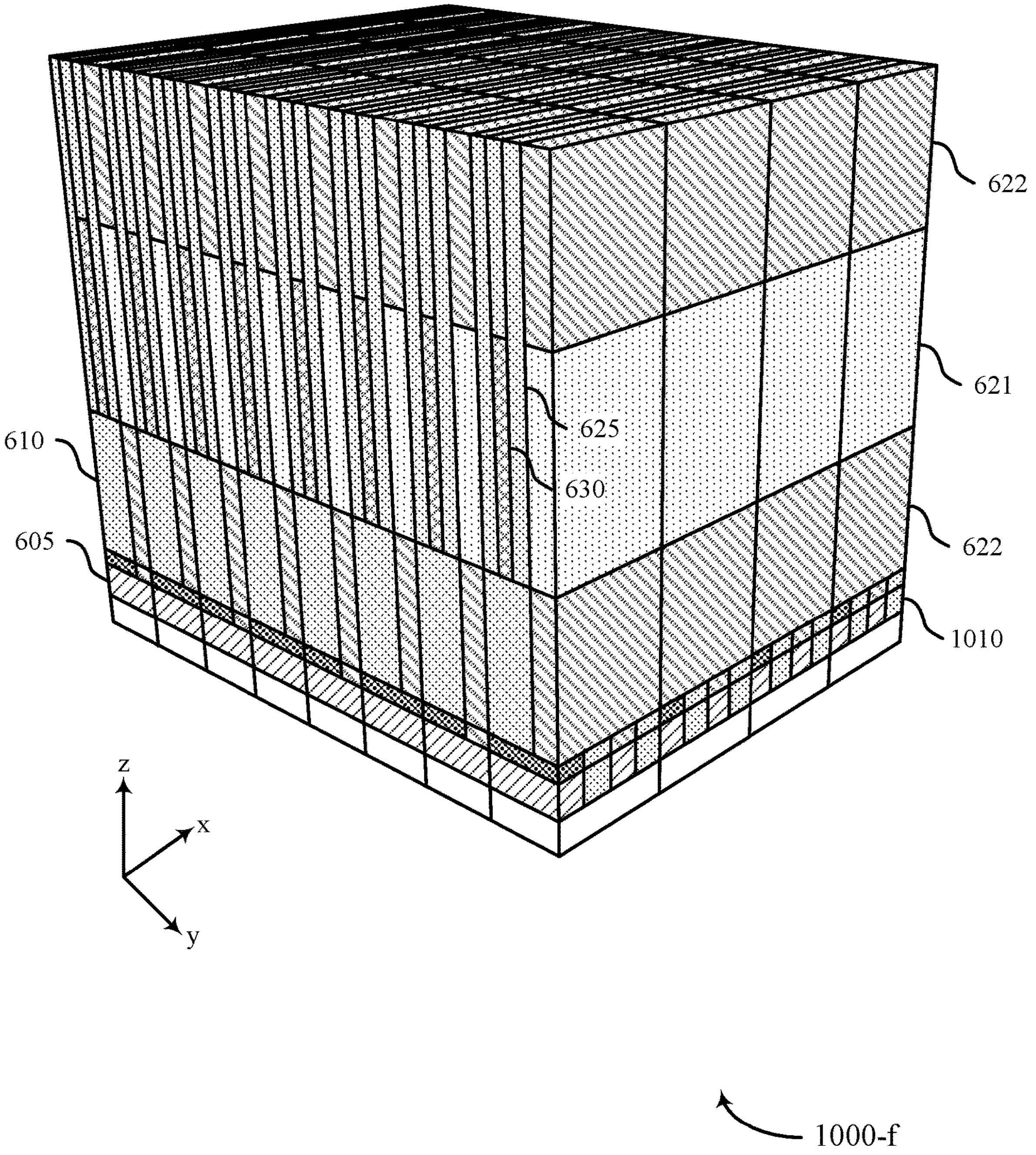

FIG. 10F illustrates sixth processing steps 1000-*f* for forming a memory array configuration for shared word lines. The sixth processing steps 1000-*f* may include forming word lines 630. Forming the word lines 630 may include performing an etching operation on the dielectric material 616. In some cases, performing the etching operation may include etching the dielectric material 616 to form trenches through the dielectric material 616 extending to a depth contacting the regions 622 (e.g., lower regions 622) and extending along the x-direction. After forming the trenches, an oxide material 625 may be deposited into the trenches. After depositing the oxide material 625, another etching operation may be performed on the oxide material 625 to form trenches in the newly deposited oxide material 625 extending to a depth contacting the dielectric material 616 and extending along the x-direction centered between the channels 620. In some cases, a liner material (e.g., an oxide) may deposited into the trenches to form an active gate oxide for the channels 620. Additionally, or alternatively, a conductive material (e.g., tungsten, ruthenium, molybdenum, titanium nitride, or another transition metal) may be deposited into the trenches to form the word lines 630. In some cases, the conductive material may be deposited to a height (e.g., in the z-direction) of the regions 622 (e.g., upper regions 622), thereby forming shallow trenches above the word lines 630. In other cases, the conductive material may be deposit to a same height as the channels 620, and subjected to an etch operation, such that the conductive material may be a height (e.g., in the z-direction) of the regions 622 (e.g., the upper regions 622). Finally, an insulating material may be deposited into the shallow trenches and planarized, such that the insulating material, the oxide material 625, the channels 620, and the dielectric material 616 may share a same height along the z-direction. In some implementations, the insulating material may be the dielectric material 610. In other implementations, the insulating material may be a nitride material, a silicon material, an oxide material, or any combination thereof.

In some cases, each word line 630 may be formed between adjacent rows of channels 620. In some such cases, each word line 630 may be coupled with the respective adjacent rows of channels 620. In some examples, forming the word lines 630 may enable the channels 620 to function as transistors, such that each channel 620 may be associated with a respective transistor. In some such examples, the word lines 630 on each side of a channel 620 may form gates of the transistors.

Figure 10G:
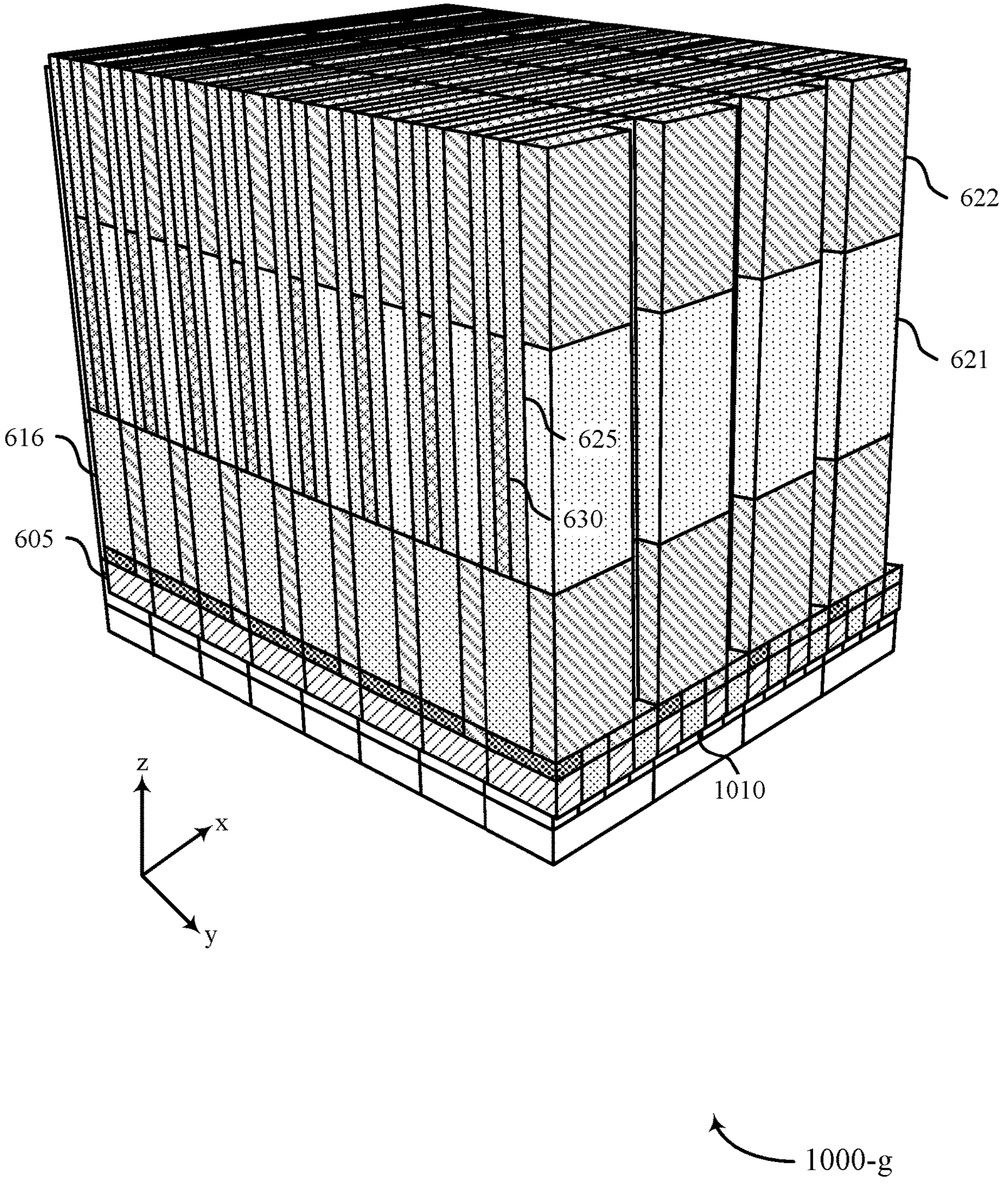

FIG. 10G illustrates seventh processing steps 1000-*g* for forming a memory array configuration for shared word lines. The seventh processing steps 1000-*g* may include forming cavities in the channels 620. In some examples, forming the cavities may include forming a mask in an xy-plane over the channels 620, where the mask may be patterned to expose portions of the channels 620. For example, the mask may be patterned to expose alternating portions (e.g., across the x-direction) of the channels 620, each portion centered above an alternating strip of dielectric material 610 between the digit lines 605. In some cases, the mask may be resistant to an etching operation such that the exposed portions of the polysilicon material 621 may be removed by the etching operation. Performing the etching operation may form cavities extending to a depth contacting the dielectric material 610 between the digit lines 605.

Figure 10H:
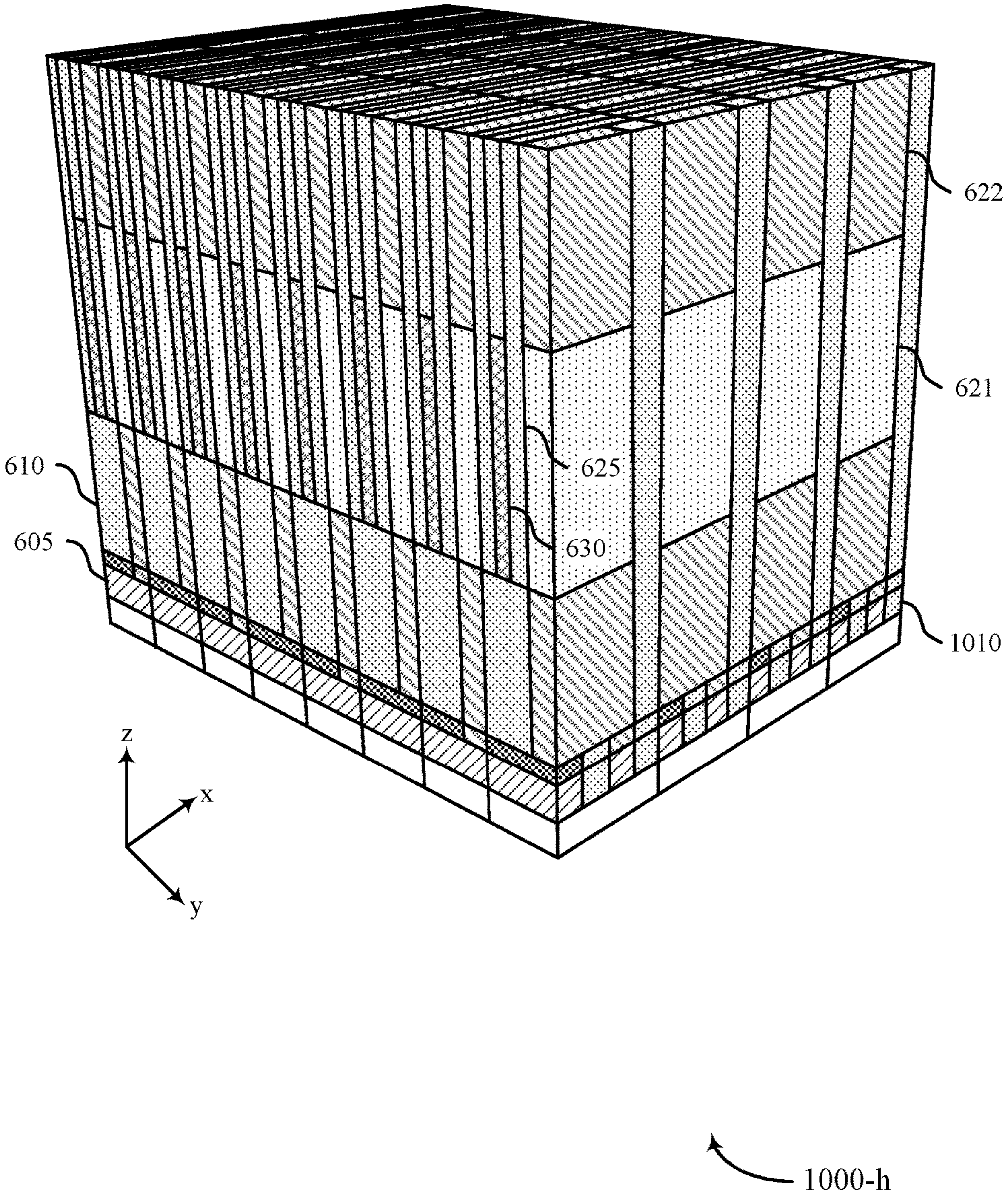

FIG. 10H illustrates eighth processing steps 1000-*h* for forming a memory array configuration for shared word lines. The eighth processing steps 1000-*h* may include depositing the oxide material 625 into the cavities formed at the processing steps 1000-*g*. After depositing the dielectric material into the cavities, the memory array may be planarized such that each component on the top surface of the memory array may share a same height.

In some cases, forming the memory array as described herein may enable shared word lines to be implemented in the memory array. For example, each word line 630 may be shared by two respective rows of transistors (e.g., the channels 620), such that activating the word line 630 may activate each transistor in the respective rows of transistors. However, because each digit line 605 is coupled with a respective transistor in alternating rows of transistors, activating a digit line 605 in tandem with the word line 630 may activate a singular respective transistor. In some cases, activating the singular respective transistor may enable access operations to be performed on the memory cells associated with the respective transistor. Therefore, the memory array may support accessing memory cells using shared word lines in the configuration as described herein.

Figure 11:
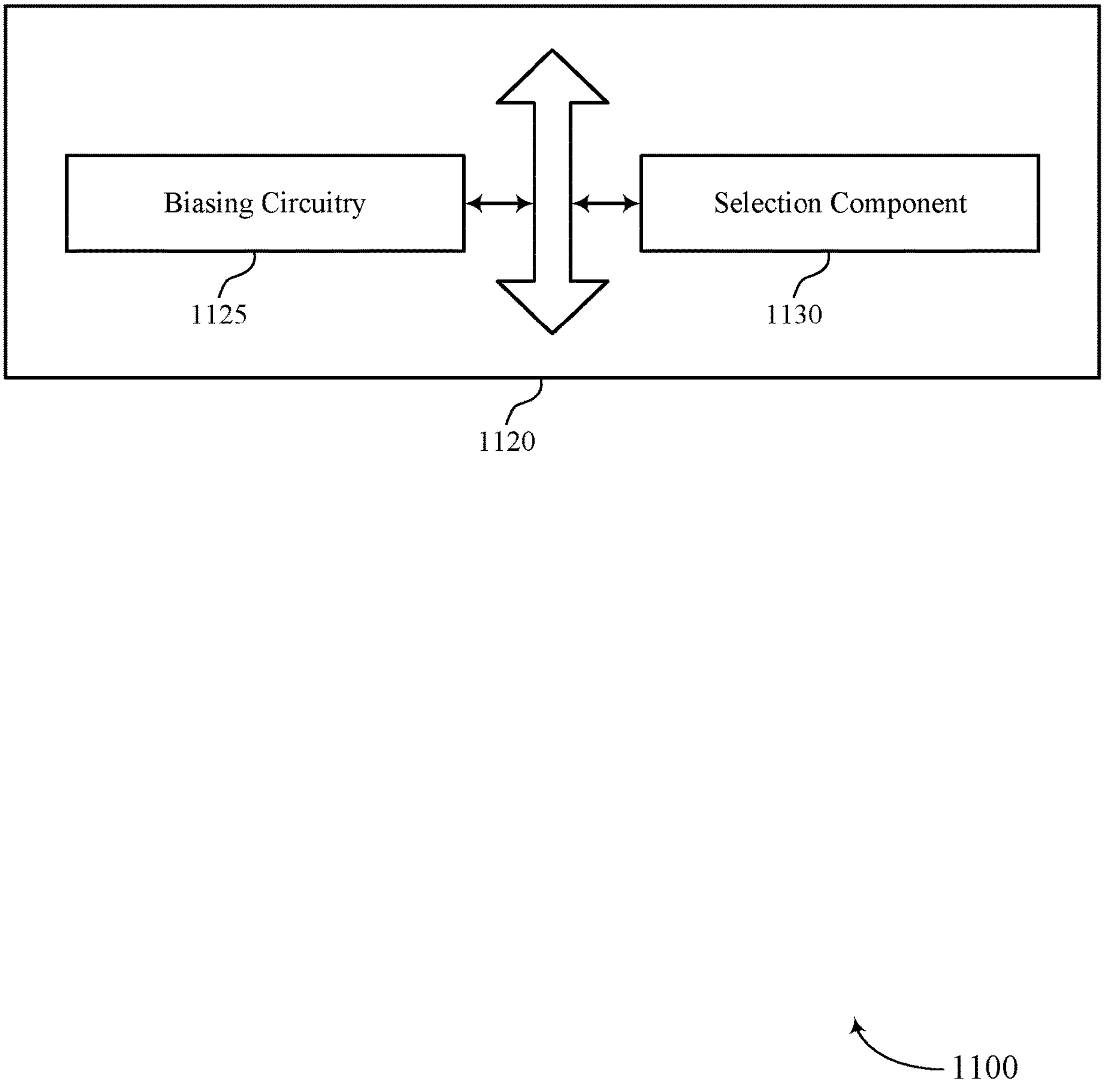
FIG. 11 illustrates a block diagram of a memory device that supports memory array configuration for shared word lines in accordance with examples as disclosed herein.

FIG. 11 illustrates a block diagram 1110 of a memory device 1120 that supports memory array configuration for shared word lines in accordance with examples as disclosed herein. The memory device 1120 may be an example of aspects of a memory device as described with reference to FIGS. 1 through 10. The memory device 1120, or various components thereof, may be an example of means for performing various aspects of memory array configuration for shared word lines as described herein. For example, the memory device 1120 may include a biasing circuitry 1125 a selection component 1130, or any combination thereof. Each of these components may communicate, directly or indirectly, with one another (e.g., via one or more buses).

The biasing circuitry 1125 may be configured as or otherwise support a means for biasing a first word line of a plurality of word lines to a first voltage value based at least in part on determining to perform an access operation associated with a memory array, the first word line coupled with respective gates of respective transistors of a first row of transistors of a plurality of rows of transistors of the memory array and respective gates of respective transistors of a second row of transistors of the plurality of rows of transistors. In some examples, the biasing circuitry 1125 may be configured as or otherwise support a means for biasing a first digit line of a plurality of digit lines to a second voltage value based at least in part on determining to perform the access operation, the first digit line coupled with respective terminals of respective transistors of a first subset of rows of the plurality of rows of transistors, the first subset including alternating rows of the plurality of rows of transistors. The selection component 1130 may be configured as or otherwise support a means for selecting a first memory cell of a plurality of memory cells of the memory array for the access operation based at least in part on biasing the first word line and the first digit line.

In some examples, the biasing circuitry 1125 may be configured as or otherwise support a means for biasing other word lines of the plurality of word lines to a third voltage value based at least in part on determining to perform the access operation, the third voltage value less than the first voltage value.

In some examples, the biasing circuitry 1125 may be configured as or otherwise support a means for biasing a second digit line of the plurality of digit lines to a third voltage value less than the second voltage value, the second digit line coupled with respective terminals of respective transistors of a second subset of rows of the plurality of rows of transistors, the first subset of rows being exclusive of the second subset of rows.

In some examples, the biasing circuitry 1125 may be configured as or otherwise support a means for biasing a second digit line of the plurality of digit lines to the second voltage value, the second digit line coupled with respective terminals of respective transistors of a second subset of rows of the plurality of rows of transistors, the first subset of rows being exclusive of the second subset of rows. In some examples, the biasing circuitry 1125 may be configured as or otherwise support a means for biasing a third digit line to a third voltage value less than the second voltage value. In some examples, the selection component 1130 may be configured as or otherwise support a means for selecting a second memory cell of the plurality of memory cells based at least in part on biasing the second digit line and the third digit line.

In some examples, the first digit line and a second digit line overlap an active material of a transistor of the first memory cell. In some examples, the first memory cell includes a dielectric material between the second digit line and the active material of the transistor.

In some examples, the plurality of memory cells of the memory array are configured according to a hexagonal configuration. In some examples, the first digit line overlaps with an active material of a transistor of the first memory cell of the plurality of memory cells and a second digit line overlaps with an active material of a transistor of a second memory cell of the plurality of memory cells.

In some examples, each transistor of the plurality of rows of transistors is a thin film transistor.

In some examples, the biasing circuitry 1125 may be configured as or otherwise support a means for biasing a first word line of a plurality of word lines to a first voltage value based at least in part on determining to perform an access operation associated with a memory array, the first word line coupled with respective gates of respective transistors of a first row of transistors of a plurality of rows of transistors of the memory array and respective gates of respective transistors of a second row of transistors of the plurality of rows of transistors. In some examples, the biasing circuitry 1125 may be configured as or otherwise support a means for biasing a second word line of the plurality of word lines to the first voltage value based at least in part on determining to perform the access operation, the second word line coupled with respective gates of respective transistors of the second row of transistors and respective gates of respective transistors of a third row of transistors of the plurality of rows of transistors. In some examples, the biasing circuitry 1125 may be configured as or otherwise support a means for biasing a first digit line of a plurality of digit lines to a second voltage value based at least in part on determining to perform the access operation, the first digit line coupled with respective terminals of respective transistors of a first subset of rows of the plurality of rows of transistors, the first subset including alternating rows of the plurality of rows of transistors. In some examples, the selection component 1130 may be configured as or otherwise support a means for selecting a first memory cell of a plurality of memory cells of the memory array for the access operation based at least in part on biasing the first word line, the second word line, and the first digit line.

In some examples, the biasing circuitry 1125 may be configured as or otherwise support a means for biasing a third word line of the plurality of word lines to a third voltage value based at least in part on determining to perform the access operation, the third voltage value less than the first voltage value.

In some examples, the biasing circuitry 1125 may be configured as or otherwise support a means for biasing a second digit line of the plurality of digit lines to a third voltage value based at least in part on determining to perform the access operation, the third voltage value less than the second voltage value.

In some examples, the first digit line and a second digit line overlap an active material of a transistor of the first memory cell. In some examples, the first memory cell includes a dielectric material between the second digit line and the active material of the transistor.

In some examples, the plurality of memory cells of the memory array are configured according to a hexagonal configuration. In some examples, the first digit line overlaps with an active material of a transistor of the first memory cell of the plurality of memory cells and a second digit line overlaps with an active material of a transistor of a second memory cell of the plurality of memory cells.

In some examples, each transistor of the plurality of rows of transistors is a thin film transistor.

Figure 12:
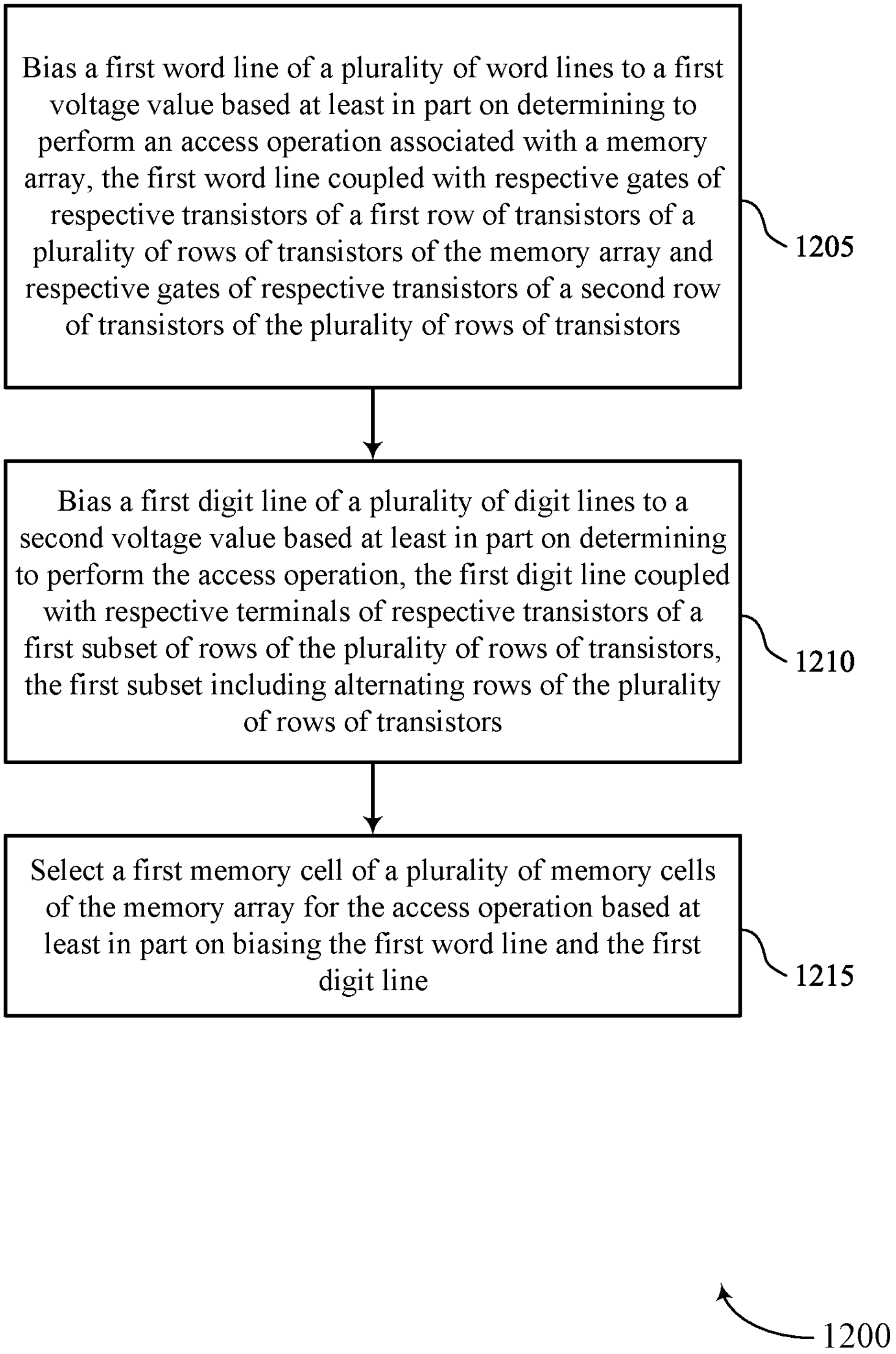
FIGS. 12 through 14 illustrate flowcharts showing a method or methods that support memory array configuration for shared word lines in accordance with examples as disclosed herein.

FIG. 12 illustrates a flowchart showing a method 1200 that supports memory array configuration for shared word lines in accordance with examples as disclosed herein. The operations of method 1200 may be implemented by a memory device or its components as described herein. For example, the operations of method 1200 may be performed by a memory device as described with reference to FIGS. 1 through 11. In some examples, a memory device may execute a set of instructions to control the functional elements of the device to perform the described functions. Additionally, or alternatively, the memory device may perform aspects of the described functions using special-purpose hardware.

At 1205, the method may include biasing a first word line of a plurality of word lines to a first voltage value based at least in part on determining to perform an access operation associated with a memory array, the first word line coupled with respective gates of respective transistors of a first row of transistors of a plurality of rows of transistors of the memory array and respective gates of respective transistors of a second row of transistors of the plurality of rows of transistors. The operations of 1205 may be performed in accordance with examples as disclosed herein. In some examples, aspects of the operations of 705 may be performed by a biasing circuitry 1125 as described with reference to FIG. 11.

At 1210, the method may include biasing a first digit line of a plurality of digit lines to a second voltage value based at least in part on determining to perform the access operation, the first digit line coupled with respective terminals of respective transistors of a first subset of rows of the plurality of rows of transistors, the first subset including alternating rows of the plurality of rows of transistors. The operations of 1210 may be performed in accordance with examples as disclosed herein. In some examples, aspects of the operations of 1210 may be performed by a biasing circuitry 1125 as described with reference to FIG. 11.

At 715, the method may include selecting a first memory cell of a plurality of memory cells of the memory array for the access operation based at least in part on biasing the first word line and the first digit line. The operations of 1215 may be performed in accordance with examples as disclosed herein. In some examples, aspects of the operations of 1215 may be performed by a selection component 1130 as described with reference to FIG. 11.

In some examples, an apparatus as described herein may perform a method or methods, such as the method 1200. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for biasing a first word line of a plurality of word lines to a first voltage value based at least in part on determining to perform an access operation associated with a memory array, the first word line coupled with respective gates of respective transistors of a first row of transistors of a plurality of rows of transistors of the memory array and respective gates of respective transistors of a second row of transistors of the plurality of rows of transistors; biasing a first digit line of a plurality of digit lines to a second voltage value based at least in part on determining to perform the access operation, the first digit line coupled with respective terminals of respective transistors of a first subset of rows of the plurality of rows of transistors, the first subset including alternating rows of the plurality of rows of transistors; and selecting a first memory cell of a plurality of memory cells of the memory array for the access operation based at least in part on biasing the first word line and the first digit line.

Aspect 2: The method, apparatus, or non-transitory computer-readable medium of aspect 1, further including operations, features, circuitry, logic, means, or instructions, or any combination thereof for biasing other word lines of the plurality of word lines to a third voltage value based at least in part on determining to perform the access operation, the third voltage value less than the first voltage value.

Aspect 3: The method, apparatus, or non-transitory computer-readable medium of any of aspects 1 through 2, further including operations, features, circuitry, logic, means, or instructions, or any combination thereof for biasing a second digit line of the plurality of digit lines to a third voltage value less than the second voltage value, the second digit line coupled with respective terminals of respective transistors of a second subset of rows of the plurality of rows of transistors, the first subset of rows being exclusive of the second subset of rows.

Aspect 4: The method, apparatus, or non-transitory computer-readable medium of any of aspects 1 through 3, further including operations, features, circuitry, logic, means, or instructions, or any combination thereof for biasing a second digit line of the plurality of digit lines to the second voltage value, the second digit line coupled with respective terminals of respective transistors of a second subset of rows of the plurality of rows of transistors, the first subset of rows being exclusive of the second subset of rows; biasing a third digit line to a third voltage value less than the second voltage value; and selecting a second memory cell of the plurality of memory cells based at least in part on biasing the second digit line and the third digit line.

Aspect 5: The method, apparatus, or non-transitory computer-readable medium of any of aspects 1 through 4, where the first digit line and a second digit line overlap an active material of a transistor of the first memory cell, the first memory cell includes a dielectric material between the second digit line and the active material of the transistor.

Aspect 6: The method, apparatus, or non-transitory computer-readable medium of any of aspects 1 through 5, where the plurality of memory cells of the memory array are configured according to a hexagonal configuration, the first digit line overlaps with an active material of a transistor of the first memory cell of the plurality of memory cells and a second digit line overlaps with an active material of a transistor of a second memory cell of the plurality of memory cells.

Aspect 7: The method, apparatus, or non-transitory computer-readable medium of any of aspects 1 through 6, where each transistor of the plurality of rows of transistors is a thin film transistor.

Figure 13:
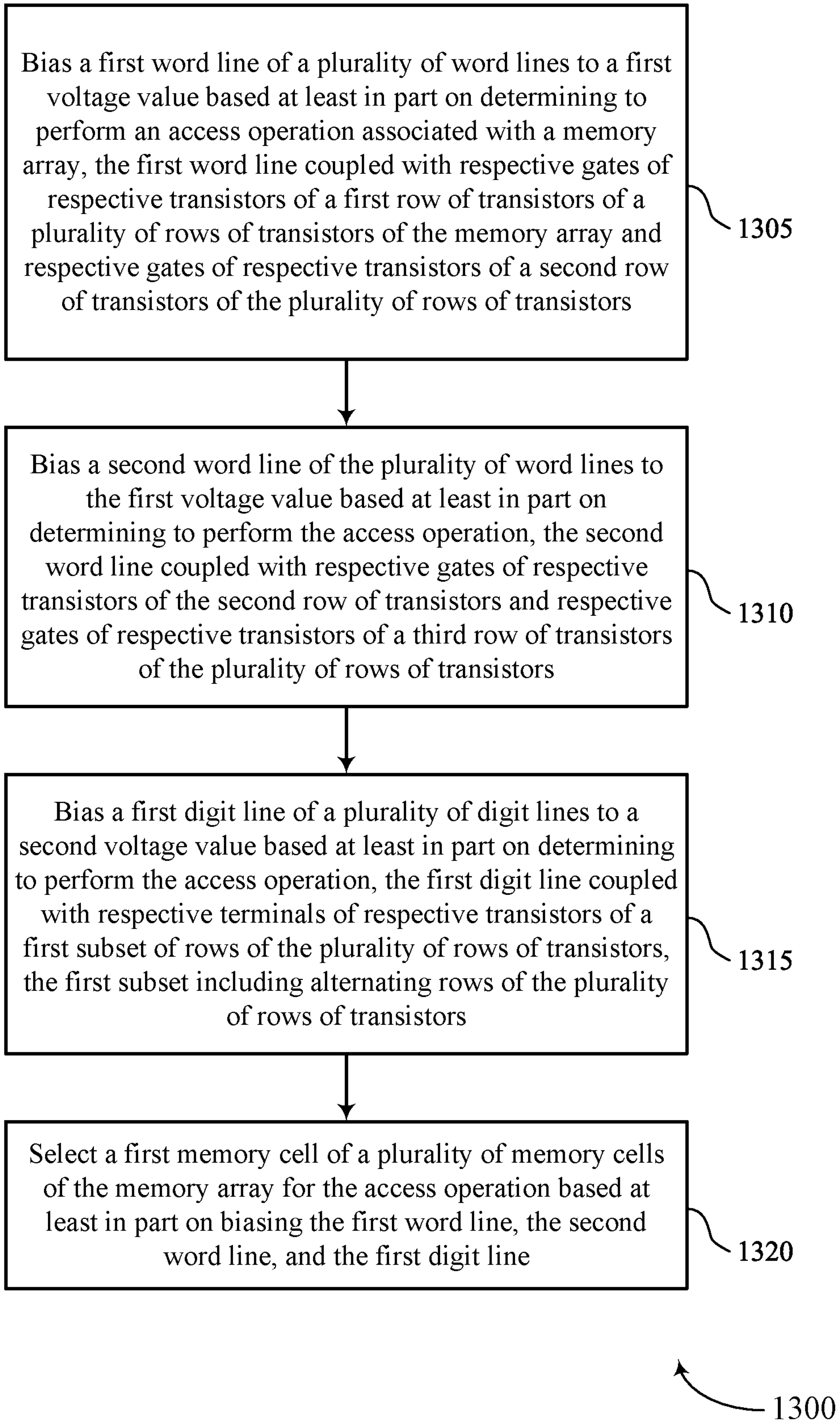

FIG. 13 illustrates a flowchart showing a method 1300 that supports memory array configuration for shared word lines in accordance with examples as disclosed herein. The operations of method 1300 may be implemented by a memory device or its components as described herein. For example, the operations of method 1300 may be performed by a memory device as described with reference to FIGS. 1 through 11. In some examples, a memory device may execute a set of instructions to control the functional elements of the device to perform the described functions. Additionally, or alternatively, the memory device may perform aspects of the described functions using special-purpose hardware.

At 1305, the method may include biasing a first word line of a plurality of word lines to a first voltage value based at least in part on determining to perform an access operation associated with a memory array, the first word line coupled with respective gates of respective transistors of a first row of transistors of a plurality of rows of transistors of the memory array and respective gates of respective transistors of a second row of transistors of the plurality of rows of transistors. The operations of 1305 may be performed in accordance with examples as disclosed herein. In some examples, aspects of the operations of 1305 may be performed by a biasing circuitry 1125 as described with reference to FIG. 11.

At 1310, the method may include biasing a second word line of the plurality of word lines to the first voltage value based at least in part on determining to perform the access operation, the second word line coupled with respective gates of respective transistors of the second row of transistors and respective gates of respective transistors of a third row of transistors of the plurality of rows of transistors. The operations of 1310 may be performed in accordance with examples as disclosed herein. In some examples, aspects of the operations of 1310 may be performed by a biasing circuitry 1125 as described with reference to FIG. 11.

At 1315, the method may include biasing a first digit line of a plurality of digit lines to a second voltage value based at least in part on determining to perform the access operation, the first digit line coupled with respective terminals of respective transistors of a first subset of rows of the plurality of rows of transistors, the first subset including alternating rows of the plurality of rows of transistors. The operations of 1315 may be performed in accordance with examples as disclosed herein. In some examples, aspects of the operations of 1315 may be performed by a biasing circuitry 1125 as described with reference to FIG. 11.

At 1320, the method may include selecting a first memory cell of a plurality of memory cells of the memory array for the access operation based at least in part on biasing the first word line, the second word line, and the first digit line. The operations of 1320 may be performed in accordance with examples as disclosed herein. In some examples, aspects of the operations of 1320 may be performed by a selection component 1130 as described with reference to FIG. 11.

In some examples, an apparatus as described herein may perform a method or methods, such as the method 1300. The apparatus may include features, circuitry, logic, means, or instructions (e.g., a non-transitory computer-readable medium storing instructions executable by a processor), or any combination thereof for performing the following aspects of the present disclosure:

Aspect 8: A method, apparatus, or non-transitory computer-readable medium including operations, features, circuitry, logic, means, or instructions, or any combination thereof for biasing a first word line of a plurality of word lines to a first voltage value based at least in part on determining to perform an access operation associated with a memory array, the first word line coupled with respective gates of respective transistors of a first row of transistors of a plurality of rows of transistors of the memory array and respective gates of respective transistors of a second row of transistors of the plurality of rows of transistors; biasing a second word line of the plurality of word lines to the first voltage value based at least in part on determining to perform the access operation, the second word line coupled with respective gates of respective transistors of the second row of transistors and respective gates of respective transistors of a third row of transistors of the plurality of rows of transistors; biasing a first digit line of a plurality of digit lines to a second voltage value based at least in part on determining to perform the access operation, the first digit line coupled with respective terminals of respective transistors of a first subset of rows of the plurality of rows of transistors, the first subset including alternating rows of the plurality of rows of transistors; and selecting a first memory cell of a plurality of memory cells of the memory array for the access operation based at least in part on biasing the first word line, the second word line, and the first digit line.

Aspect 9: The method, apparatus, or non-transitory computer-readable medium of aspect 8, further including operations, features, circuitry, logic, means, or instructions, or any combination thereof for biasing a third word line of the plurality of word lines to a third voltage value based at least in part on determining to perform the access operation, the third voltage value less than the first voltage value.

Aspect 10: The method, apparatus, or non-transitory computer-readable medium of any of aspects 8 through 9, further including operations, features, circuitry, logic, means, or instructions, or any combination thereof for biasing a second digit line of the plurality of digit lines to a third voltage value based at least in part on determining to perform the access operation, the third voltage value less than the second voltage value.

Aspect 11: The method, apparatus, or non-transitory computer-readable medium of any of aspects 8 through 10, where the first digit line and a second digit line overlap an active material of a transistor of the first memory cell, the first memory cell includes a dielectric material between the second digit line and the active material of the transistor.

Aspect 12: The method, apparatus, or non-transitory computer-readable medium of any of aspects 8 through 11, where the plurality of memory cells of the memory array are configured according to a hexagonal configuration, the first digit line overlaps with an active material of a transistor of the first memory cell of the plurality of memory cells and a second digit line overlaps with an active material of a transistor of a second memory cell of the plurality of memory cells.

Aspect 13: The method, apparatus, or non-transitory computer-readable medium of any of aspects 8 through 12, where each transistor of the plurality of rows of transistors is a thin film transistor.

Figure 14:
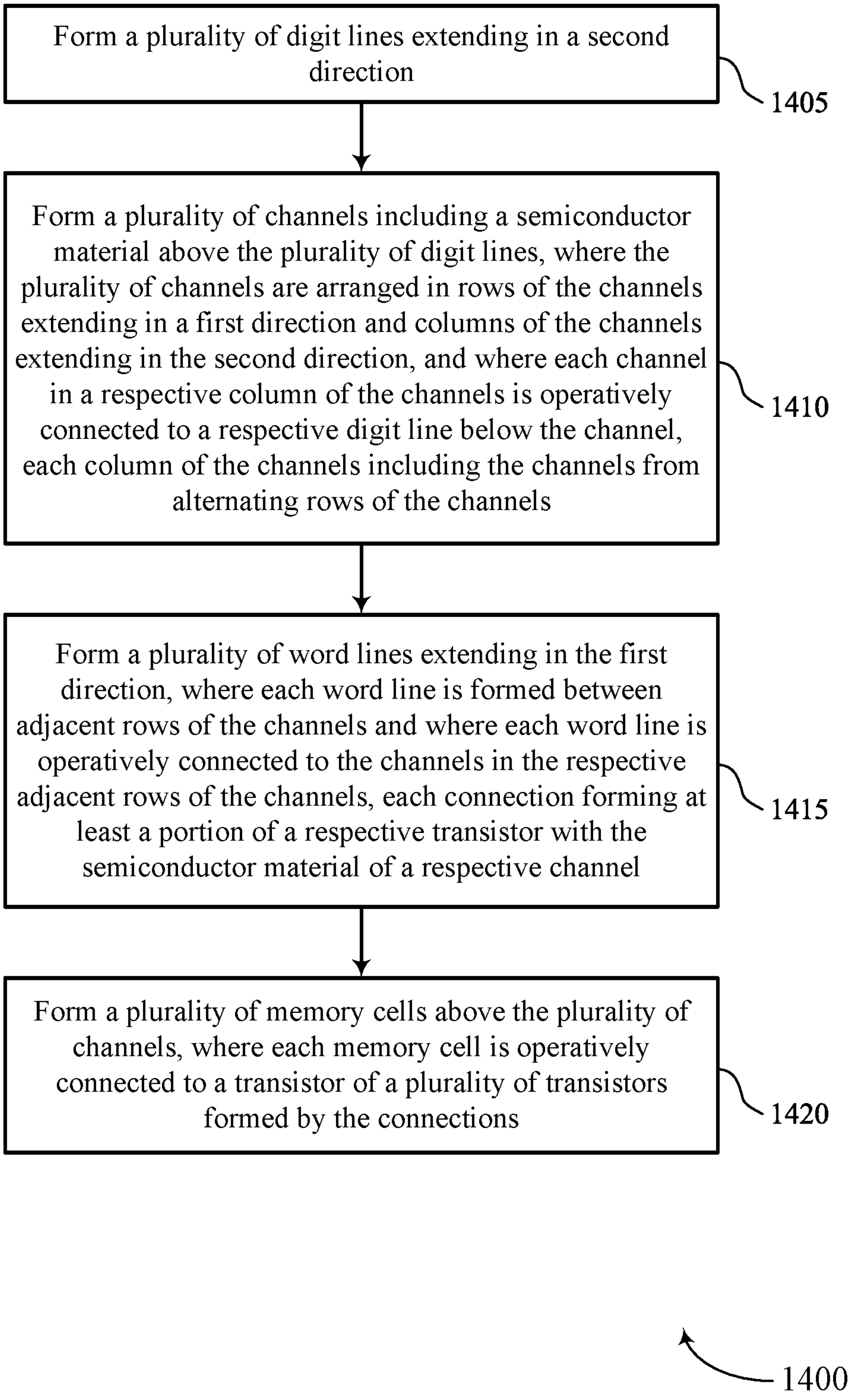

FIG. 14 illustrates a flowchart showing a method 1400 that supports memory array configuration for shared word lines in accordance with examples as disclosed herein. The operations of method 1400 may be implemented by a memory device or its components as described herein. For example, the operations of method 1400 may be performed by a memory device as described with reference to FIGS. 1 through 11. In some examples, a memory device may execute a set of instructions to control the functional elements of the device to perform the described functions. Additionally, or alternatively, the memory device may perform aspects of the described functions using special-purpose hardware.

At 1405, the method may include forming a plurality of digit lines extending in a second direction. The operations of 1405 may be performed in accordance with examples as disclosed herein. In some examples, aspects of the operations of 1405 may be performed by 1135 as described with reference to FIG. 11.

At 1410, the method may include forming a plurality of channels including a semiconductor material above the plurality of digit lines, where the plurality of channels are arranged in rows of the channels extending in a first direction and columns of the channels extending in the second direction, and where each channel in a respective column of the channels is operatively connected to a respective digit line below the channel, each column of the channels including the channels from alternating rows of the channels. The operations of 1410 may be performed in accordance with examples as disclosed herein.

At 1415, the method may include forming a plurality of word lines extending in the first direction, where each word line is formed between adjacent rows of the channels and where each word line is operatively connected to the channels in the respective adjacent rows of the channels, each connection forming at least a portion of a respective transistor with the semiconductor material of a respective channel. The operations of 1415 may be performed in accordance with examples as disclosed herein.

At 1420. the method may include forming a plurality of memory cells above the plurality of channels, where each memory cell is operatively connected to a transistor of a plurality of transistors formed by the connections. The operations of 1420 may be performed in accordance with examples as disclosed herein.

In some examples, an apparatus as described herein may perform a method or methods, such as the method 1400. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for forming a plurality of digit lines extending in a second direction; forming a plurality of channels including a semiconductor material above the plurality of digit lines; where the plurality of channels are arranged in rows of the channels extending in a first direction and columns of the channels extending in the second direction, and where each channel in a respective column of the channels is operatively connected to a respective digit line below the channel, each column of the channels including the channels from alternating rows of the channels; forming a plurality of word lines extending in the first direction, where each word line is formed between adjacent rows of the channels and where each word line is operatively connected to the channels in the respective adjacent rows of the channels, each connection forming at least a portion of a respective transistor with the semiconductor material of a respective channel; and forming a plurality of memory cells above the plurality of channels, where each memory cell is operatively connected to a transistor of a plurality of transistors formed by the connections.

Aspect 15: The method, apparatus, or non-transitory computer-readable medium of aspect 14; where forming the plurality of the channels includes operations, features, circuitry, logic, means, or instructions, or any combination thereof for depositing a semiconductor material above the plurality of digit lines in accordance with a pattern; doping the semiconductor material to form the channels, where the channels are coupled with source terminals and gate terminals; forming a mask over the semiconductor material exposing portions of the semiconductor material, the portions not associated with the channels; etching the portions to form trenches based at least in part on the mask exposing the portions; depositing dielectric material in the trenches based Least in part on etching the portions; and planarizing the semiconductor material and the dielectric material based at least in part on depositing the dielectric material.

Aspect 16: The method, apparatus, or non-transitory computer-readable medium of aspect 15. where the trenches extend in the first direction.

Aspect 17: The method, apparatus, or non-transitory computer-readable medium of any of aspects 15 through 16, where the trenches extend in a fourth direction between the first direction and the second direction.

Aspect 18: The method, apparatus, or non-transitory computer-readable medium of any of aspects 14 through 17, where forming the plurality of word lines includes operations, features, circuitry, logic, means, or instructions, or any combination thereof for etching dielectric material between respective adjacent rows of the channels to form trenches; depositing a liner into the trenches based at least in part on etching the dielectric material, the liner contacting sidewalls of the trenches; depositing a conductive material into the trenches above the liner based at least in part on depositing the liner; depositing an insulating material into the trenches above the conductive material based at least in part on depositing the conductive material; and planarizing the liner and the insulating material based at least in part on depositing the insulating material.

Aspect 19: The method, apparatus, or non-transitory computer-readable medium of any of aspects 14 through 18. where forming the plurality of memory cells includes operations, features, circuitry, logic, means, or instructions, or any combination thereof for forming a plurality of electrodes, each electrode operatively connected with a respective transistor; depositing memory material at least partially around each electrode, based at least in part on forming the plurality of electrodes; 2% forming a plurality of plate lines around the memory material based at least in part on depositing the memory material.

Aspect 20: The method, apparatus, or non-transitory computer-readable medium of any of aspects 14 through 19. further including operations, features, circuitry, logic, means, or instructions, or any combination thereof for forming a plurality of terminal contacts in a dielectric layer in between the plurality of digit lines and the plurality of transistors, where each terminal contact is operatively connected to a respective digit line and a respective transistor.

Aspect 21: The method, apparatus, or non-transitory computer-readable medium of aspect 20, where forming the plurality of terminal contacts further includes operations, features, circuitry, logic, means, or instructions, or any combination thereof for depositing a dielectric material above the plurality of digit lines; forming a mask over the dielectric material exposing portions of the dielectric material, the portions associated with the plurality of terminal contacts; etching the portions to form cavities along a third direction based at least in part on the mask exposing the portions; depositing a conductive material in the cavities; and planarizing the contact material and the dielectric material.

Aspect 22: The method, apparatus, or non-transitory computer-readable medium of aspect 21, where forming the plurality of terminal contacts further includes operations, features, circuitry, logic, means, or instructions, or any combination thereof for etching the conductive material in the cavities along a fourth direction.

Aspect 23: The method, apparatus, or non-transitory computer-readable medium of aspect 22, where at least one of the third direction or the fourth direction is between the first direction and the second direction.

Aspect 24: The method, apparatus, or non-transitory computer-readable medium of any of aspects 14 through 23, where alternating channels in each row of the channels form dummy transistors.

Aspect 25: The method, apparatus, or non-transitory computer-readable medium of any of aspects 14 through 24, where alternating channels in each row of the channels include dielectric material.

It should be noted that the methods described herein are possible implementations, and that the operations and the steps may be rearranged or otherwise modified and that other implementations are possible. Furthermore, portions from two or more of the methods may be combined.

An apparatus is described. The following provides an overview of aspects of the apparatus as described herein:

Aspect 26: An apparatus, including: an array of memory cells including: a plurality of word lines; a plurality of transistors, where each transistor of the plurality of transistors is coupled with a respective memory cell of the array of memory cells and operatively connected with two word lines of the plurality of word lines; and a plurality of digit lines including: a first digit line coupled with respective source or drain regions of respective transistors of a first subset of rows of the plurality of transistors, the first subset including alternating rows of the plurality of transistors; and a second digit line coupled with respective terminals of respective transistors of a second subset of rows of the plurality of transistors, the first subset of rows being exclusive of the second subset of rows.

Aspect 27: The apparatus of aspect 26, where the array of memory cells further includes: a first word line of the plurality of word lines coupled with each transistor of a first row of transistors of the plurality of transistors; and a second word line of the plurality of word lines coupled with each transistor of the first row of transistors.

Aspect 28: The apparatus of aspect 27, further including a controller operable to cause the apparatus to: select a first memory cell of the array of memory cells based at least in part on biasing the first digit line to a first voltage value different from a second voltage value of the second digit line and biasing the first word line to a third voltage value different from a fourth voltage value of the second word line.

Aspect 29: The apparatus of aspect 28, where the first voltage value is greater than the second voltage value and the third voltage value is greater than the fourth voltage value.

Aspect 30: The apparatus of any of aspects 27 through 29, further including a controller operable to cause the apparatus to: select a first memory cell of the array of memory cells based at least in part on biasing the first digit line to a first voltage value different from a second voltage value of the second digit line, biasing the first word line to a third voltage value different from a fourth voltage value of a third word line of the plurality of word lines, and biasing the second word line to the third voltage value.

Aspect 31: The apparatus of aspect 30, where the first voltage value is greater than the second voltage value and the third voltage value is greater than the fourth voltage value.

Aspect 32: The apparatus of any of aspects 27 through 31, further including a controller operable to cause the apparatus to: select a first memory cell of the array of memory cells based at least in part on biasing the first digit line to a first voltage value different from a second voltage value of a third digit line of the plurality of digit lines and biasing the first word line to a third voltage value different from a fourth voltage value of the second word line; and select a second memory cell of the array of memory cells based at least in part on biasing the second digit line to the first voltage value and biasing the first word line.

Aspect 33: The apparatus of aspect 32, where the first voltage value is greater than the second voltage value and the third voltage value is greater than the fourth voltage value.

Aspect 34: The apparatus of any of aspects 26 through 35, where the first digit line and the second digit line overlap an active material of a transistor of a memory cell of the array of memory cells.

Aspect 35: The apparatus of aspect 34, where the memory cell includes a dielectric material between the second digit line and the active material of the transistor.

Aspect 36: The apparatus of any of aspects 26 through 35, where: the array of memory cells configured according to a hexagonal configuration, the first digit line overlaps with an active material of a transistor of a first memory cell of the array of memory cells and the second digit line overlaps with an active material of a transistor of a second memory cell of the array of memory cells.

Aspect 37: The apparatus of any of aspects 26 through 36, where the plurality of transistors is a first plurality of transistors, the array of memory cells further including: a second plurality of transistors, where each transistor of the second plurality of transistors is not coupled with a respective memory cell of the array of memory cells and operatively connected with the two word lines of the plurality of word lines.

Aspect 38: The apparatus of any of aspects 26 through 37, where each transistor of the plurality of transistors is a thin film transistor.

An apparatus is described. The following provides an overview of aspects of the apparatus as described herein:

Aspect 39: An apparatus, including: a first word line extending in a first direction; a first row of vertical transistors extending in the first direction; a second word line extending in the first direction; a second row of vertical transistors extending in the first direction, where the second word line is between the first and second rows of vertical transistors; a first digit line extending in a second direction, where the first digit line is operatively connected to a transistor in the first row of vertical transistors and is not operatively connected to a transistor in the second row of vertical transistors; and a second digit line extending in the second direction, where the second digit line is operatively connected to a transistor in the second row of vertical transistors and is not operatively connected to a transistor in the first row of vertical transistors.

Aspect 40: The apparatus of aspect 39, further including: a third digit line extending in the second direction, where the third digit line is operatively connected to another transistor in the first row of vertical transistors and is not operatively connected to a transistor in the second row of vertical transistors; and a fourth digit line extending in the second direction, where the fourth digit line is operatively connected to another transistor in the second row of vertical transistors and is not operatively connected to a transistor in the first row of vertical transistors.

Aspect 41: The apparatus of any of aspects 39 through 40, where the vertical transistors include thin film transistors.

Aspect 42: The apparatus of aspect 41, where the vertical transistors include polysilicon.

Aspect 43: The apparatus of any of aspects 39 through 42, where the transistor in the first row connected to the first digit line is offset in the first direction from the transistor in the second row connected to the second digit line.

Aspect 44: The apparatus of any of aspects 39 through 43, further including: a first row of contacts extending in the first direction, where the first digit line is operatively connected to the transistor in the first row of vertical transistors through a first contact in the first row of contacts; and a second row of contacts extending in the first direction, where the second digit line is operatively connected to the transistor in the second row of vertical transistors through a first contact in second row of contacts.

Aspect 45: The apparatus of any of aspects 39 through 44, where: the first digit line is in direct contact with the transistor in the first row of vertical transistors; and the second digit line is in direct contact with the transistor in the second row of vertical transistors.

Aspect 46: The apparatus of any of aspects 39 through 45, further including: a first capacitor operatively connected to the transistor in the first row of vertical transistors that is connected to the first digit line; and a second capacitor operatively connected to the transistor in the second row of vertical transistors that is connected to the second digit line.

Aspect 47: The apparatus of aspect 46, where the first capacitor includes a bottom electrode operatively connected to the transistor in the first of vertical transistors that is connected to the first digit line, a top electrode and a ferroelectric material between the bottom and top electrodes.

Aspect 48: The apparatus of any of aspects 46 through 47, where: the transistor in the first row of vertical transistors that is connected to the first digit line includes a first transistor; the first row of vertical transistors further includes a second transistor; the transistor in the second row of vertical transistors that is connected to the second digit line includes a third transistor; and the second row of vertical transistor further includes a fourth transistor, where the second transistor and the fourth transistor are not operatively connected to memory elements.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

The terms "layer" and "level" used herein refer to an organization (e.g., a stratum, a sheet) of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, or materials. In some examples, one layer or level may be composed of two or more sublayers or sublevels.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:

an array of memory cells comprising:

a plurality of word lines;

a plurality of transistors, wherein each transistor of the plurality of transistors is coupled with a respective memory cell of the array of memory cells and has a channel that is between two word lines of the plurality of word lines, wherein the two word lines are gate terminals of the each transistor; and a plurality of digit lines comprising:

a first digit line coupled with respective source or drain regions of respective transistors of a first subset of rows of the plurality of transistors, the first subset of rows including alternating rows of the plurality of transistors; and a second digit line coupled with respective terminals of respective transistors of a second subset of rows of the plurality of transistors, the first subset of rows being exclusive of the second subset of rows.

2. The apparatus of claim 1, wherein the array of memory cells further comprises:

a first word line of the plurality of word lines coupled with each transistor of a first row of transistors of the plurality of transistors; and a second word line of the plurality of word lines coupled with each transistor of the first row of transistors.

3. The apparatus of claim 2, further comprising a controller operable to cause the apparatus to:

select a first memory cell of the array of memory cells based at least in part on biasing the first digit line to a first voltage value different from a second voltage value of the second digit line and biasing the first word line to a third voltage value different from a fourth voltage value of the second word line.

4. The apparatus of claim 3, wherein the first voltage value is greater than the second voltage value and the third voltage value is greater than the fourth voltage value.

5. The apparatus of claim 2, further comprising a controller operable to cause the apparatus to:

select a first memory cell of the array of memory cells based at least in part on biasing the first digit line to a first voltage value different from a second voltage value of the second digit line, biasing the first word line to a third voltage value different from a fourth voltage value of a third word line of the plurality of word lines, and biasing the second word line to the third voltage value.

6. The apparatus of claim 5, wherein the first voltage value is greater than the second voltage value and the third voltage value is greater than the fourth voltage value.

7. The apparatus of claim 2, further comprising a controller operable to cause the apparatus to:

select a first memory cell of the array of memory cells based at least in part on biasing the first digit line to a first voltage value different from a second voltage value of a third digit line of the plurality of digit lines and biasing the first word line to a third voltage value different from a fourth voltage value of the second word line; and select a second memory cell of the array of memory cells based at least in part on biasing the second digit line to the first voltage value and biasing the first word line.

8. The apparatus of claim 7, wherein the first voltage value is greater than the second voltage value and the third voltage value is greater than the fourth voltage value.

9. The apparatus of claim 1, wherein the first digit line and the second digit line overlap an active material of a transistor of a memory cell of the array of memory cells.

10. The apparatus of claim 9, wherein the memory cell includes a dielectric material between the second digit line and the active material of the transistor.

11. The apparatus of claim 1, wherein:

the array of memory cells is configured according to a hexagonal configuration, the first digit line overlaps with an active material of a transistor of a first memory cell of the array of memory cells, and the second digit line overlaps with an active material of a transistor of a second memory cell of the array of memory cells.

12. The apparatus of claim 1, wherein the plurality of transistors is a first plurality of transistors, the array of memory cells further comprising:

a second plurality of transistors, wherein each transistor of the second plurality of transistors is not coupled with a respective memory cell of the array of memory cells and has a channel that is between the two word lines of the plurality of word lines.

13. The apparatus of claim 1, wherein each transistor of the plurality of transistors is a thin film transistor.

14. A method, comprising:

biasing a first word line of a plurality of word lines to a first voltage value based at least in part on determining to perform an access operation associated with a memory array, the first word line coupled with respective gates of respective transistors of a first row of transistors of a plurality of rows of transistors of the memory array and respective gates of respective transistors of a second row of transistors of the plurality of rows of transistors;

biasing a first digit line of a plurality of digit lines to a second voltage value based at least in part on determining to perform the access operation, the first digit line coupled with respective terminals of respective transistors of a first subset of rows of the plurality of rows of transistors, the first subset of rows including alternating rows of the plurality of rows of transistors; and selecting a first memory cell of a plurality of memory cells of the memory array for the access operation based at least in part on biasing the first word line and the first digit line.

15. The method of claim 14, further comprising:

biasing other word lines of the plurality of word lines to a third voltage value based at least in part on determining to perform the access operation, the third voltage value less than the first voltage value.

16. The method of claim 14, further comprising:

biasing a second digit line of the plurality of digit lines to a third voltage value less than the second voltage value, the second digit line coupled with respective terminals of respective transistors of a second subset of rows of the plurality of rows of transistors, the first subset of rows being exclusive of the second subset of rows.

17. The method of claim 14, further comprising:

biasing a second digit line of the plurality of digit lines to the second voltage value, the second digit line coupled with respective terminals of respective transistors of a second subset of rows of the plurality of rows of transistors, the first subset of rows being exclusive of the second subset of rows;

biasing a third digit line to a third voltage value less than the second voltage value; and selecting a second memory cell of the plurality of memory cells based at least in part on biasing the second digit line and the third digit line.

18. An apparatus, comprising:

a first word line extending in a first direction;

a first row of vertical transistors, the first row extending in the first direction;

a second word line extending in the first direction;

a second row of vertical transistors, the second row extending in the first direction, wherein the second word line is between the first row of vertical transistors and the second row of vertical transistors;

a first digit line extending in a second direction, wherein the first digit line is operatively connected to a transistor in the first row of vertical transistors and is not operatively connected to a transistor in the second row of vertical transistors; and a second digit line extending in the second direction, wherein the second digit line is operatively connected to a transistor in the second row of vertical transistors and is not operatively connected to a transistor in the first row of vertical transistors.

19. The apparatus of claim 18, further comprising:

a third digit line extending in the second direction, wherein the third digit line is operatively connected to another transistor in the first row of vertical transistors and is not operatively connected to a transistor in the second row of vertical transistors; and a fourth digit line extending in the second direction, wherein the fourth digit line is operatively connected to another transistor in the second row of vertical transistors and is not operatively connected to a transistor in the first row of vertical transistors.

20. The apparatus of claim 18, wherein the transistor in the first row connected to the first digit line is offset in the first direction from the transistor in the second row connected to the second digit line.

21. The apparatus of claim 18, further comprising:

a first row of contacts extending in the first direction, wherein the first digit line is operatively connected to the transistor in the first row of vertical transistors through a first contact in the first row of contacts; and a second row of contacts extending in the first direction, wherein the second digit line is operatively connected to the transistor in the second row of vertical transistors through a first contact in the second row of contacts.

22. The apparatus of claim 18, wherein:

the first digit line is in direct contact with the transistor in the first row of vertical transistors; and the second digit line is in direct contact with the transistor in the second row of vertical transistors.

23. The apparatus of claim 18, further comprising:

a first capacitor operatively connected to the transistor in the first row of vertical transistors that is connected to the first digit line; and a second capacitor operatively connected to the transistor in the second row of vertical transistors that is connected to the second digit line.

24. The apparatus of claim 23, wherein the first capacitor comprises a bottom electrode operatively connected to the transistor in the first row of vertical transistors that is connected to the first digit line, a top electrode and a ferroelectric material between the bottom electrode and the top electrode.

25. The apparatus of claim 23, wherein:

the transistor in the first row of vertical transistors that is connected to the first digit line comprises a first transistor;

the first row of vertical transistors further comprises a second transistor;

the transistor in the second row of vertical transistors that is connected to the second digit line comprises a third transistor; and the second row of vertical transistors further comprises a fourth transistor, wherein the second transistor and the fourth transistor are not operatively connected to memory elements.

* * * * *